US010403037B1

United States Patent
Boardman et al.

(10) Patent No.: US 10,403,037 B1
(45) Date of Patent: Sep. 3, 2019

(54) VERIFYING OBJECT MEASUREMENTS DETERMINED FROM MOBILE DEVICE IMAGES

(71) Applicant: URC Ventures, Inc., Redmond, WA (US)

(72) Inventors: David Boardman, Redmond, WA (US); Brian Sanderson Clipp, Chapel Hill, NC (US); Charles Erignac, Kirkland, WA (US); Jan-Michael Frahm, Chapel Hill, NC (US); Jared Scott Heinly, Durham, NC (US); Srinivas Kapaganty, Suwanne, GA (US)

(73) Assignee: URC Ventures, Inc., Redmond, WA (US)

( * ) Notice: Subject to any disclaimer, the term of this patent is extended or adjusted under 35 U.S.C. 154(b) by 0 days.

(21) Appl. No.: 15/076,493

(22) Filed: Mar. 21, 2016

(51) Int. Cl.
*G01B 1/00* (2006.01)
*G06T 17/00* (2006.01)
(Continued)

(52) U.S. Cl.
CPC .......... *G06T 17/00* (2013.01); *G06K 9/4604* (2013.01); *G06K 9/52* (2013.01); *G06K 9/6215* (2013.01);
(Continued)

(58) Field of Classification Search
CPC .......... G09G 5/02; G06F 17/10; G06F 17/30; A61B 5/0064; G06T 17/00; G01B 1/00
(Continued)

(56) References Cited

U.S. PATENT DOCUMENTS 5,831,621 A 11/1998 Pito
7,944,547 B2 5/2011 Wang
(Continued)

FOREIGN PATENT DOCUMENTS

WO 2012/061945 A1 5/2012
WO WO 2012061945 A1 * 5/2012 ....... G06F 17/30247

OTHER PUBLICATIONS

Koch, R., et al., "Realistic Surface Reconstruction of 3D Scenes from Uncalibrated Image Sequences," 2000, The Journal of Visualization and Computer Animation, 13 pages.
(Continued)

*Primary Examiner* — Albert Kir
(74) *Attorney, Agent, or Firm* — VLP Law Group LLP; James A. D. White

(57) ABSTRACT

Techniques are described for analyzing images acquired via mobile devices in various ways, including to estimate measurements for one or more attributes of one or more objects in the images and/or to perform automated verification of such attribute measurements. For example, the described techniques may be used to measure the volume of a stockpile of material or other large object, based on images acquired via a mobile device that is moved around some or all of the object. The calculation of object volume and/or other determined object information may include generating and manipulating one or more computer models of the object from selected images. In addition, further automated verification activities may be performed for such computer model(s) and resulting object attribute measurements, such as based on analyzing one or more types of information that reflect accuracy and/or completeness of the computer model(s).

25 Claims, 27 Drawing Sheets
(8 of 27 Drawing Sheet(s) Filed in Color)

(51) Int. Cl.

| | | |
|---|---|---|
| *G06T 7/60* | (2017.01) | |
| *G06K 9/62* | (2006.01) | |
| *G06K 9/52* | (2006.01) | |
| *G06K 9/46* | (2006.01) | |
| *H04N 13/204* | (2018.01) | |
| *G06T 7/40* | (2017.01) | |
| *H04N 7/18* | (2006.01) | |

(52) U.S. Cl.
CPC .............. *G06K 9/6256* (2013.01); *G06T 7/60* (2013.01); *H04N 13/204* (2018.05); *G06T 2200/04* (2013.01)

(58) Field of Classification Search
USPC .................. 345/419; 703/2; 348/51, 46, 135; 382/154
See application file for complete search history.

(56) References Cited

U.S. PATENT DOCUMENTS

| | | | |
|---|---|---|---|
| 8,384,714 | B2 | 2/2013 | De Aguiar et al. |
| 2002/0145607 | A1 | 10/2002 | Dimsdale |
| 2002/0180865 | A1* | 12/2002 | Lee ........................ G01B 11/00 348/135 |
| 2002/0190982 | A1 | 12/2002 | Kotcheff et al. |
| 2003/0218607 | A1 | 11/2003 | Baumberg |
| 2007/0132874 | A1 | 6/2007 | Forman et al. |
| 2007/0263907 | A1 | 11/2007 | McMakin et al. |
| 2008/0031512 | A1 | 2/2008 | Mundermann et al. |
| 2008/0100622 | A1 | 5/2008 | Gordon |
| 2008/0180448 | A1 | 7/2008 | Anguelov et al. |
| 2011/0221936 | A1 | 9/2011 | Steinberg et al. |
| 2012/0044247 | A1 | 2/2012 | Naimark |
| 2012/0133665 | A1 | 5/2012 | Wexler et al. |
| 2013/0002832 | A1* | 1/2013 | Lasenby .............. A61B 5/0064 348/51 |
| 2013/0048722 | A1 | 2/2013 | Davis et al. |
| 2013/0060540 | A1* | 3/2013 | Frahm .................... G06T 15/06 703/2 |
| 2014/0049535 | A1* | 2/2014 | Wang .................. G01B 11/2509 345/419 |
| 2014/0270480 | A1* | 9/2014 | Boardman ............. G06T 17/00 382/154 |

OTHER PUBLICATIONS

Lynx A Camera by Lynx Laboratories—Kickstarter, retrieved on Mar. 13, 2013, from http://www.kickstarter.com/projects/915328712/lynx-a-camera, 16 pages.

Lynx Laboratories, retrieved on Mar. 13, 2013, from http://lynxlaboratories.com/object.php, 4 pages.

Lynx Laboratories, retrieved on Mar. 13, 2013, from http://lynxlaboratores.com/aboutLynxA.php, 2 pages.

Niem, W., et al., "Automatic Reconstruction of 3D Objects Using a Mobile Monoscopic Camera," 1997, IEEE, pp. 173-180.

* cited by examiner

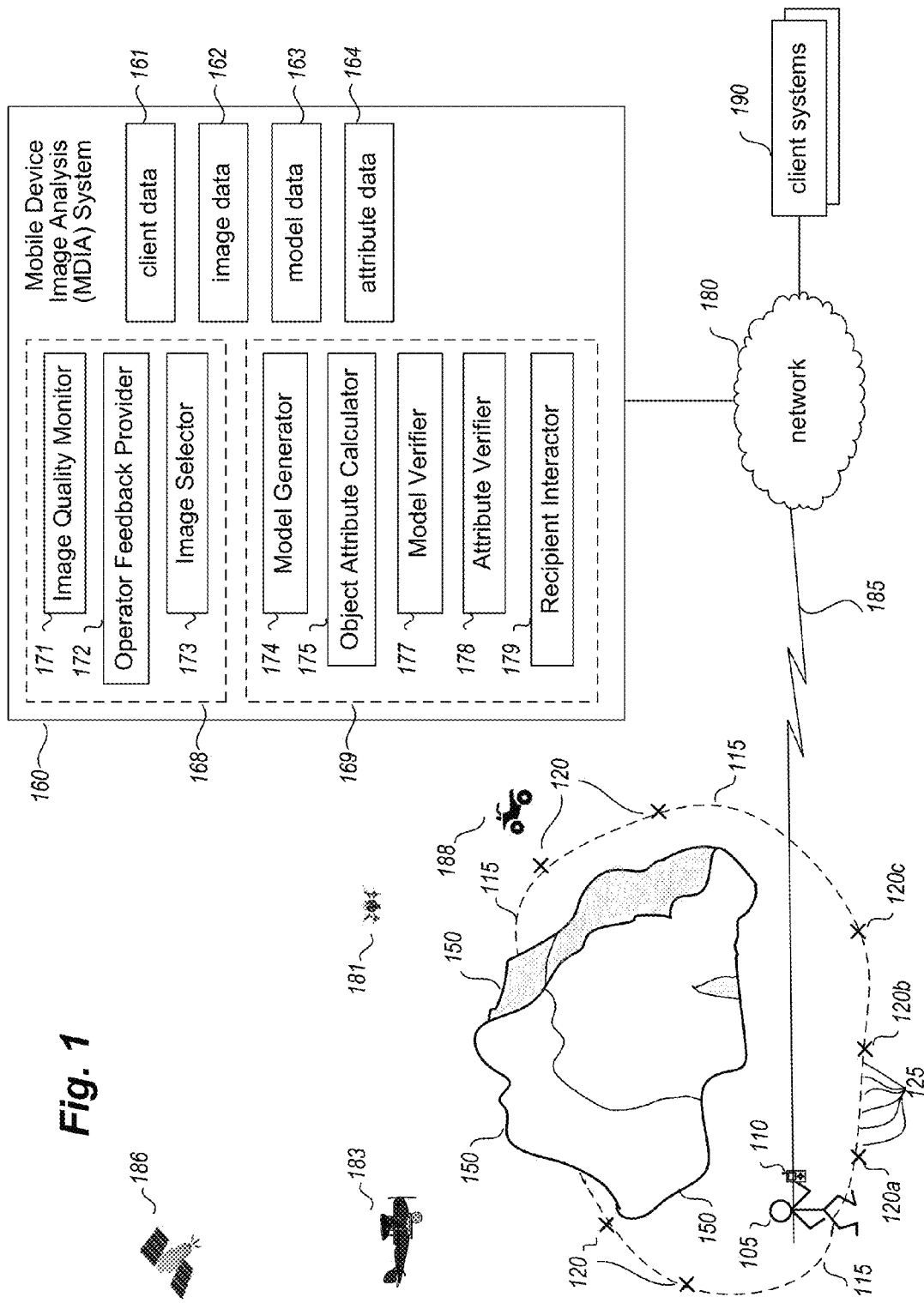

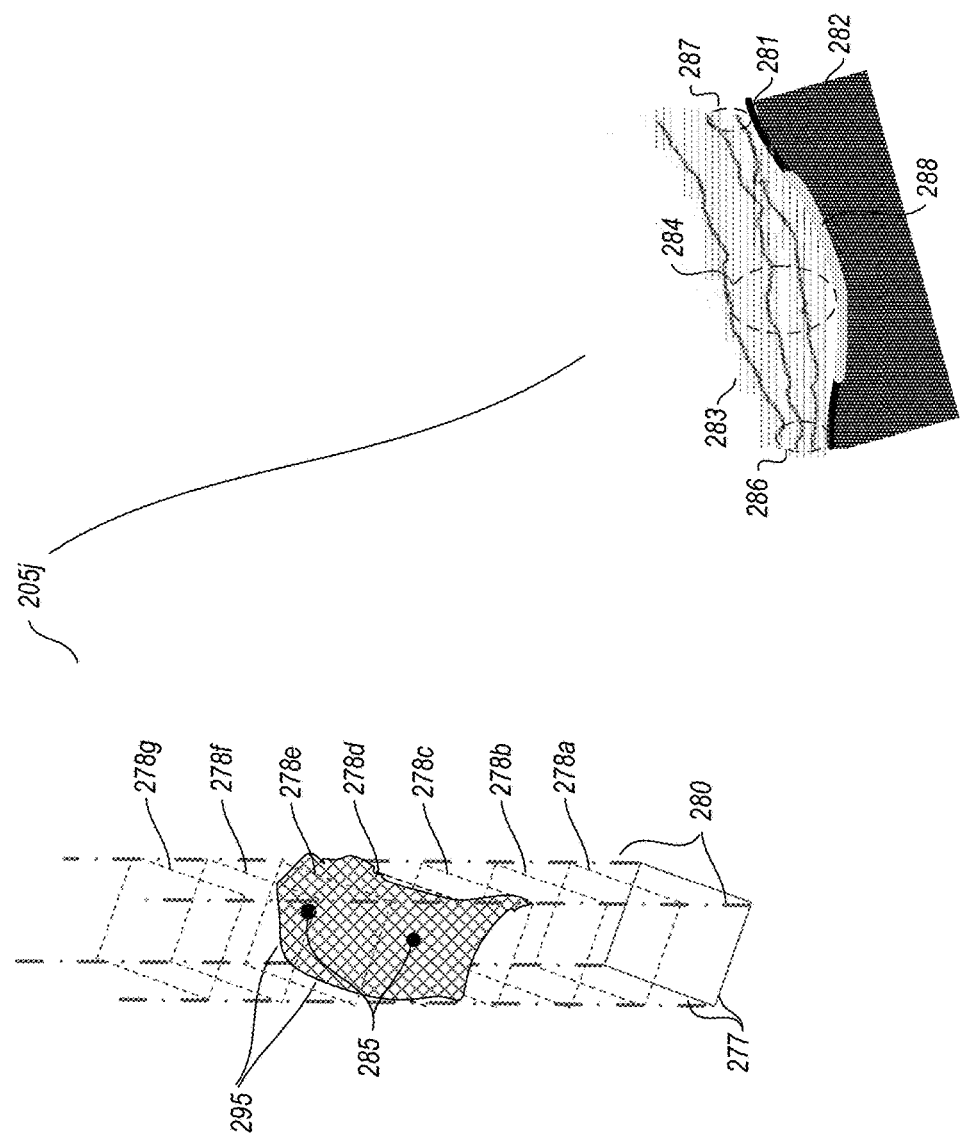

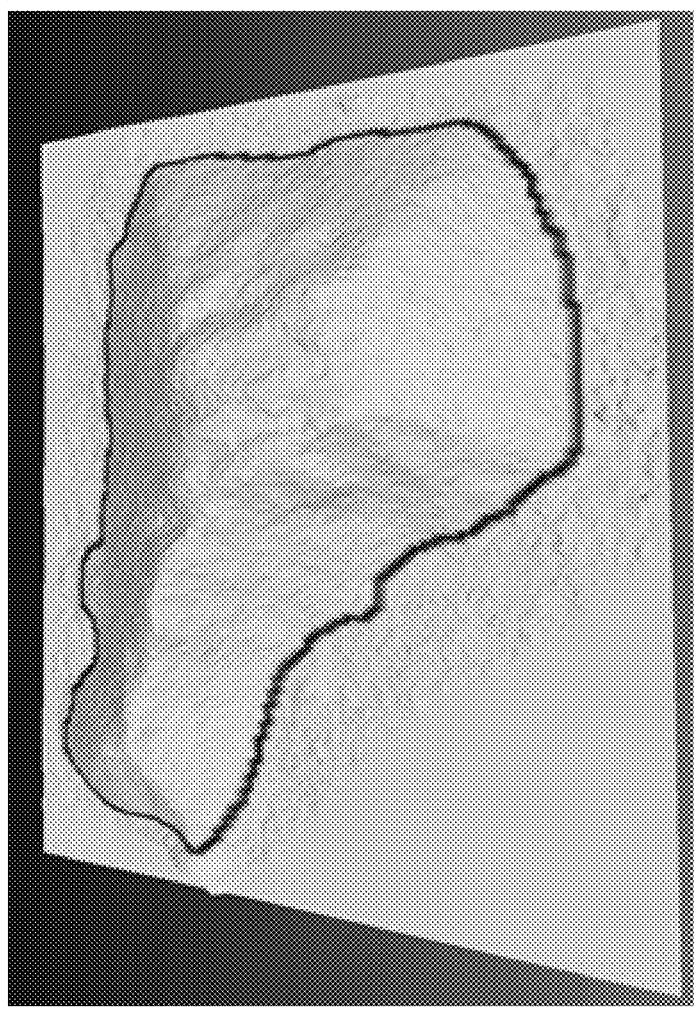
Fig. 2K1

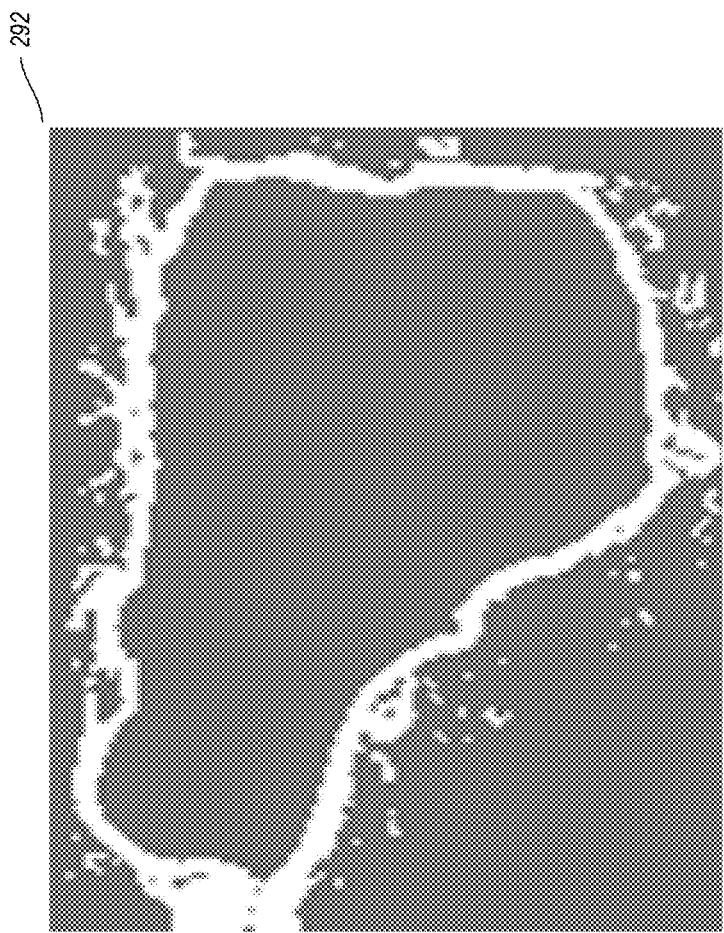
Fig. 2K2

Fig. 2K3

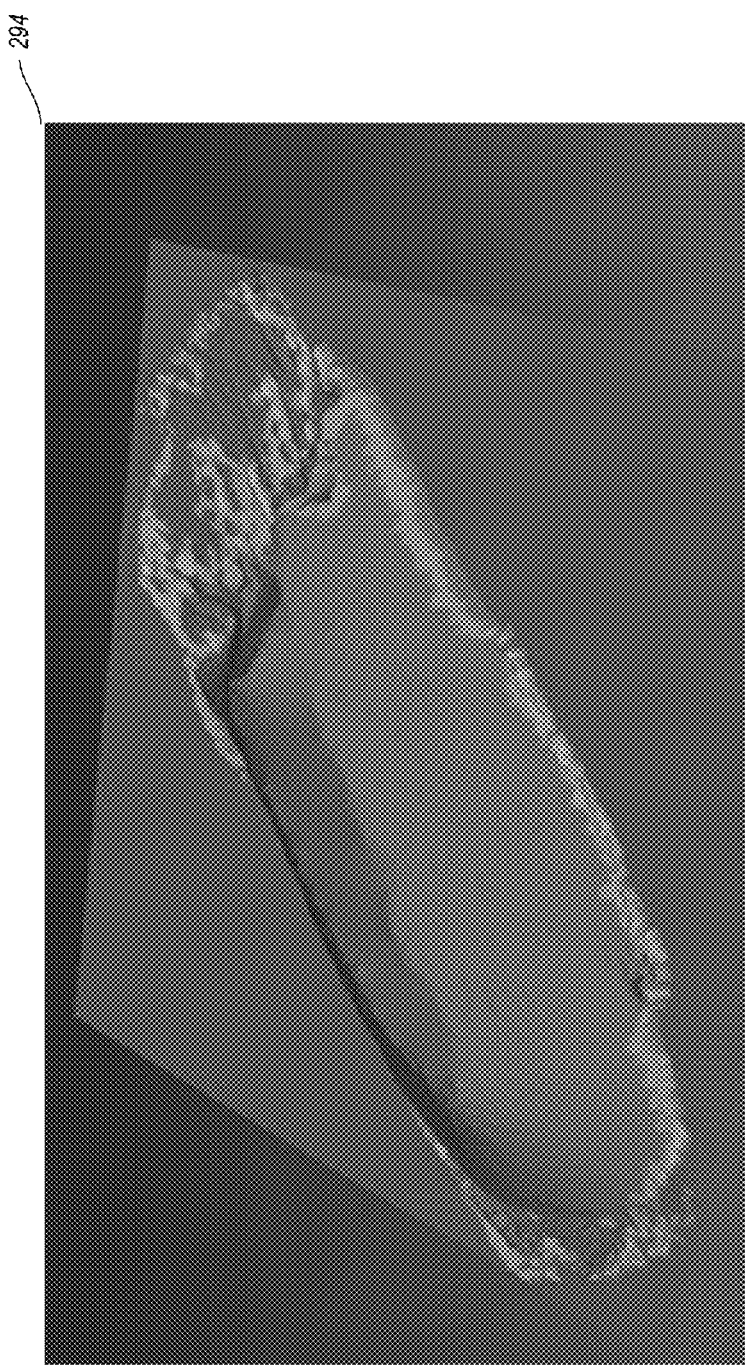
Fig. 2K4

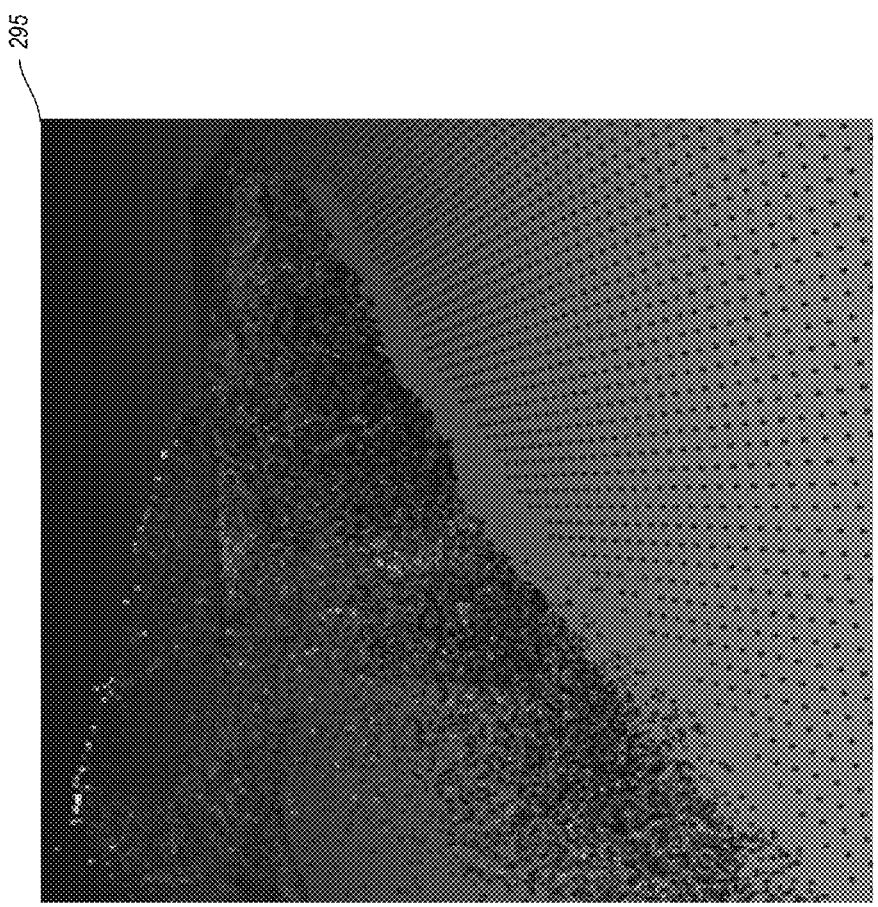
Fig. 2K5

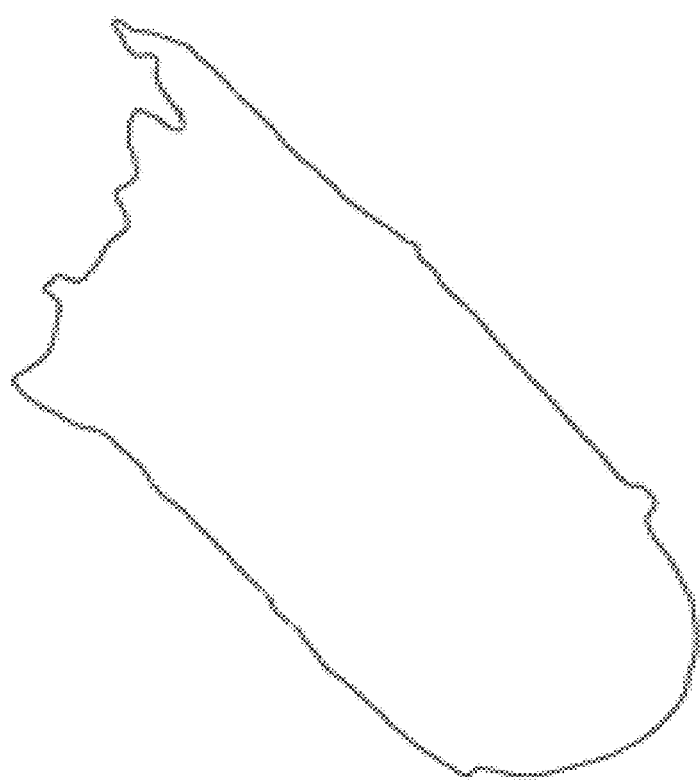
Fig. 2K6

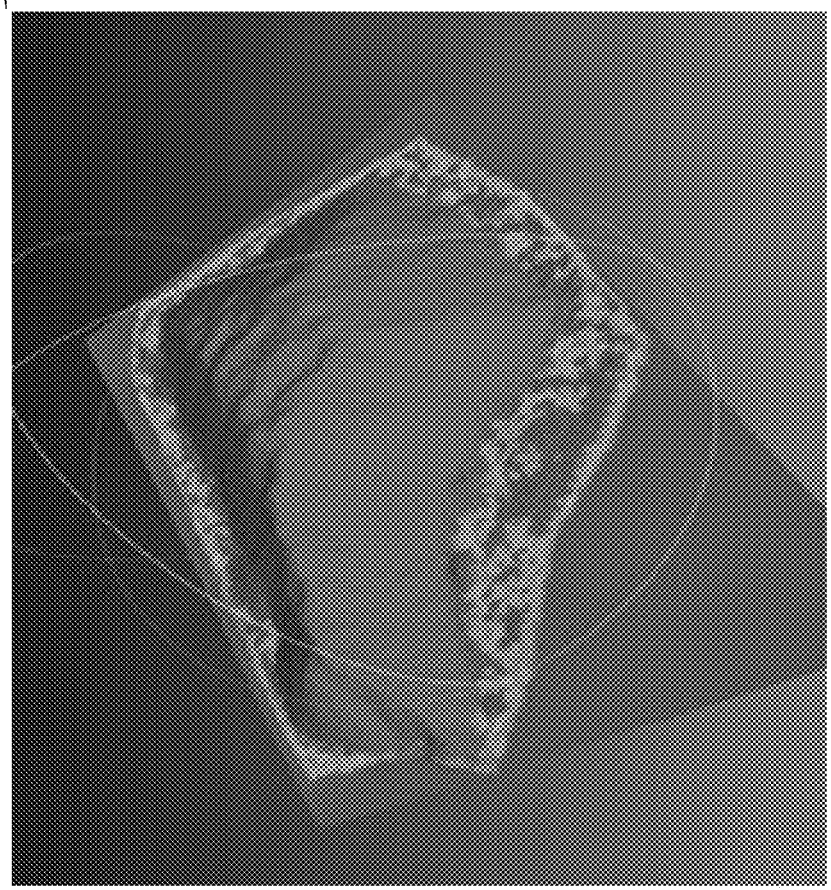
Fig. 2K7

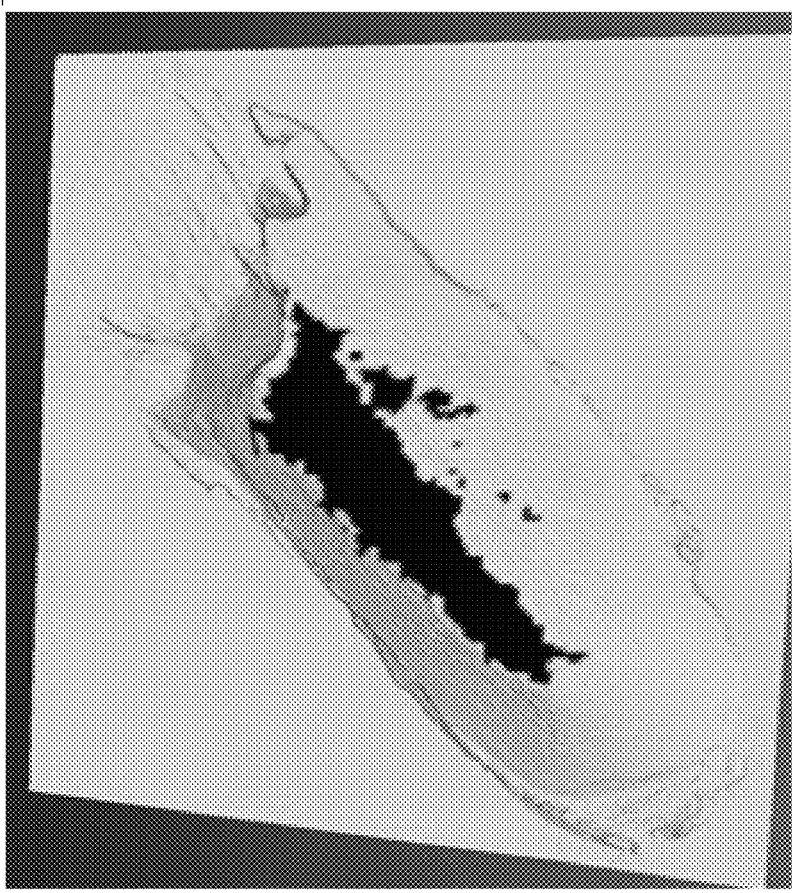
Fig. 2K8

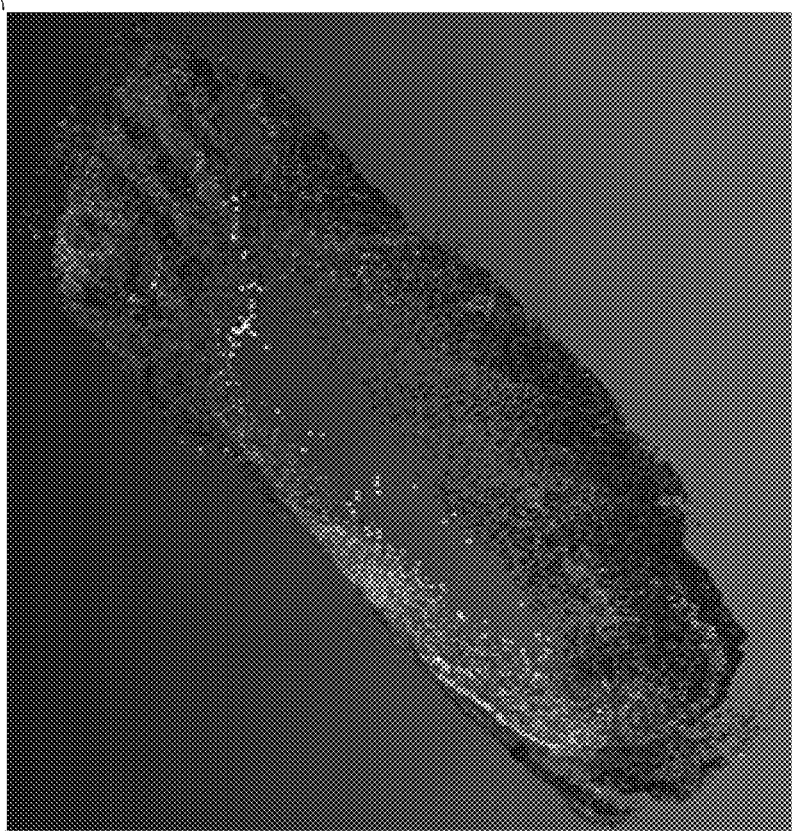
Fig. 2K9

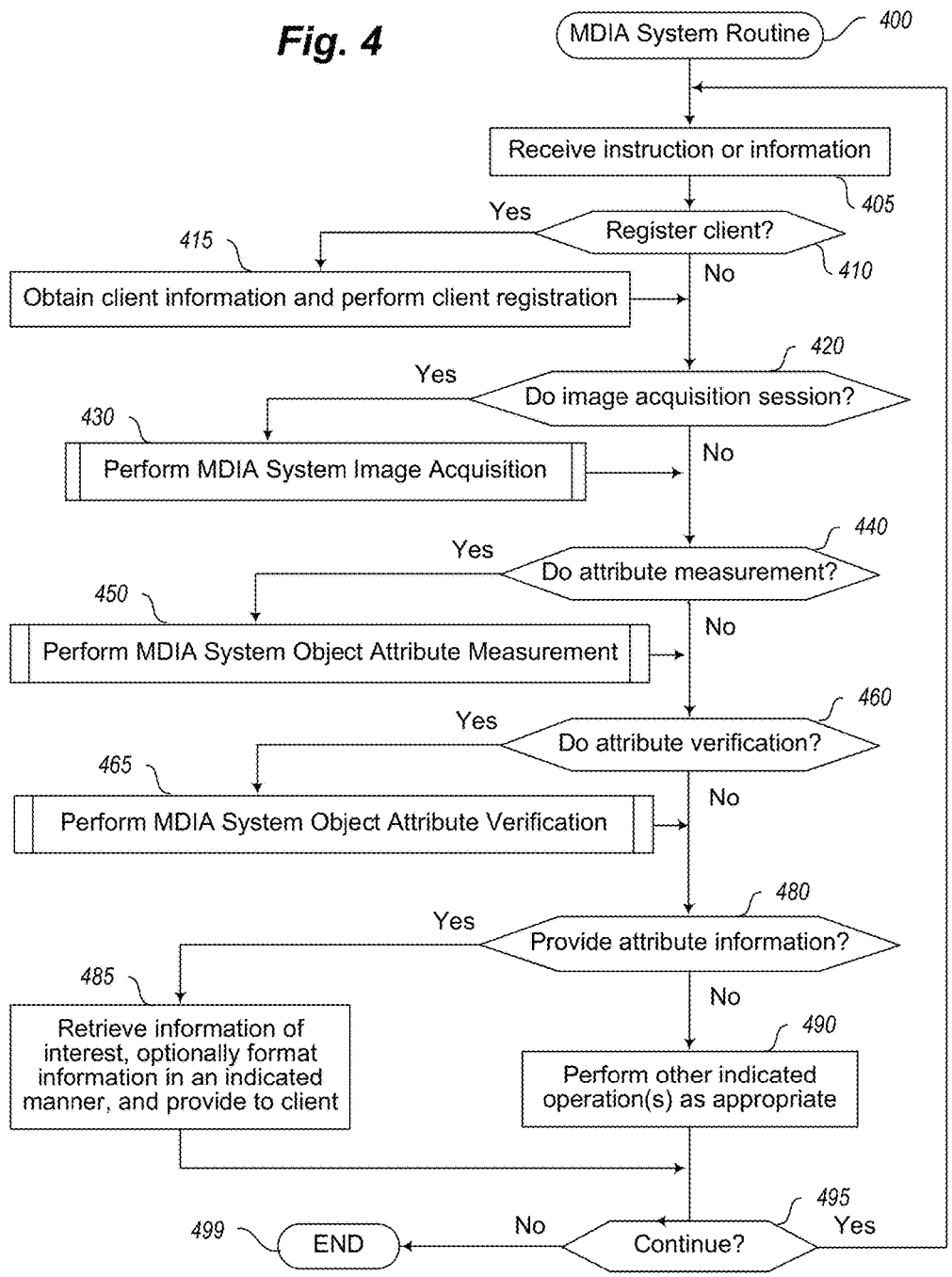

VERIFYING OBJECT MEASUREMENTS DETERMINED FROM MOBILE DEVICE IMAGES

TECHNICAL FIELD

The following disclosure relates generally to techniques for analyzing images acquired via mobile devices, such as to assess volume or other attribute measurements of an object included in the images, and to automated verification of such attribute measurements.

BACKGROUND

A variety of techniques exist to identify and measure attributes of physical objects from locations separate from those objects, including for man-made and naturally occurring objects in outdoors environments. Such identification and measurement techniques may, for example, use various types of specialized measurement equipment (e.g., theodolites, rangefinders, radar, lidar, sonar, 3D scanners, etc.). However, such techniques have various problems, including that the specialized measurement equipment may be expensive and/or difficult to use, and that some types of object attributes are difficult to measure.

Portable electronics equipment is becoming increasingly inexpensive and includes increasingly advanced technology, including for many consumer electronics devices. However, such devices do not typically include specialized or dedicated measurement equipment to identify and measure various attributes of physical objects.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a network diagram illustrating an example embodiment of using described techniques to acquire images of an object via a mobile device and to analyze the acquired images to assess volume and/or other attributes of the object.

FIGS. 2A-2J and 2K1-2K9 illustrate examples of acquiring images of an object via a mobile device, analyzing the acquired images to assess measurements of volume and/or other attributes of the object, and performing further automated verification of such attribute measurements.

FIG. 4 is an example flow diagram of an illustrated embodiment of a Mobile Device Image Analysis (MDIA) System routine.

DETAILED DESCRIPTION

Figure 2A:
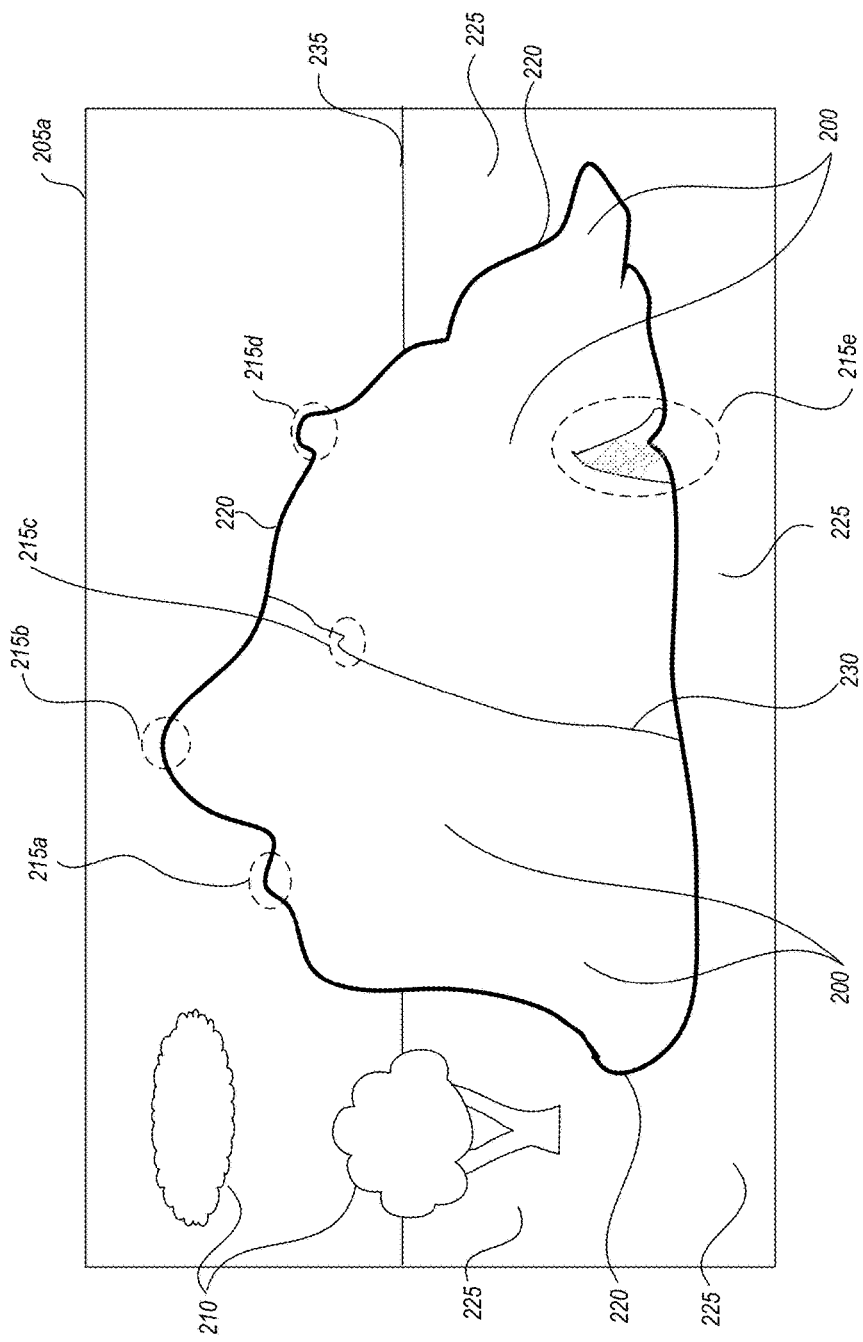

Techniques are described for analyzing images acquired via mobile devices in various ways, including in some embodiments to estimate measurements for one or more attributes of one or more objects included in the images and/or to perform automated verification of such attribute measurements. As one non-exclusive example, the described techniques may in some embodiments be used to measure the volume of a stockpile of material (e.g., a construction aggregate, such as sand, gravel, crushed stone, etc.), based on images acquired via a mobile device that is carried by a human user as he or she passes around some or all of the stockpile or that is otherwise moved around some or all of the stockpile—such a mobile device may, for example, include a digital camera that takes individual digital photo images and/or digital video consisting of successive frames of digital images (e.g., a camera that is carried by a human user; a body-mounted camera; or a vehicle-mounted camera, such as on a ground or aerial drone, a ground or aerial vehicle driven or piloted or guided by a human, a satellite, etc.), or a mobile device with communication and/or computing capabilities that also includes a digital camera or other digital image acquisition capabilities (e.g., a smart phone or other cell phone, a tablet computer, a pad computer, a slate computer, etc.). The calculation of object volume and/or other estimated object attribute measurements may be performed in various manners in various embodiments, including to generate a 3D (three-dimensional) computer model of the object from acquired images, as well as in some cases to generate one or more additional related computer models (e.g., of some or all of an underlying base surface on which the object is situated), and to perform various types of manipulations and/or analyses of the generated computer model(s). The described techniques may further include performing automated verification of such attribute measurements in various manners, such as based on analyzing one or more types of information that reflect accuracy and/or completeness of the computer model(s). Additional details related to acquiring images via mobile devices and to analyzing such images and resulting computer models in particular manners are described below, and some or all of the described techniques are performed in at least some embodiments by automated operations of a Mobile Device Image Analysis ("MDIA") system.

As noted above, after a group of images to represent an object has been acquired, automated operations are performed in at least some embodiments to analyze those images in the group by one or more object attribute measurement and verification components of the MDIA system (e.g., one or more MDIA system object attribute measurement and verification components that execute as part of a software application on the mobile device acquiring the images or on one or more remote server computing systems), such as an MDIA system Object Attribute Calculator component, as discussed in greater detail below with respect to FIG. 1 and elsewhere. In at least some embodiments, such automated operations include extracting data from the images to represent the object and an underlying surface in a 3D space, and using the extracted data to generate one or more computer models or other computer representations of the object and/or of some or all of the underlying surface (e.g., based on visible portions of the surface surrounding the object), such as a 3D point cloud model, a bare earth model, a polygon mesh model, a TAD representation, one or more surface models (e.g., based on piecewise planar functions, collections of triangles, meshes, NURBS, or non-uniform rational B-splines; T-Splines; or other curved representations of surface topology) or other solid models, etc. Such generated models may then be used to determine one or more of various characteristics of the object, including to calculate the object volume and/or to estimate other attribute measurements, to determine contour lines for the object surface and otherwise identify surface attributes, to determine a type and/or class of material of the object, to determine color information and/or other surface feature information (and to optionally modify one or more of the generated models to include and display such information), etc. Non-exclusive examples of attributes of an object that may be calculated or otherwise estimated include volume, surface area, height (e.g., maximum height, an average height, etc.), length (e.g., maximum length along a longest identified radial axis, average length in one or more directions, etc.), width (e.g., maximum width along a radial axis perpendicular to the longest identified radial axis in the x-y plane, average width in one or more directions, etc.), weight (e.g., based on volume and a unit weight for a specified amount of a determined material for the object), radioactivity (e.g., based on volume and a unit radioactivity for a specified amount of a determined material for the object), monetary value or cost (e.g., based on volume and a unit value/cost for a specified amount of a determined material for the object), etc. Additional details are included below related to techniques for calculating an object volume and/or determining other types of object information.

As is also noted above, after one or more computer models are generated to represent an object and optionally at least some of an underlying surface on which the object is situated, automated operations are performed in at least some embodiments to verify attribute measurements produced from the computer model(s), such as based on analyzing one or more types of information that reflect accuracy and/or completeness of the computer model(s). As one non-exclusive example, a degree of confidence in the completeness and accuracy of the object's generated computer model may be calculated as part of verifying a volume measurement and/or other attribute measurement(s) resulting from that computer model, such as by calculating or otherwise assessing a score (e.g., based on a percentage or an amount) of the object's volume and/or surface area that is represented in the computer model by data acquired from the images (e.g., by 3D data points from the acquired images) rather than by interpolation or other estimation, and determining if the assessed amount(s) satisfy one or more first defined model coverage thresholds. As another non-exclusive example, a degree of confidence in the boundary that is identified between the object and the underlying surface and in the accuracy and completeness of a corresponding generated computer model of the underlying surface may be calculated as part of verifying a volume measurement and/or other attribute measurement(s) resulting from the generated computer model(s), such as by calculating or otherwise assessing a score (e.g., based on a percentage or an amount) of the determined boundary having surrounding, adjacent surface with a sufficiently low slope relative to that of the overall underlying surface, and determining if the assessed amount satisfies one or more second defined boundary accuracy thresholds. Such automated verification techniques and/or various additional automated verification techniques may be used together in any combination or alone in varying embodiments, as discussed in greater detail below.

Various activities may be performed in various manners as part of automatically determining a degree of confidence in the completeness and accuracy of the object's generated computer model, along with the resulting attribute measurements, based at least in part on an estimated or otherwise approximated amount (e.g., percentage) of the object's volume and/or surface area that is represented in the computer model by data acquired from the images. In some embodiments, the assessment of the amount of the object's volume and/or surface area that is represented in the computer model by image-acquired data begins by creating a 2D grid of M×N cells in the X and Y dimensions (e.g., with each cell being 1 centimeter, or "cm", by 1 cm; 5 cm by 5 cm; 1 cm by 5 cm; 20 cm by 20 cm; 1 meter, or "m", by 1 m; etc.) along the bottom of the modeled object (or more generally along a plane at or near the bottom of the modeled object), such that the modeled surface of the object is above the 2D grid—the M and N distances used for each cell may be constant in at least some embodiments for a particular grid so as to produce a regular grid, and with the M and N values being the same as each other or different, as well as being configurable in different embodiments and situations (e.g., automatically selected by the MDIA system, such as based at least in part on the size of the object and/or a type of acquisition method of the images; configured by an end user on whose behalf the object is being modeled; etc.). For each cell in the 2D grid, a portion of the modeled surface of the object that is above the cell is identified and examined to determine how many data points acquired from the corresponding images are present in the generated computer model for that cell's portion (e.g., how many data points are present in that portion of a 3D computer mesh representing the object surface), and the cell is then identified as being sufficiently supported by the image data if the number of data points satisfy a defined data amount threshold (e.g., one data point, five data points, etc.), and is otherwise identified as not being sufficiently supported by the image data.

After each cell in the 2D grid is identified as being sufficiently supported by the image data or not, the sufficiently supported cells may be used to determine a confidence in the generated computer model for the object, and in resulting object surface area measurements and/or object volume measurements determined from the generated computer model. For example, with respect to surface area of the generated computer model, a percentage or other amount of the total M×N cells in the 2D grid that are sufficiently supported may be calculated, and a determination may be made regarding whether that percentage or other amount satisfies (e.g., reaches or exceeds) a defined surface area model coverage threshold (e.g., 60%, 70%, 80%, 90%, 95%, etc.), with the surface area measurement optionally being determined to be verified if that defined threshold is satisfied.

In a similar manner, the percentage or other amount of the total M×N cells in the 2D grid that are sufficiently supported may be used as part of determining a confidence in the volume measurement resulting from the generated computer model. For example, if the 2D grid is extended to a 3D grid having cells of height L in the Z dimension (creating a 3D grid of M×N×L cells), with each 2D M×N cell extended upward to the modeled surface of the object above the cell (e.g., having a column of Z 3D cells for a particular 2D cell whose distance from the underlying plane to the modeled object surface is approximately Z*L), such a 2D cell that is sufficiently supported represents a quantity of Z 3D M×N×L cells that can be considered to be sufficiently supported, while another such 2D cell that is not sufficiently supported can be considered to represent a quantity of Z' 3D M×N×L cells that are not sufficiently supported if that other 2D cell has Z' 3D cells in its column (e.g., with the quantity of 3D cells in the column above each 2D cell varying based on a height of the modeled object surface above that 2D cell). Accordingly, a percentage or other amount of the total M×N×L 3D cells in the 3D grid that are sufficiently supported may be calculated in this manner, and a determination may be made regarding whether that percentage or other amount satisfies (e.g., reaches or exceeds) a defined volume model coverage threshold (e.g., 60%, 70%, 80%, 90%, 95%, etc.), with the volume measurement optionally being determined to be verified if that defined threshold is satisfied. In this manner, a confidence in the surface area measurement and/or volume measurement for a generated computer model for an object may be calculated, such as to verify those attribute measurement(s).

While discrete 2D M×N cells are formed and used when determining a confidence in the generated computer model(s) for the object as part of the techniques discussed above, it will be appreciated that object volume and/or object surface area may be calculated and/or verified in other manners in other embodiments. For example, if the surface of the object is represented with a continuous function, the volume of the object may be determined by integrating that function. Such integration may be approximated using the techniques described above by using increasingly small values for M and N, and thus an integrated object volume and surface area may be determined to a desired degree of approximation by reducing the sizes of M and N accordingly, and/or the volume may be solved for analytically. In addition, if data acquired from the images is represented in forms other than data points (e.g., curves, non-point areas, etc.), similar techniques can be used to determine a percentage or other amount of coverage of the generated continuous surface and/or resulting volume of the object from such acquired data, with model coverage thresholds similar to those discussed above (whether the same or different threshold amounts) being used to determine whether such percentages or other amounts satisfy those thresholds.

In addition, while a quantity of data points (or other measure of the amount of image-acquired data) in the generated computer model(s) for a given subset of the object's overall surface area (e.g., the subset representing the surface area above a defined 2D cell) may be used in some embodiments as part of determining a degree of confidence in resulting surface area and/or volume measurements, other techniques may be used in other embodiments to determine an amount of coverage of the image-acquired data for the generated computer model(s). For example, when determining confidence in a volume measurement using a 3D grid of M×N×L cells as discussed above, techniques may instead be used to determine a probability or other likelihood that some or all such cells are part of the actual object being modeled, and optionally further determining whether such a cell is considered to be sufficiently supported by the image-acquired data (e.g., based on whether such a determined probability or other likelihood for the cell satisfies a defined cell likelihood threshold). Furthermore, the probabilities or other likelihoods determined for the various cells in the grid may then optionally be combined to determine an overall probability or other likelihood of the overall generated computer model(s) being sufficiently covered by the image-acquired data (e.g., based on a combined overall probability or other likelihood satisfying a defined model likelihood threshold). Such techniques for determining the probability or other likelihood that a particular cell is part of the object being modeled may include, for example, using ray tracing from the camera location for each image to determine a likelihood that a cell is included in the actual object, calculating maximum and/or minimum heights for a column of 3D cells whose upper surface is not directly observed in the image-acquired data (e.g., based on heights of other portions of the object between a camera location and the column and/or behind the column location), etc. Additional details are included below regarding automatically determining probabilities or other likelihoods that some or all 3D grid cells are part of the actual object being modeled, as well as more generally automatically determining a degree of confidence in the accuracy of an object's generated computer model and its resulting attribute measurements.

Various activities may also be performed in various manners as part of automatically determining a degree of confidence in the accuracy and completeness of a boundary between an object and its underlying surface and/or in the accuracy of a generated computer model of the underlying surface, along with the resulting attribute measurements, based at least in part on an estimated or otherwise approximated amount (e.g., percentage) of the determined boundary having surrounding, adjacent surface with a sufficiently low slope relative to that of the overall underlying surface. In some embodiments, the assessment of the amount of the determined boundary having surrounding, adjacent surface (referred to at times herein as "toe") with a sufficiently low slope begins by generating an initial estimate of the base surface, and determining the edges of the modeled object that appear to intersect that estimated base surface based on the image-acquired data. The initial estimate of the base surface may include, for example, first identifying portions of some or all of the acquired images that are separate from the object being modeled (e.g., based on associated 3D position, color, etc. of those portions of the acquired images), such as at or near one or more of the edges of such an image (depending on the camera location and orientation), then determining associated 3D data points (or other acquired data representations) for those identified portions of the images, and subsequently fitting a plane or other shape to those associated 3D data points or other acquired data representations to form the initial estimated base surface.

After determining the initial estimated edges of the modeled object that intersect this estimated base surface, the portions of the modeled object that are above the estimated base surface by a determined distance (e.g., 1 cm; 5 cm; 20 cm; 50 cm; 1 m, etc.) are then identified as part of a search ring to be further examined as part of verifying the object boundary. Various starting points along the top of the search ring are selected (e.g., with each such starting point separated by adjacent starting points by a defined distance), and a determination is then made for each starting point of the slope of the surrounding area outside the object's boundary, such as by moving down the search ring toward the initial estimated base surface and identifying a point of maximum positive or convex curvature (or alternatively using the bottom of the search ring if no convex curvature is identified) at which the object begins to smooth out as the toe is approached. A new object edge or boundary may then be designated as beginning at a location beyond that identified curvature point (e.g., immediately beyond that point; at a location beyond that identified point at which the slope passes below a defined first slope threshold, such as 0.1 or 0.2; etc.). All further points beyond or below that designated object edge or boundary are similarly identified as being outside the object's boundary.

After identifying the areas outside the object's designated boundary in this manner, a further analysis is then performed of the slope for such identified exteriors areas, to identify a percentage or other amount of such identified areas around the perimeter of the object that have a slope below a defined second slope threshold (whether the same as or different from the defined first slope threshold), as such external surface areas outside the object having slopes exceeding that slope threshold may be considered to represent areas in which the object boundary is uncertain. Accordingly, a percentage or other amount of toe surface area adjacent to and outside the overall object boundary with a sufficiently low slope may be calculated, and a determination may be made regarding whether that percentage or other amount satisfies (e.g., reaches or exceeds) a defined boundary accuracy threshold (e.g., 60%, 70%, 80%, 90%, 95%, etc.), with the object's boundary and resulting attribute measurements of the computer model(s) optionally being determined to be verified if that defined threshold is satisfied. In this manner, a confidence in the designated object boundary for a computer model of an object may be calculated, such as for use in verifying the resulting attribute measurement(s) from the computer model.

While particular techniques are discussed above for estimating an initial boundary of an object and for using slope to further designate the object boundary and to assess a confidence in that designated boundary based at least in part on the surface area surrounding the boundary, it will be appreciated that other techniques may be used in other embodiments to determine a confidence in an object's boundary in corresponding generated computer model(s), including in manners other than based on slope. Additional details are included below regarding automatically determining a degree of confidence in the boundary between an object and its underlying surface and/or in the accuracy of a generated computer model of the underlying surface, along with the resulting attribute measurements from the computer model.

In addition, additional automated operations to perform other types of verifications of generated computer model(s) of objects and/or of resulting object attribute measurements may be used in at least some embodiments, whether in addition to or instead of automated operations to determine confidence in surface area coverage, volume coverage and/or object boundaries as discussed above. As one non-exclusive example, another type of verification that may be performed in some embodiments includes analyzing images of an object to determine if the object is covered or otherwise blocked at least in part by vegetation or other extraneous materials that obscure the underlying surface of the object, such as by analyzing colors, textures, etc. of the images to identify such extraneous materials, and then determining a percentage or other amount of the surface covered by such extraneous materials (as such extraneous materials may reduce or prevent an ability to identify the actual surface of the object). As another non-exclusive example, another type of verification that may be performed in some embodiments includes analyzing images of an object to determine if water or other materials (e.g., snow, ice, leaves, vegetation, etc.) are covering or otherwise blocking at least part of the surface area of the toe that immediately surrounds the object exterior, such as by analyzing colors, textures, etc. of the images to identify such extraneous materials, and then determining a percentage or other amount of the toe surface area covered by such extraneous materials (as such extraneous materials may reduce or prevent an ability to identify the actual base surface surrounding the object and on which the object is situated). As yet another non-exclusive example, another type of verification that may be performed in some embodiments includes analyzing images of an object to determine if at least a portion of one or more other objects are adjacent to or overlapping with the object being modeled, so as to cover or otherwise block at least part of the object, such as by analyzing colors, textures, etc. of the images to identify such other adjacent and/or overlapping objects, and then determining a percentage or other amount of the object or its boundary that are adjacent to and/or overlap with such other objects (as such other adjacent and/or overlapping objects may reduce or prevent an ability to identify actual portions of the object being modeled). Various techniques may further be used in some embodiments to identify such extraneous materials on an object, such extraneous materials surrounding an object, and/or such other adjacent and/or overlapping objects, including using machine learning to classify portions of images and the materials that they depict (e.g., by generating and training a vegetation model to detect whether a portion of an object's surface is covered or otherwise obscured at least in part in one or more images by vegetation growing on the object, for later use in calculating a percentage of the object's surface that is covered by such vegetation; by generating and training a water model to detect whether a portion of adjacent toe surface around an object is covered or otherwise obscured at least in part in one or more images by water on that toe surface, for later use in calculating a percentage of the adjacent toe surface that is covered by such water; by generating and training an overlapping pile or other object model to detect whether a portion of an object's surface is covered or otherwise obscured at least in part in one or more images by one or more other objects that overlap in part with the object being modeled, for later use in calculating a percentage of the object's surface that is covered by such overlapping objects; etc.), or more specifically to identify one or more particular defined situations as discussed above. For example, occluding objects can be identified by analyzing the 3D point cloud (or other computer representation) of a target object being modeled. By doing so, other extraneous object that are not part of the target object being modeled may be identified by analyzing their connectivity to the modeled surface of the target object, such as to detect that corresponding 3D points for the extraneous objects are above the target object (e.g., if multiple different surfaces are found moving vertically for a particular point on the underlying surface) and to label the extraneous objects accordingly (e.g., as non-target object obstacles). These groups of points can further be analyzed and classified into different classes of occluding extraneous objects, for example vegetation, construction equipment, etc., such as by corresponding image-based classifiers. Similarly, the 3D point cloud (or other computer representation) of a target object may be analyzed for subsets that are shaped like vegetation (e.g., leaf structures, etc.). It is also appreciated that the obstacle detection can use the 3D point cloud and the images to analyze the obstructing objects using both their 3D geometry and their appearance information in the images. This can, for example, be achieved by combining the point cloud analysis and the image based classifiers. Additionally, instead of the point cloud, such a classifier could use depth (or equivalent disparity) map information to infer 3D point and appearance information for the classifier. The operation of such classifiers can be initiated and/or improved by, for example, performing learning of one or more particular types of occluding extraneous objects from training data of the same site of the target object or other sites. Additional details are included below regarding performing other types of verifications of generated computer model(s) of objects and/or of resulting object attribute measurements.

As noted above, automated operations for verification activities (such as to verify attribute measurements based on one or more of the boundary between an object and the underlying surface, data coverage of an object's surface area or volume, other types of verifications of generated computer model(s) of objects and/or of resulting object attribute measurements, etc.) may be used alone or together in varying embodiments. For example, if both a degree of confidence in the data coverage of an object's volume and a degree of confidence in the boundary between an object and the underlying, surface are determined, such determined confidence values may be combined in various manners, such as based on a weighted combination (e.g., with weights being defined by an end user, being defined by an operator of the MDIA system, being automatically determined by the MDIA system, etc.), by determining respective contributions of the determined confidence values to an overall probability or other likelihood of accuracy of one or more attribute measurements produced from corresponding generated computer model(s), etc. More generally, any combination of two or more such automated verification activities may similarly be combined in various embodiments, while in other embodiments and situations only a single type of verification activity may be performed.

In addition, after the process of calculating an object volume and/or determining other types of object information has been completed, further automated operations may be performed by one or more components of the MDIA system to provide information about determined object attribute measurements and/or about automated verification of such object attribute measurement(s), such as by an MDIA system Recipient Interactor component as discussed in greater detail below with respect to FIG. 1 and elsewhere. For example, when the analysis of an object is performed by the MDIA system on behalf of a client of the MDIA system (e.g., in exchange for fees charged by the MDIA system to the client), the MDIA system may generate one or more reports for the client or otherwise provide corresponding information to the client. Such reports or other information may, for example, be provided in a manner specified by a client, and may be delivered to the client in various manners (e.g., sent to the mobile device or an associated computing device of the operator for display; retrievable by an authorized user of the client from one or more server computing systems of the MDIA system; printed or otherwise distributed in non-electronic manners; etc.).

The automated operations performed to verify volume measurements or other attribute measurements may in at least some embodiments include various additional interactions with one or more end users (e.g., clients of the MDIA system or their representatives), such as end users who have or will receive information about the attribute measurements. Such interactions may include, for example, receiving information from an end user about one or more types of verification activities to perform for attribute measurements and/or about configuration of how to perform such verification activities, such as threshold values to use as part of the verification activities. Such interactions may also include, for example, receiving additional input from the end user to supplement information used to generate the computer model(s), such as one or more of the following: information about portions of the object, such as based on specialized knowledge of the end user about portions of the object that are not visible or otherwise not covered in the acquired images (e.g., a shape of a top of an object that is higher than a level of the camera during image acquisition and not covered in the acquired images, valleys or other lower areas of the object's surface that are blocked by higher closer portions of the object, portions of the object's surface that are blocked by intervening objects that are not part of the object being modeled, interior holes or other external objects that are within the object being modeled but not visible from the images being acquired, etc.), based on information that the end user may be adept at identifying in images (e.g., by providing user input on a touch-sensitive screen or using other input techniques for one or more displayed images of an object to specify particular types of information of interest, such as a boundary of the object, areas of vegetation or other extraneous materials on the surface of the pile, areas of other objects or materials between the camera and the object that are blocking portions of the object, areas of water or other extraneous materials on the surface adjacent to or near the object, areas of adjacent or overlapping other objects that may obscure portions of the object being modeled, etc.), etc.; information about portions of the underlying surface on which the object being modeled is situated that are not visible under the object (e.g., holes or other depressions in the surface, hills or bulges or other protrusions in the surface, etc.); etc. Such information from the end user may then be used to modify the generated computer model (e.g., to supplement and/or override image-acquired data) and/or to assess the accuracy of corresponding portions of the computer model. Such end user interactions may further include, for example, receiving instructions from the end user to override an automated verification (or lack thereof) of a volume measurement and/or other attribute measurements or to otherwise specify such a verification or lack thereof, such as based on specialized knowledge of the end user—such receiving of end user input may include accepting a verification or lack of verification by the end user of the attribute measurement(s), receiving a determination by the end user of a verification or lack of verification of the attribute measurement(s) to use (e.g., instead of an automated determination from the verification activities), etc. In addition, to assist the user in providing such input, various types of computer-generated information may be displayed or otherwise provided to the user, such as a 3D rendering of an object showing one or more of the following: contour lines; a determined object boundary, and optionally areas of surrounding toe with a slope that is too high; an object surface, and optionally corresponding image-acquired data, as well as areas in which there is not sufficient data coverage for volume and/or surface area measurements; etc. Additional details are included herein related to techniques for interacting with an end user, including adjusting automated determination activities by the MDIA system and/or automatically determined information from the MDIA system based on corresponding input from the end user.

In addition, the information that is determined for one or more objects may in some embodiments and situations be used in manners other than to provide corresponding information to a client of the MDIA system, such as to provide information about particular objects and/or aggregated information about multiple objects (e.g., objects in a geographic area, objects of a particular type, etc.) to one or more external entities that do not own the objects being modeled or initiate the modeling of the objects (e.g., in exchange for fees charged by the MDIA system to the external entities).

Additional details are included below related to techniques for generating and providing information about objects of interest to clients and/or other entities.

While some of the example embodiments discussed herein include a stockpile or other pile of material, other types of objects may be assessed in a similar manner in at least some embodiments, including buildings and other man-made structures, holes or other cavities in the ground or other negative spaces, etc. Furthermore, an object of interest being assessed may be of various types of materials, such as for a stockpile or other pile to include materials of various types and sizes (e.g., construction aggregates, grain or other product, sawdust, logs, tires, trash, recyclable materials, etc.). In addition, images that are acquired may be of various types and resolutions, including still images and/or video image frames, and may capture various types of light or other energy (e.g., visible light, infrared, ultraviolet, radioactivity, etc.).

Furthermore, while some of the example embodiments discussed herein include analyzing a single object at a single time, the described techniques may be used in other manners in some embodiments. For example, a single object may be analyzed at different times, such as to further enable relative information for the object to be determined over time (e.g., to determine how a stockpile object grows and/or shrinks over time with respect to volume or one or more other attributes), with corresponding information made available to a client and/or used for further automated determination of related information. In addition, in at least some embodiments, multiple objects (e.g., nearby, on top of each other in whole or in part, behind or in front of each other in whole or in part, etc.) may be analyzed together in a series of images that are acquired, such as by traversing all of the multiple objects, and optionally traversing other portions of individual objects (e.g., for objects on top of each other in whole or in part).

In addition, during the acquisition of a series of digital images of an object of interest, various types of user feedback and/or other instructions may in some embodiments be provided to a human user who is operating the mobile device acquiring the digital images, such as based on monitoring quality and/or other aspects of some or all of the digital images being acquired, including to assist the human user in improving future digital images to be acquired. The selection of particular images to use from a series of digital images of an object of interest may also be performed in various manners in various embodiments, including to select a subset of the digital images of the series while the digital images are being acquired and/or after all of the digital images are acquired, such as based on measured quality and/or other assessments of the selected images. Additional details regarding such image selection and user feedback and instruction are included below.

For illustrative purposes, some embodiments are described below in which specific types of images are acquired for specific types of objects, and in which specific types of object attributes are estimated in particular manners. However, it will be understood that such described techniques may be used with other types of objects and images and for other types of object attributes in other manners in other embodiments, and that the invention is thus not limited to the exemplary details provided.

FIG. 1 is a diagram illustrating an example embodiment of an MDIA ("Mobile Device Image Analysis") System 160 that may be used to provide functionality to one or more clients related to the analysis of images acquired via mobile devices, such as to calculate volume or otherwise measure attributes of interest of one or more objects included in the acquired images, and/or to automated operations to verify such attribute measurements. The MDIA System 160 may be provided via one or more network-accessible configured devices, whether via one or more configured server computing systems or other configured systems (not shown) that are remote from a user representative 105 of a client, and/or based on configured use of one or more mobile devices 110 used by the user representative 105. A server computing system in such an example may include any computing device or system that may receive data and/or requests, and take corresponding actions (e.g., store the data, respond to the request, etc.), as discussed in greater detail elsewhere herein.

In particular, in this example, a user representative 105 is carrying a mobile device 110 that includes image acquisition capabilities (e.g., one or more cameras) and includes communication capabilities to enable a transmission 185 of information from the mobile device 110 to other systems (e.g., other remote server computing systems providing at least some of the MDIA System 160), such as via a cellular telephone network or other transmission method. In other embodiments, the image data that is captured by such a mobile device 110 may be provided to other systems in other manners, such as via a physical cable or other physical connection (e.g., after the image acquisition for an object in an environment is completed). In addition, in some embodiments, some or all of the image data captured by a mobile device 110 may be first transmitted to another nearby computing device, such as another nearby computing device carried by the operator or located in a nearby location (e.g., a nearby vehicle or building), and then transmitted from the nearby computing device to one or more remote server computing systems or other remote systems—such a transmission from the mobile device to the nearby computing device may occur, for example, via a physical connection (e.g., a cable, wire or other connector), via a wireless transmission (e.g., Bluetooth, infrared, near field communications, a wireless transmission mechanism with a limited transmission range, etc.), etc. Furthermore, while the mobile device acquiring images is in this example carried by a human user, in other embodiments some or all of the images that are acquired may be acquired in other manners, whether in addition to or instead of such a human user, such as via one or more mobile devices that are carried by or otherwise part of one or more of automated aerial drone(s) 181, human-piloted aircraft(s) 183, ground vehicle(s) 188 (whether automated drone or with human pilots), satellite(s) 186, etc.

In this example, a stockpile object 150 (e.g., consisting of construction aggregate material) is shown, such as in an outdoors environment, and the user representative 105 is proceeding to encircle some or all of the exterior of the stockpile object 150 in order to obtain various images of the stockpile exterior. For example, the user may travel a path 115 around the exterior of the object, whether based on a path selected wholly by the user or instead based at least in part on user feedback or instructions provided by the MDIA System 160 to the user. The user and/or the mobile device may further acquire a variety of images to encompass the exterior of the object during the travelling of the path. As one example, the user may occasionally manually activate the image acquisition capabilities of the mobile device 110, such as at a variety of locations 120 around the exterior along the traversal path 115. As another example, the user may travel the path 115 and the mobile device may automatically acquire such images at such locations, such as based on a period of time elapsing since the last image, a distance traveled by the user since the last image, or other information related to the images that have been previously captured. Alternatively, the mobile device may acquire image data in a continuous or substantially continuous manner, such as to shoot video that includes successive image frames in rapid succession (e.g., 30 frames a second, 1 frame a second, 1 frame every 5 seconds, etc.). Thus, for example, various of the images acquired may instead occur at relatively close intervals, such as those illustrated with respect to locations 125 (while the locations 125 are not illustrated throughout the entire exterior of the object, it will be appreciated that such substantially continuous image acquisition may be performed at the same rate for some or all of the traversal of the object exterior).

The mobile device 110 may further transmit some or all of the acquired images to the MDIA System 160, such as via transmission 185 over one or more networks 180, including to be stored in image data 162. After a group of images have been selected to represent an object, the MDIA System 160 may further perform processing to generate one or more models or other representations to represent the object, such as a 3D point cloud model, a bare earth model, a surface model, etc., and may store corresponding information in model data 163. After the one or more models have been generated, the MDIA System 160 may further estimate or otherwise measure one or more attribute values for the object 150, and store such information with attribute data 164. In addition, one or more clients of the MDIA System 160 may provide various client data 161 to the MDIA System 160, such as related to types of data of interest to be generated for the client. Such clients and their authorized representative users may, for example, use various client computing systems 190 to communicate with the MDIA System 160 over one or more networks 180, such as to perform registration activities and/or to obtain results of object attribute measurements performed for the client. The data 161-164 may be stored in various manners, such as all or in part on the mobile device 110, all or in part on one or more server computing systems remote from the mobile device 110, on one or more storage systems separate from the configured devices that execute some or all of the components of the MDIA System 160, etc.

The MDIA System 160 in this example includes various components 171-179, which may perform various automated operations of the MDIA System 160. In some embodiments, some or all of the components 171-179 may execute on one or more server computing systems (or other computing systems) remote from the object 150, while in other embodiments one or more of the components 171-179 may instead execute on one or more configured devices of the user representative 105, including the mobile device 110. For example, the Image Quality Monitor component 171, Operator Feedback Provider component 172, and Image Selector component 173 may optionally be grouped as part of an image acquisition sub-system 168 of the system 160, with some or all of those image acquisition components being executed on the mobile device. In addition, the Model Generator component 174, Object Attribute Calculator component 175, Model Verifier component 177, Attribute Verifier component 178 and Recipient Interactor component 179 may optionally be grouped as part of an object attribute measurement and verification sub-system 169 of the system 160, with some or all of those object attribute measurement components being executed on one or more server computing systems remote from the mobile device. It will be appreciated that the functionality of the MDIA System 160 may be structured in other manners in other embodiments, including to have more or less components and/or to have more or less functionality than is described in this example.

The Image Selector component 173 may be configured to perform automated operations to select some or all of the images that are acquired by the mobile device 110, for use as the group of images to represent the object 150, whether concurrently with the acquisition of the images or after all of the images have been acquired—if the Image Selector component 173 executes on the mobile device 110 (or other device of the user 105 that is associated with the mobile device 110, such as a smart phone that obtains image data from a mobile device camera and transmits the image data to remote servers), and if image data for object 150 is to be transmitted over the network(s) 180 to one or more remote server computing systems, the amount of bandwidth used for the transmission may be reduced in such a situation, as only the selected group of images (or information extracted from the images of the selected group and/or from other images) may be transmitted. In other embodiments, all of the acquired images (or all that satisfy minimum quality standards) may instead be transmitted to one or more remote server computing systems for further analysis, including in embodiments in which the Image Selector component 173 executes on those remote server computing systems and selects some or all of the acquired images after the item acquisition session has been completed.

The Image Quality Monitor component 171 may be configured to perform further automated operations for acquired images in at least some embodiments, such as to monitor image quality with respect to one or more metrics of interest, and to take corresponding actions if sufficient quality is not sustained. In addition, the component 171 may in some embodiments assist in providing feedback or other instructions to the user related to image quality problems that are detected if the component 171 executes concurrently with the image acquisition, such as by providing corresponding information to the Operator Feedback Provider component 172. For example, the Operator Feedback Provider component may be configured to perform further automated operations that include providing feedback to the user in various manners while the user 105 is travelling the path 115, such as when image quality problems are detected or to provide other types of information.

The Model Generator component 174 may be configured to perform further automated operations to, after the group of images to represent the object 150 has been selected and are available in the image data 162, analyze the images of the selected group and generate one or more corresponding models or other representations, such as to generate a point cloud model for the object, to apply a bare earth model and/or a surface model to the point cloud model, etc. In some embodiments and situations, some or all of the generated models may be 3D models (e.g., for a point cloud model), while in other embodiments and situations, some or all of the generated models may have other forms (e.g., 2½D representations)—use of the term "model" herein is intended to include any representation of data for an object, unless otherwise indicated. The Object Attribute Calculator component 175 may be configured to perform further automated operations to, after the one or more models are generated, use the generated model(s) to measure values for one or more attributes of interest of the object 150, such as a volume attribute or other related attributes.

The Model Verifier component 177 and/or Attribute Verifier component 178 may be configured to perform further automated operations to verify generated computer model(s)

and/or object attribute measurements produced from such computer model(s). As discussed in greater detail elsewhere herein, such automated operations may include analyzing one or more types of information that reflect accuracy and/or completeness of the computer model(s) and their resulting object attribute measurements, such as to verify data coverage of a computer model of an object with respect to volume and/or surface area of the modeled object, and/or to verify boundary accuracy and completeness of a computer model of an object with respect to a separate underlying surface on which the object is situated.

After the attribute information of interest and/or attribute verification information is generated, the Recipient Interactor component 179 may then be used to provide corresponding information to the client, such as by generating a report that includes results information and sending it to a client system 190 and/or the mobile device 110, or instead to provide such information in other manners (upon later request by the client, such as to enable the client to login to the MDIA System and to review results of previously analyzed objects). In addition, during or after the process of generating attribute information and/or verifying attribute information, the component 179 may in some embodiments perform various types of interactions with an end user, including to obtain various types of input from the end user that is subsequently used by the MDIA System 160 (e.g., by one or more of the object attribute measurement and verification components 169), as discussed in greater detail elsewhere herein.

While the example of FIG. 1 involves a single device (mobile device 110) and a single sensor (a camera or other imaging capability) to capture data regarding the object 150, in other situations and embodiments multiple devices and/or sensors may be used. As one example, different devices and/or sensors may be used to acquire different types of data (e.g., simultaneously), and the mobile device and/or remote server computing systems may combine or otherwise use such different types of data—non-exclusive examples of types of data that may be acquired include image data in one or more light spectrums, non-light energy data, location data (e.g., via GPS), depth or distance data to the object, color data, sound data, etc. In addition, in some embodiments and situations, different devices and/or sensors may be used to acquire the same or overlapping types of data (e.g., simultaneously), and the mobile device and/or remote server computing systems may combine or otherwise use such different types of data, including to determine differential information for a type of data. For example, the mobile device may include GPS capabilities (or other location determination capabilities), and one or more other devices in the environment (such as one or more devices in a fixed location) may similar include GPS capabilities (or other location determination capabilities), to enable a position of the mobile device at a given time to be determined more accurately by tracking relative differences in the differing GPS data (e.g., to eliminate minor transitory variations or fluctuations from a GPS satellite or other common source of the GPS data). Such differential information may similarly be determined for some or all of the other types of data that may be captured. In addition, information such as GPS data or other location data may further be used to determine additional information about an object, such as to assist in determining scale information for the object—as one example, location data at different locations on a path or other exterior around the object may be used determine information about the width and/or length of the object, whether alone or in combination with additional data about depth or other distance measurements of the mobile device (or other device or sensor) to the object at particular such locations.

It will be appreciated that the details discussed with respect to FIG. 1 are provided for illustrative purposes, and that the described techniques are not limited to these example details.

FIGS. 2A-2H illustrate various example images that may be acquired with respect to an object of interest (e.g., such as for the stockpile object 150 of FIG. 1), as well as corresponding analysis of the images that may be performed in at least some embodiments.

With respect to FIG. 2A, an example image 205a is shown, which includes a side view of an object 200, with the object in this example representing a stockpile of construction aggregate materials (e.g., object 150 of FIG. 1). The image 205a further includes additional information that is not part of the object 200, such as other objects 210 (in this example a tree and a cloud), a base surface 225 on which the object 200 and at least some other objects (e.g., the tree 210) rest, a horizon line 235, etc.—it will be appreciated that the surface 225 may in some situations be flat and level, while in other situations the surface may be sloped or otherwise irregular.

In addition, in this example, the exterior of the stockpile object 200 may include various visible aspects, at least some of which are shown in the image 205a, and which may be detectable via an automated analysis of the image. For example, the surface of the object 200 may have varying textures, colors, and shades (although colors and textures are not illustrated in this example, and shading is shown only with respect to feature 215e), such as to reflect a type of material of the object, position of the sun or other lighting source, an angle of the object surface with respect to the viewpoint location of the imaging device, etc. In addition, the surface of the object 200 may have various irregularities or other features that may be identified in the image and used to track changes between images—in this example, various example features 215 are illustrated. Such features may include, for example, points along a top of a silhouette or other outline 220 of the object, such as feature 215b at an overall peak of the object 200, and feature 215a that corresponds to a local high point of the outline. In addition, other example features include feature 215d along the outline 220 of the object 200, such as based on its distinctive shape, feature 215c along a ridge line 230 of the object surface 220 that is not part of the object outline (from this view), feature 215e that indicates a local cavity or indentation on a portion of the surface (with shading added to show that it may have a darker color relative to other surrounding parts of the surface), etc. While feature 215e provides one example of a feature on the surface of the pile, a variety of other types of surface features may similarly be identified and used, including, for example, based on differing colors, shading, textures, angles, curvature, lack of continuity, etc. between different locations on the surface; based on cavities, indentation, protrusions, protuberances, lines, or other shapes; based on changes from one material type to another; etc. It will be appreciated that a variety of types of features may be identified and selected in various manners, including in a manner specific to the type of image analysis that is performed.

Figure 2B:
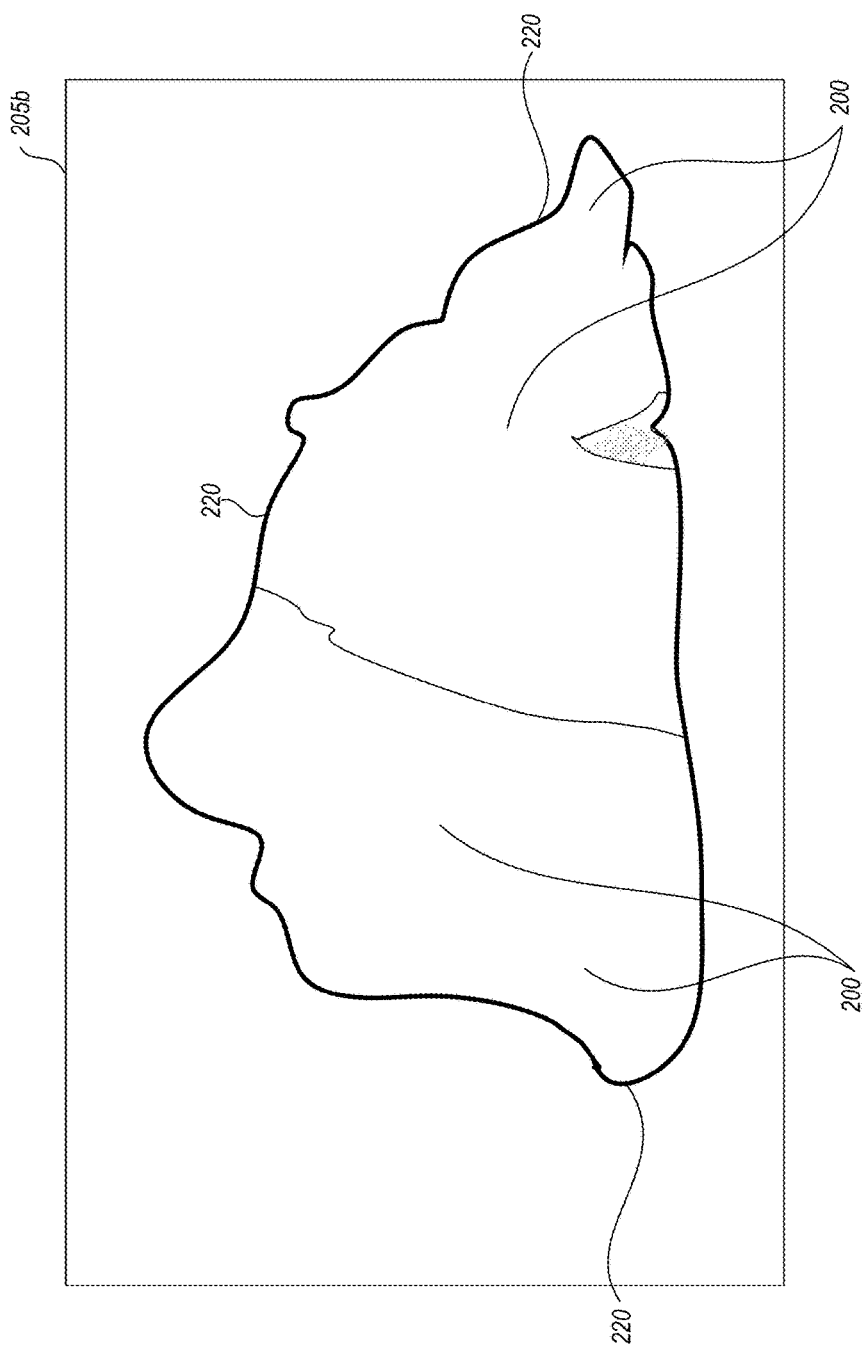

FIG. 2B continues the example of FIG. 2A, and in particular illustrates an example of an image 205b based on image 205a of FIG. 2A, but in which data for a portion of the image corresponding to the object 200 is shown, while data for other portions of the image have been removed, such as based on analysis of the image 205a. In other embodiments, such a separation of an object portion of the image from non-object portions of the image may not be performed at all, or may be performed at a time of generation of a corresponding model.

Figure 2C:
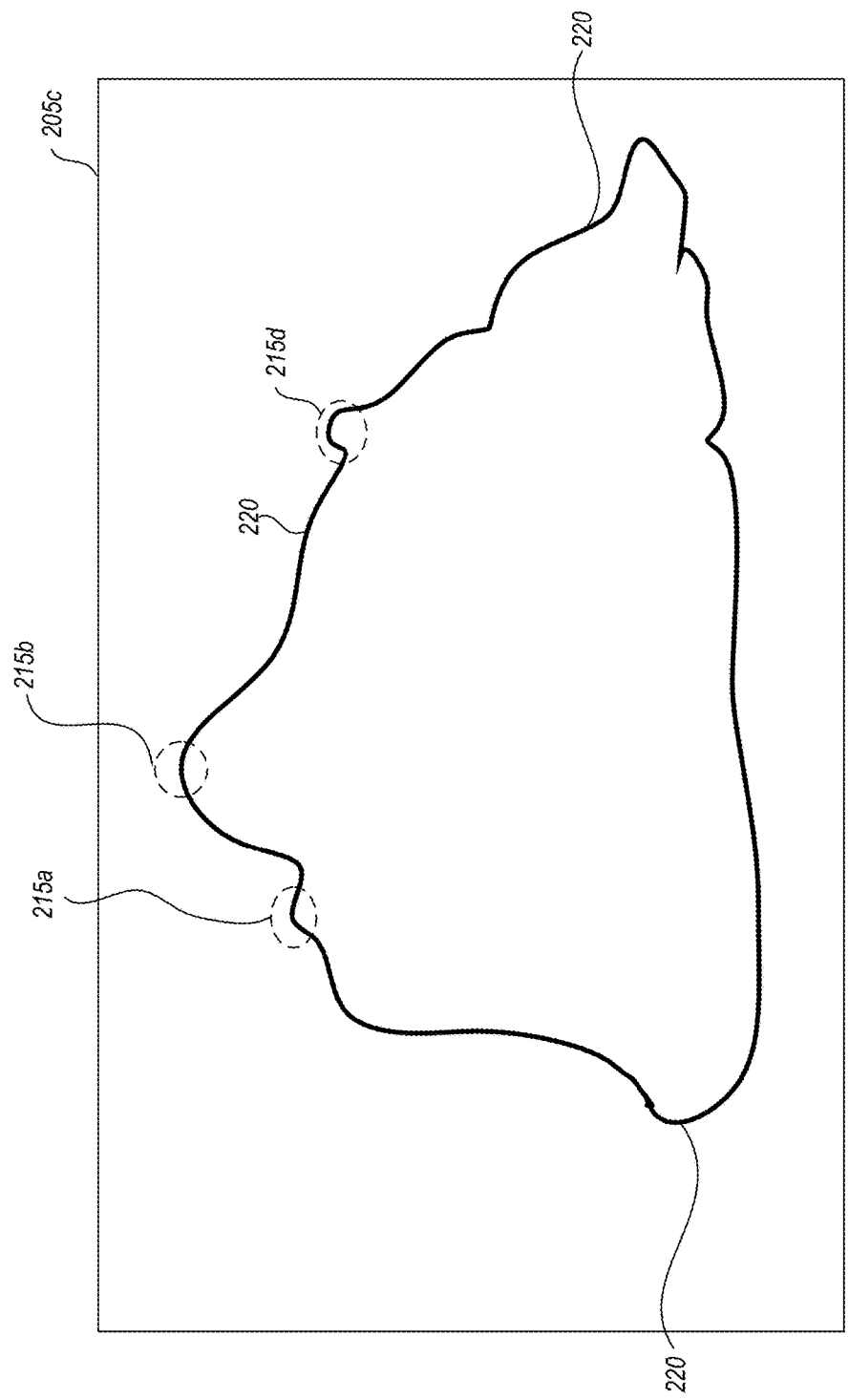

FIG. 2C continues the examples of FIGS. 2A-2B, and in this example illustrates an image 205c based on image 205a of FIG. 2A, but in which only a portion of the information about the object 200 is available. In particular, in this example, only outline or silhouette information 220 for the object 200 is shown, such as if lighting conditions prevent other surface features from being visible, and/or based on a type of image analysis (e.g., line detection) that is performed. It will be appreciated that some embodiments may not use such outline information, while other embodiments may do so. In this example, the outline information of FIG. 2C still allows some current features of the object to be identified, such as features 215a, 215b, and 215d—however, surface-related portions of the object are not visible in this example, such as ridge line 230 and features 215c and 215e.

Figure 2D:
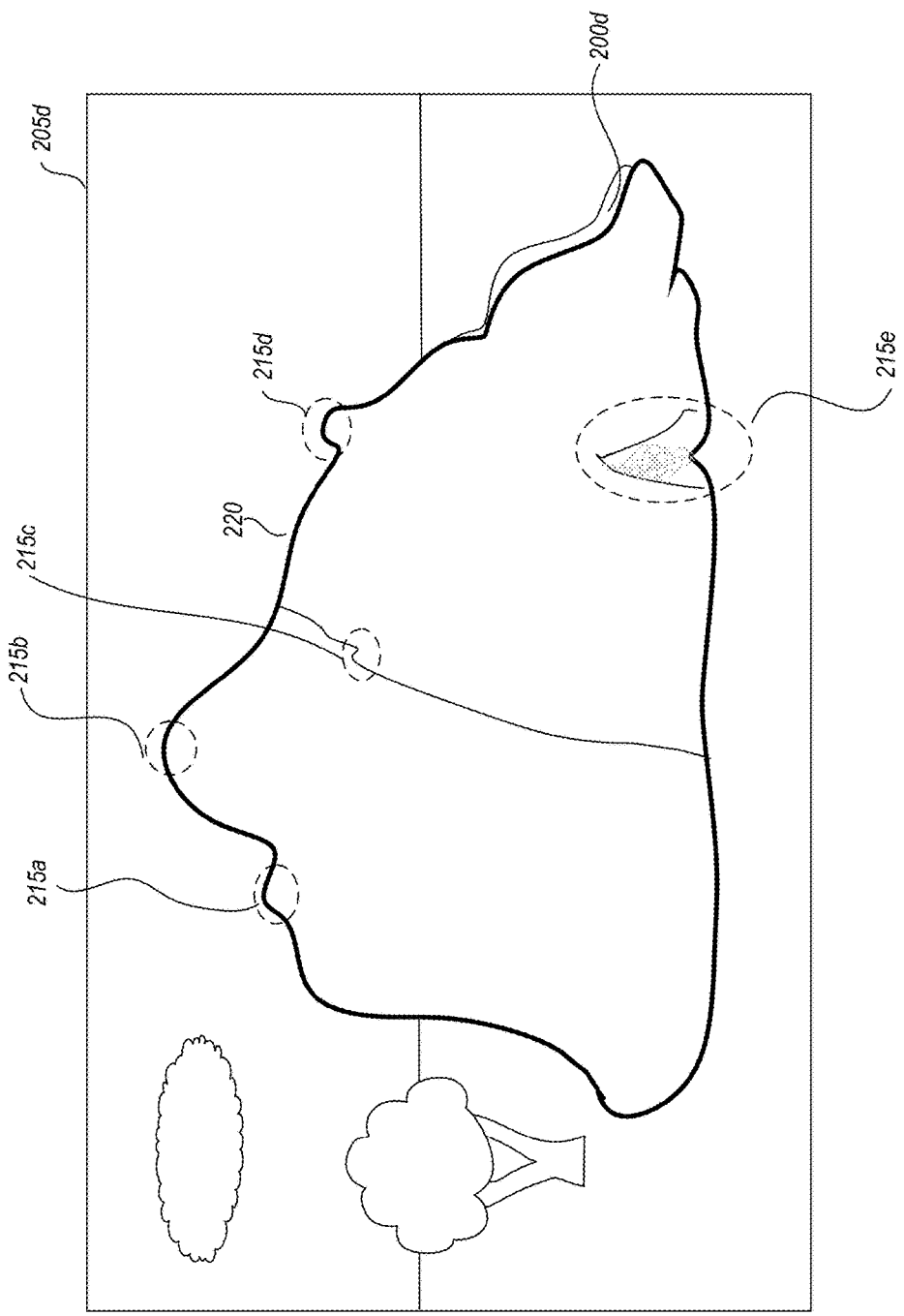

FIG. 2D continues the examples of FIGS. 2A-2C, and includes an example of a successive image 205d that may be acquired for the object 200 from a location very near that of the location at which image 205a of FIG. 2A was acquired, such as to correspond to one of the locations 125 illustrated in FIG. 1 relative to an initial starting location 120a (e.g., if image 205d is a digital image frame from a video taken by the mobile device that is near a frame corresponding to image 205a of FIG. 2A in the sequence of acquired frames). In the example of FIG. 2D, the image 205d varies only slightly as the user operator of a mobile device begins to move to the right, such as to illustrate a slight additional portion 200d of the object. Accordingly, at a time of image selection for the group of images to represent the object 200, only one of images 205a and 205d may be selected, such as due to a relatively small amount of additional information available in the second of the two images relative to the first of the two images.

Figure 2E:
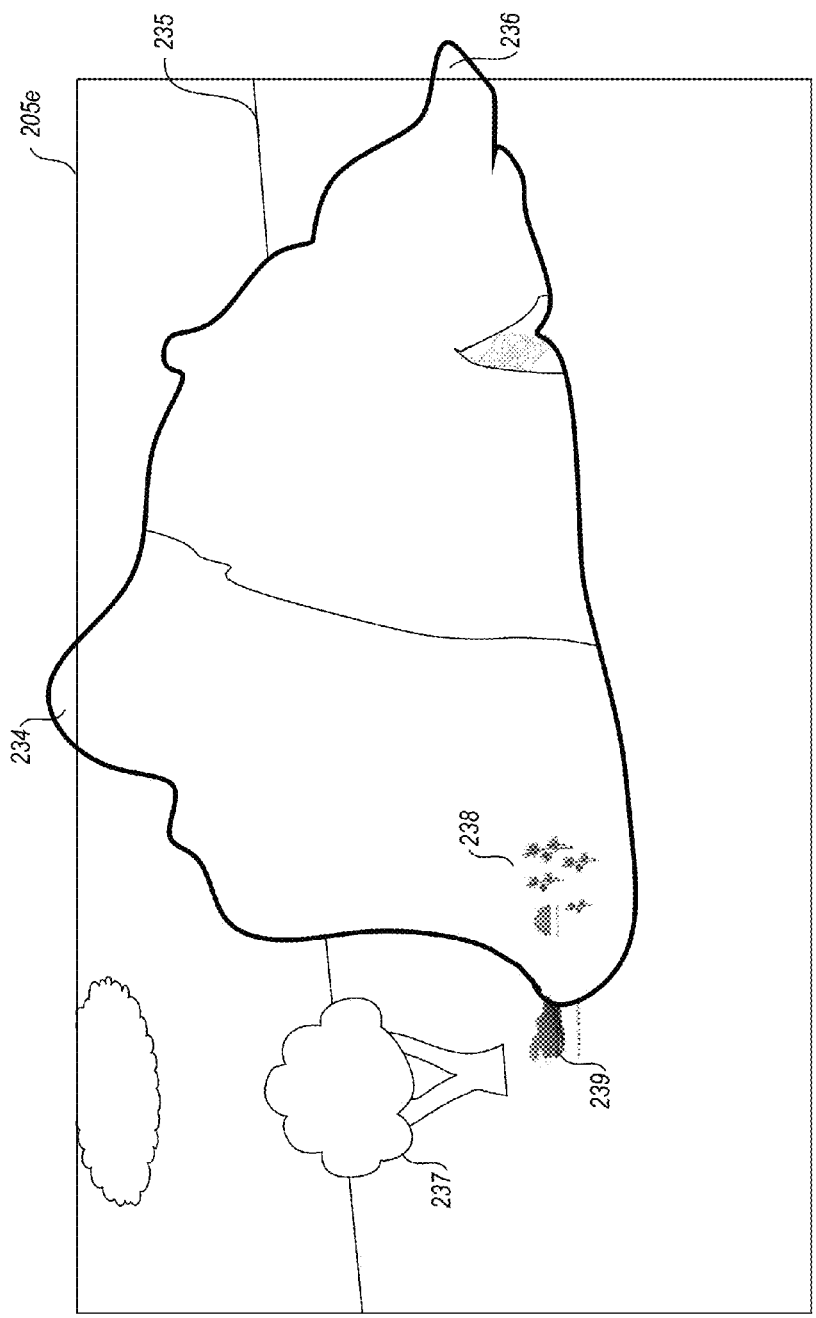

With respect to FIG. 2E, it illustrates an example of an image 205e similar to that of image 205a of FIG. 2A, but in which the image 205e has one or more quality problems, such as due to improper operator movement or positioning of the mobile device when taking the image 205e, and/or due to features of the environment being imaged. In particular, as is illustrated in FIG. 205e, the image 205e is tilted (e.g., as illustrated by the horizon line 235), and one or more portions 234 and 236 of the object 200 have not been captured in the image due to improper positioning of the mobile device capturing the image. Accordingly, for such an example image 205e, if image monitoring is being performed, the quality of the image may be determined to be below a specified threshold or to otherwise not meet one or more specified quality criteria, such as with respect to degree of motion between images and/or for other reasons, and the image 205e may be discarded from further consideration due to that failure. Missing portions 234 and 236 may, if not corrected and/or supplemented in other images, reduce an amount of data used to model the object (e.g., require data interpolation to estimate corresponding portions of the object, such as to estimate a flat top or more rounded top to reflect portion 234), and thus reduce a degree of completion and corresponding automated confidence value in the resulting model of the object, as discussed in greater detail elsewhere herein. In addition, FIG. 2E further provides examples of extraneous objects (in this example, a tree 237 external to the pile, vegetation 238 on the pile, and water 239 adjacent to the pile's boundary with the underlying surface) that for other images, depending on a location of the mobile device taking those images, could obscure a portion of the pile of materials and/or of the toe portion of the surrounding underlying surface, and thus provide other quality problems that similarly reduce an amount of data used to model the object, with resulting confidence reduction in related object attributes (e.g., the object volume). Other such potential blocking objects could include, for example, a human, animal, vehicle, equipment, etc. (not shown) used to create or maintain the pile (e.g., a conveyor belt or crane to carry materials to upper levels of the pile), etc. The puddle or other water 239 adjacent to the pile in a toe portion of the surrounding surface may cause quality problems, as reflections from the water in images could make it difficult to determine the boundary of the object and underlying surface from analysis of those images, and/or the presence of the water may make it difficult to determine a location of the underlying surrounding surface from analysis of those images, such as by reflecting the object or other material. Such quality problems may reduce an amount of data used to model the toe area and/or underlying surface, and thus reduce a degree of completion and corresponding automated confidence value in a resulting model of the toe and/or underlying surface (and thus related object attributes such as the object volume), as discussed in greater detail elsewhere herein. Similarly, missing portion 236 may, if not corrected and/or supplemented in other images, reduce an amount of data used for a resulting model of the toe and/or underlying surface, and thus also reduce a degree of completion and corresponding automated confidence value for object attributes (e.g., object volume). While not illustrated in FIG. 2E, other image problems may occur from an adjacent pile (or other object) that partially overlaps with a portion of the pile of interest, thus causing problems for both toe and underlying surface detection and modeling, and for modeling of the pile itself. In addition, or alternatively, user feedback may be provided to the user based on one or more such detected quality problems with image 205e (e.g., shortly after acquiring the image 205e and/or other related images), such as to indicate one or more of the problems that exist with respect to the FIG. 205e. For example, one or more of a variety of feedback messages may be displayed or otherwise indicated to the user, such as, for example, "user motion too fast", "image contrast too low", "object not centered in image", "mobile device tilted", "obscuring object(s) detected", "obscuring vegetation detected", "adjacent water detected", "overlapping adjacent object detected", etc.

Figure 2F:
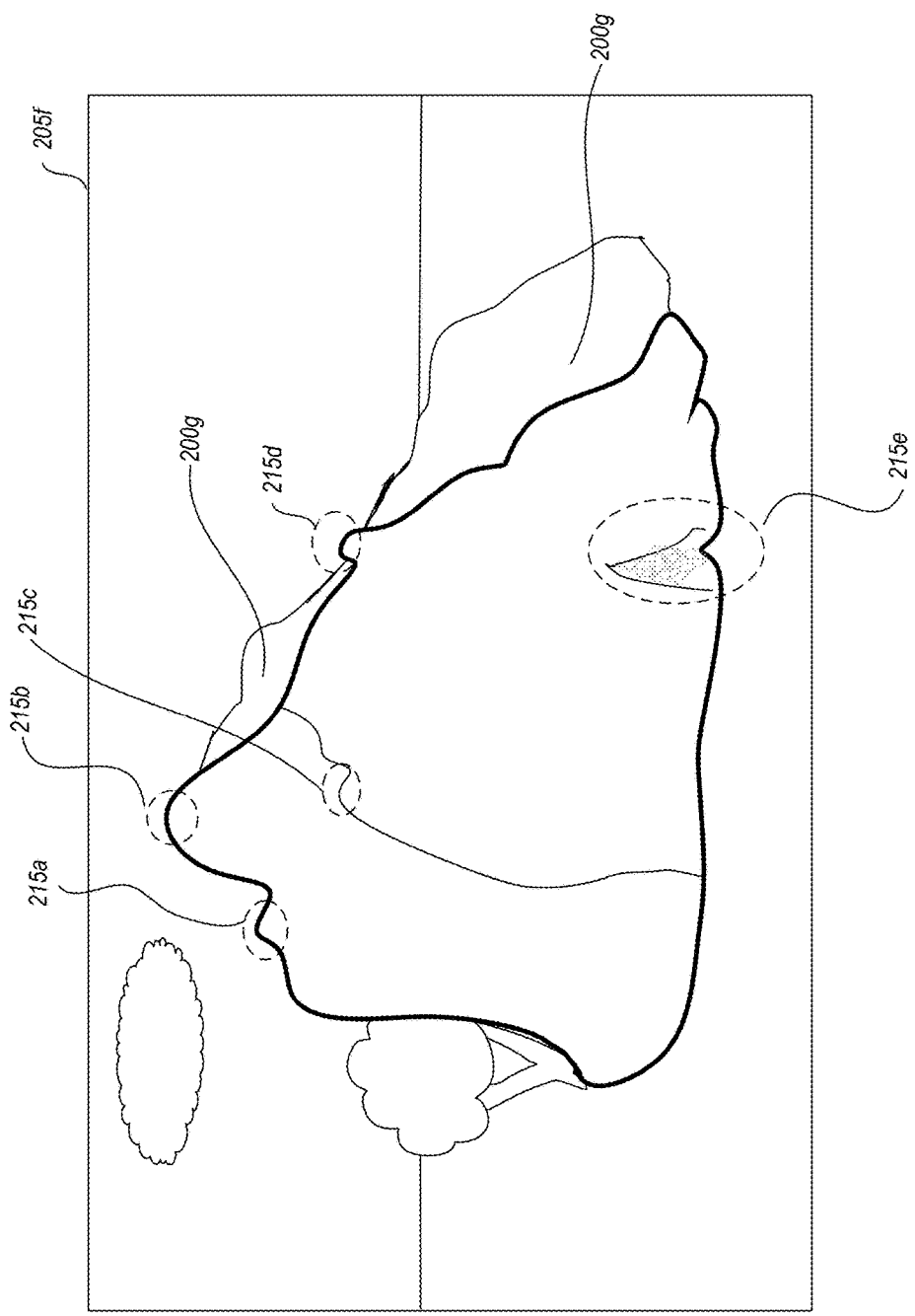

FIG. 2F continues the examples of FIGS. 2A-2E, and in particular illustrates an image 205f. In this example, the image 205f continues to correspond to object 200, but from a different viewpoint than that used for image 205a of FIG. 2A, such as from location 120b of FIG. 1. In this example, all of the features 215a-215e continue to be visible in image 205f, along with an additional portion 200g of the object 200 relative to that of image 205a, based on the change in location.

Figure 2G:
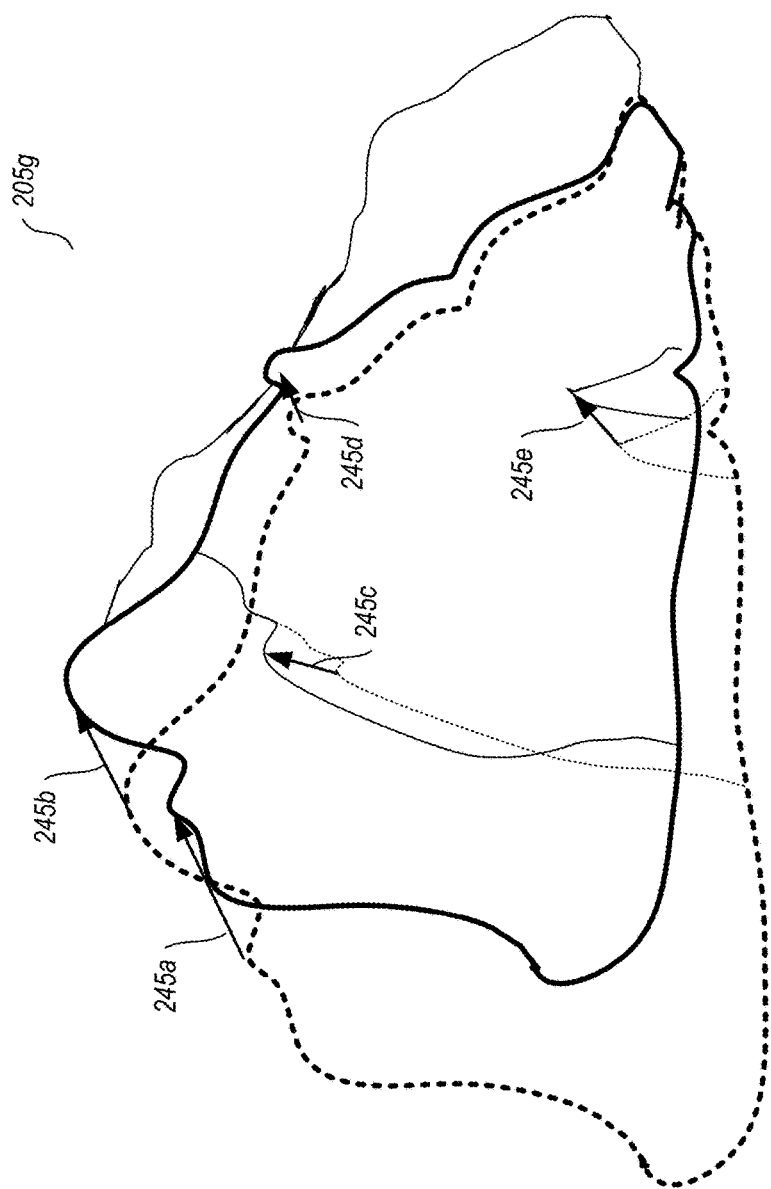

FIG. 2G continues the examples of FIGS. 2A-2F, and in particular provides a view 205g that combines portions of images 205a and 205f of FIGS. 2A and 2F, such as to illustrate relative changes between features 215a-215e from those images. In particular, outlines of the object 200 from both images are shown overlaid on each other in view 205g, with dotted lines being used for the outline from image 205a, and with solid lines being used for the outline from image 205f. In addition, arrows 245a-e have been added corresponding to features 215a-215e, respectively, to show an amount of movement of those features between the two images. Such information may be used in various manners, including to determine an amount of apparent motion between the images (e.g., based on the movement of the mobile device and/or the mobile device's operator), an amount of overlap between images and/or additional portions of the object exterior that may be available from one image to another, etc.

Figure 2H:
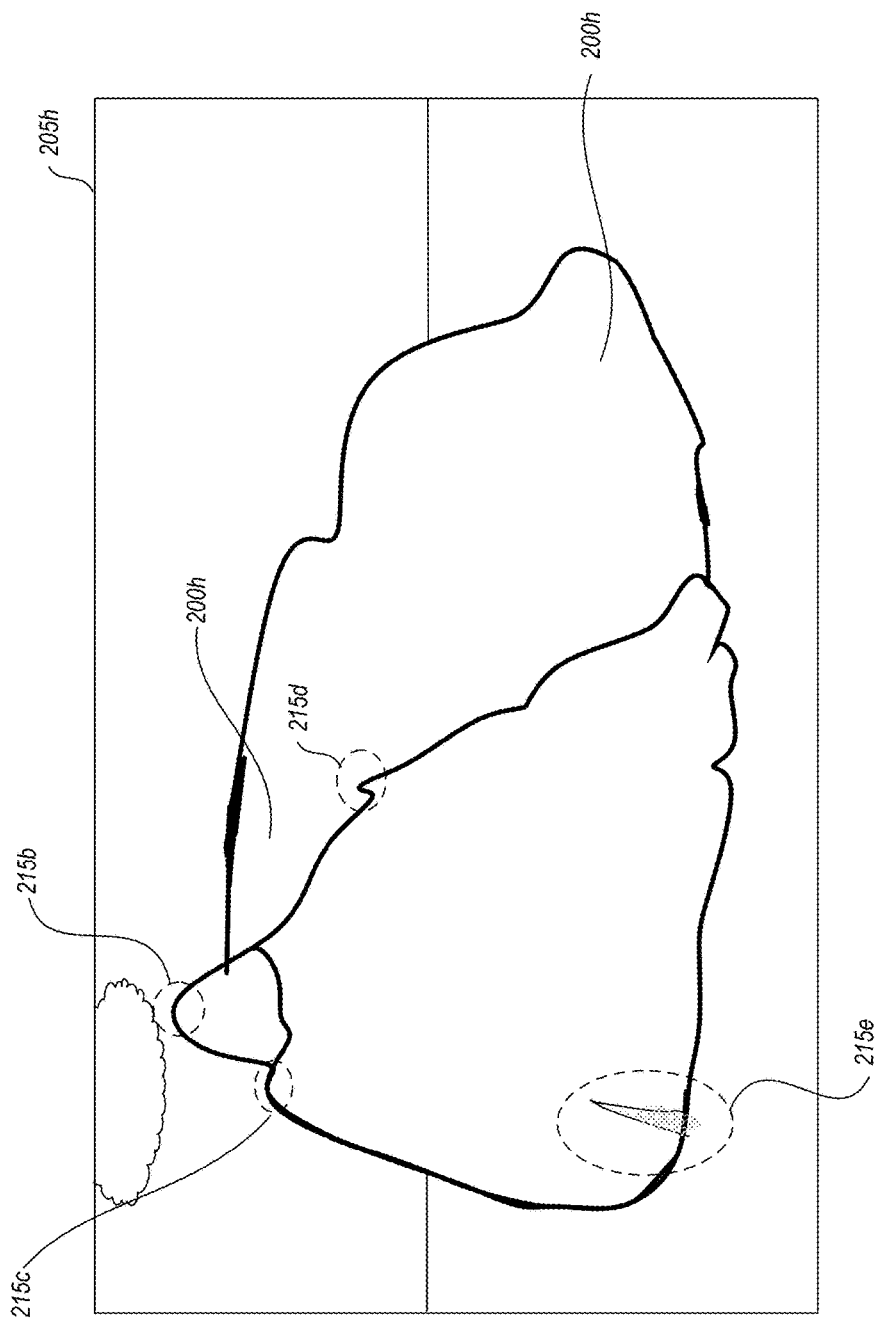

FIG. 2H continues the examples of FIGS. 2A-2G, and illustrates an example image 205h that corresponds to object 200 from an additional location, such as from location 120c of FIG. 1. In this example, it can be seen that feature 215a is no longer visible due to the change in the view, such as based on other portions of object 200 obscuring those features, and additional portions 200h of the object 200 are shown relative to that of image 205a. Accordingly, when selecting images for the group to represent the object 200, and if image 205a is selected as an initial starting image, images 205d, 205e, and 205h of FIGS. 2D, 2E, and 2H, respectively, may not be chosen as a next selected image for the group for different reasons. As previously noted, image 205e may be discarded to its quality problems, while image 205d may not be chosen due to its relative lack of additional information compared to image 205a (due to the small change in location from which the additional image is acquired). Conversely, image 205h may not suffice as a next image in the group after image 205a due to a relative large change in location for the two images, including to lose the ability to map features such as 215a between images 205a and 205h due to the change in location.

Thus, in the examples of FIGS. 2A-2H, image 205g of FIG. 2G may be selected as the second image to include in the selected group to represent the object 200, after that of image 205a of FIG. 2A, and additional images may be further selected from other views 200 (e.g., to select image 205h as a next image after image 205g), so as to include further overlapping portions that, in aggregate, include all of the exterior of the object. It will be appreciated that the selection of various images may be performed in various manners and using various techniques, as discussed in greater detail elsewhere.

Figure 2I:
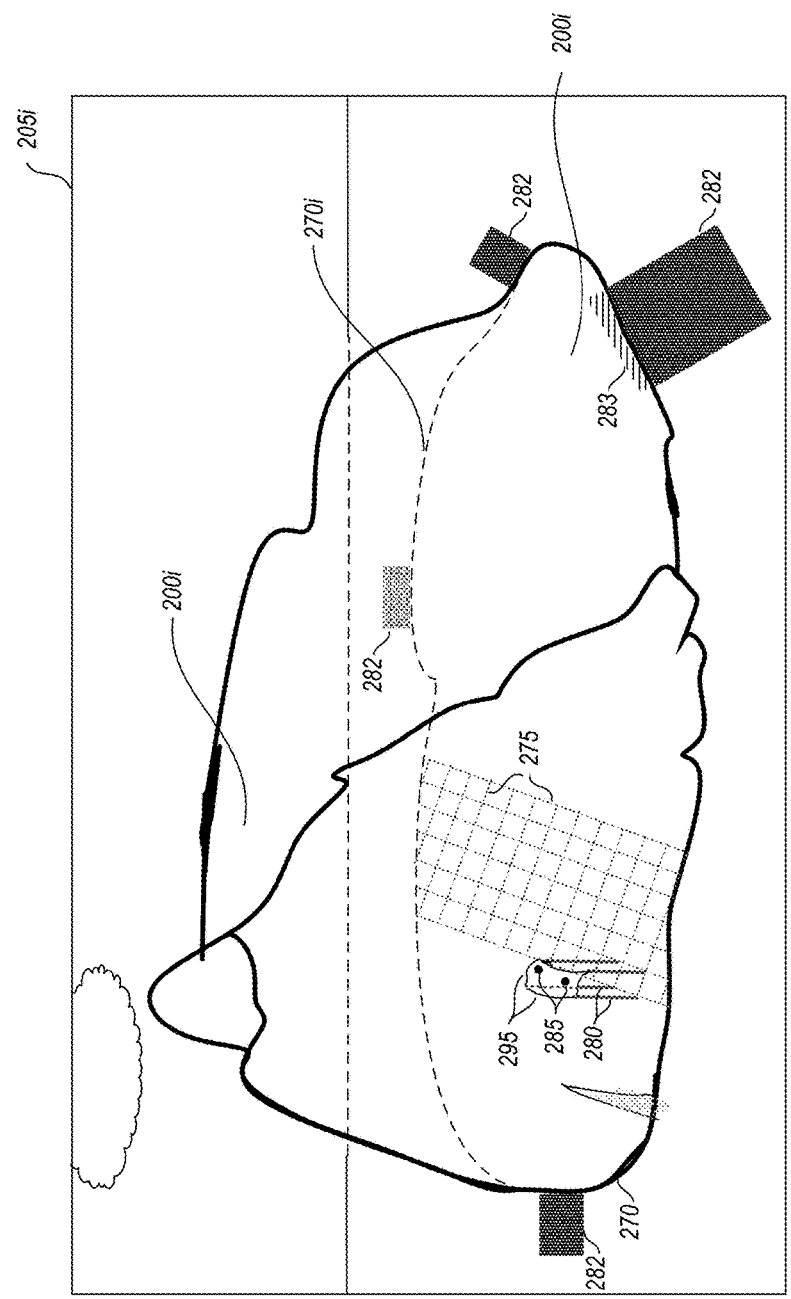

FIG. 2I continues the examples of FIGS. 2A-2H, and illustrates an example image 205i that is similar to image 205h of FIG. 2H, but in which various additional information is illustrated with respect to performing automated verification activities for the computer model(s) of the object and object attribute measurements resulting from the computer model(s). In particular, for the sake of discussion with respect to FIG. 2I, the representation 200i of the stockpile object 200 being modeled represents a rendered surface of a computer model generated from the image data acquired in FIGS. 2A-2H and optionally additional images (not shown) from other vantage points around the exterior of the object, and additional information 275-295 is added in FIG. 2I for the purpose of explaining some of the automated verification activities that may be performed.

As one example of automated verification activities illustrated with respect to FIG. 2I, automated operations may be performed to determine the confidence in a boundary of the modeled object and the underlying surface. In particular, and as discussed in greater detail elsewhere herein, various data points 282 may be acquired from portions of the surface area external to the object (with only partial limited sets of data 282 being shown in FIG. 2I for the sake of illustration), and may be used to generate an initial estimate of a base surface on which the object is situated. With respect to an initial estimate of a boundary or edge 270 of the object (with a non-visible portion 270i being illustrated with respect to the back of the modeled object relative to the current view location), a lower portion 283 of the object above that boundary may be identified (shown in this example for only a small part of the object for the sake of illustration) as part of a search ring in which additional automated operations are performed to refine the edge location and/or identify whether the toe portion of the surface adjacent to the object is likely to be accurately represented as toe (rather than actually as part of the object), such as based at least in part on one or more slope measurements. FIG. 2J illustrates additional example details related to such automated boundary verification activities, as do some of FIGS. 2K1-2K9.

As another example of automated verification activities illustrated with respect to FIG. 2I, automated operations may be performed to determine the confidence in data coverage of the modeled object, such as with respect to its surface area and/or volume. In particular, and as discussed in greater detail elsewhere herein, a 2D grid 275 of cells may be generated under the surface of the modeled object (shown in this example for only a small part of the object for the sake of illustration), and a subset 295 of the surface of the modeled object above a particular cell may be examined to determine a quantity of data points 285 that are located in that surface subset 295, although other techniques for representing acquired data and/or data coverage may instead be used in other embodiments. After such operations are performed for each cell, the percentage (or other amount) of cells that are sufficiently supported by image-acquired data may be used as part of determining confidence in resulting surface area and/or volume measurements for the modeled object. FIG. 2J illustrates additional example details related to such automated data coverage verification activities, as do some of FIGS. 2K1-2K9.

FIG. 2J continues the example of FIG. 2I, and illustrates example information 205j that is similar to portions of information 275-295 of FIG. 2H, but in which various additional information is illustrated with respect to performing automated verification activities for the computer model(s) of the object and object attribute measurements resulting from the computer model(s).

In particular, in a manner similar to information 282 and 283 on the lower right side of the object representation of FIG. 2I, related information 282 and 283 is illustrated in FIG. 2J along with additional information 281, 284 and 286-288. The information 282 of FIG. 2J represents a portion of toe surface outside a boundary 281 of a modeled object, and the information 283 of FIG. 2J represents a search ring portion of the modeled object. In this example, contour lines have been added to the search ring portion to provide a visual indication of slope, such that automated assessment and possible refinement of the object boundary may, depending on an amount of slope in an area 284 of lower slope in the search ring (relative to other areas 286 and 287 with higher slope), determine to exclude some or all of the lower-slope area 284 from the modeled object, and move the initial object boundary accordingly, although a revised object boundary is not illustrated in this example. While contour lines are not similarly illustrated for the toe surface 282 in this example, the slope of that toe surface may similarly be evaluated. If particular portions of the toe have a slope that is too high (e.g., relative to a slope, if any, of the overall underlying surface), uncertainty may exist regarding whether those toe portions are actually part of the object, while a sufficiently low slope for other portions of the toe may increase confidence that those toe portions are correctly identified as being external to the object. While particular low-slope and/or high-slope portions of the toe portion are not identified, a subset 288 of the object boundary has been identified as being a portion with associated toe surface that is either sufficiently low to affirm that boundary portion (e.g., as being a "good" boundary) or sufficiently high to disaffirm that boundary portion (e.g., as being a "bad" boundary). When performed for all portions of the modeled object's boundary, a corresponding percentage or other amount of the boundary that is affirmed (or is not affirmed) may be calculated, and used to determine verification (or lack thereof) of the modeled object's boundary and resulting object attribute measurements, such as by determining whether that percentage or other amount satisfies one or more corresponding boundary accuracy thresholds.

In addition, and in a manner similar to the information 275, 280, 285 and 295 of FIG. 2I, related information 280, 285 and 295 is illustrated in FIG. 2J along with additional information 277 and 278*a*-278*g*. In particular, the cell 277 of FIG. 2J represents a particular cell in the grid 275 of FIG. 2I, the area 295 continues to represent a portion of the surface of the modeled object above that cell 277, and the data points 285 continue to represent image-acquired data that provide coverage of that surface portion 295. In this example, the column above the 2D cell 277 has further been separated into multiple 3D cells, with the indicators 278*a*-278*g* showing the upper boundary of each successive 3D cell in the column from bottom to top. In this example, the surface portion 295 extends through 2 of the 3D cells with upper boundaries 278*d* and 278*e*, and with the 3 3D cells with upper boundaries 278*a*-278*c* being fully below the surface portion 295. The 3D cells of FIG. 2J may be used in some embodiments as part of determining a confidence in sufficient data coverage for a volume measurement for the object. For example, if the data points 285 are determined to be sufficient data coverage for the surface portion 295, the corresponding volumes of at least the 3 3D cells with upper boundaries 278*a*-278*c* may be affirmed as being sufficiently verified, and optionally some or all of the 2 enclosing 3D cells with upper boundaries 278*d* and 278*e* may similarly be marked—alternatively, if the data points 285 are determined to not be sufficient data coverage for the surface portion 295, the corresponding volumes of those 3-5 3D cells may be disaffirmed as not being sufficiently verified. When performed for all 3D cells under the modeled object's surface, a corresponding percentage or other amount of the volume that is affirmed (or is not affirmed) may be calculated, and used to determine verification (or lack thereof) of the modeled object's volume measurement, such as by determining whether that percentage or other amount satisfies one or more corresponding volume data coverage thresholds. As discussed in greater detail elsewhere herein, other embodiments may determine sufficient data coverage for such 3D cells in other manners, including based on an individualized probability that is determined for each cell of it being sufficiently covered by the image-acquired data.

FIGS. 2K1-2K9 are discussed further below, and provide additional example details related to automated data coverage verification activities and automated boundary verification activities, as well as other information about particular example embodiments. It will be appreciated that the details discussed with respect to the examples of FIGS. 2A-2J and 2K1-2K9 are provided for illustrative purposes, and that the described techniques are not limited to these example details.

Figure 3:
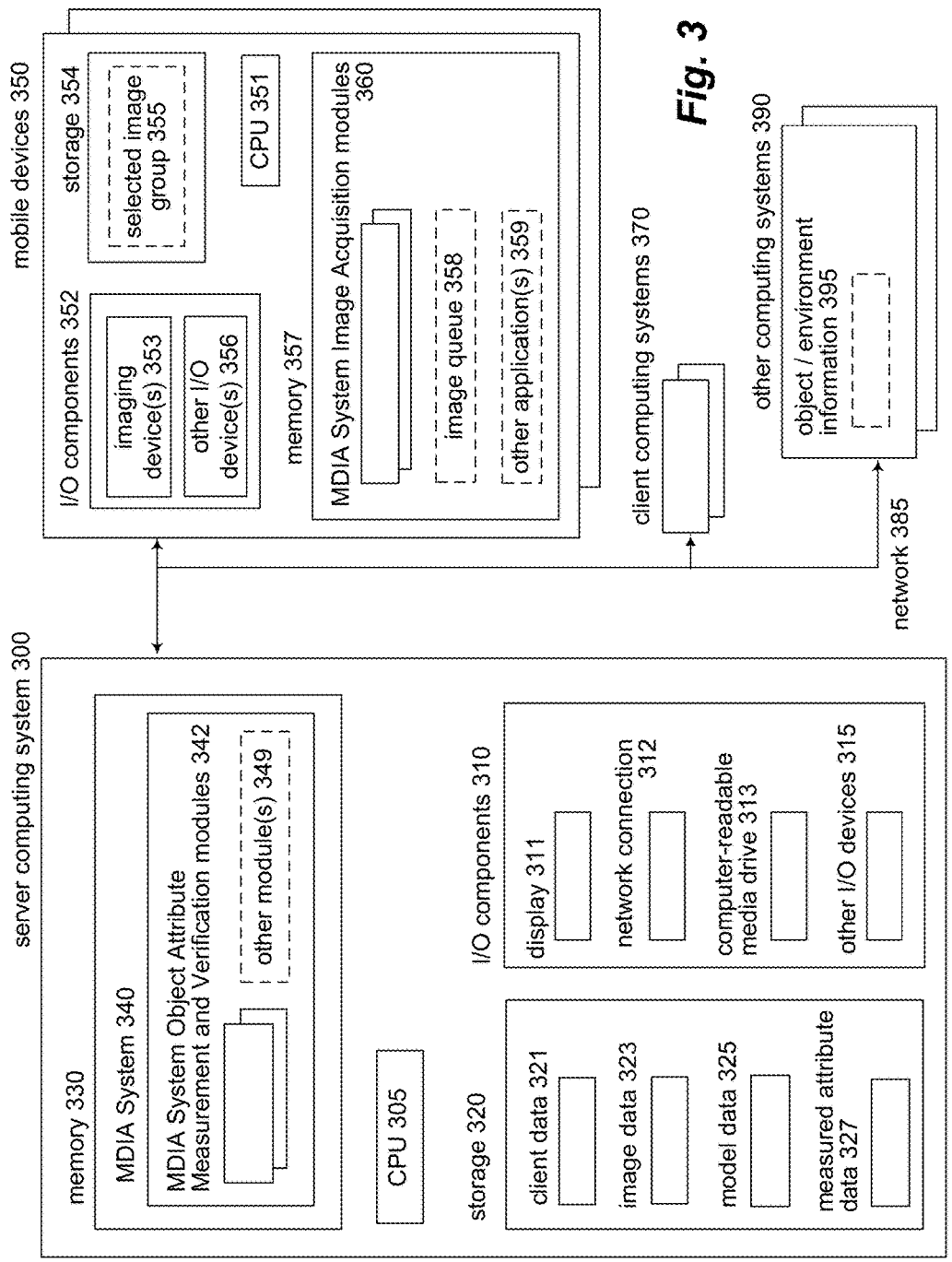
FIG. 3 is a block diagram illustrating a computing system suitable for executing embodiments of a described system for analyzing images acquired via mobile devices to assess volume and/or other attributes of objects included in the images.

FIG. 3 is a block diagram illustrating an embodiment of a server computing system 300 that is suitable for performing at least some of the described techniques, such as by executing an embodiment of a MDIA system 340 that provides a mobile device image analysis service available to various clients. The example server computing system 300 includes one or more central processing unit ("CPU") processors 305, various input/output ("I/O") components 310, storage 320, and memory 330, although in other embodiments multiple such server computing systems may operate together to execute the system 340 in a distributed manner. Illustrated I/O components in this example embodiment include a display 311, a network connection 312, a computer-readable media drive 313, and other I/O devices 315 (e.g., keyboards, mice or other pointing devices, microphones, speakers, etc.)—such I/O components may enable a variety of types of interaction types, including, for example, voice control, gesture control, etc.

One or more mobile devices 350 are similarly illustrated as each having one or more CPU processors 351, one or more I/O components 352, memory 357, and storage 354. For example, each such mobile device may include one or more image capture devices 353 and other I/O devices 356, although particular such other I/O devices are not illustrated. In this example, one or more MDIA system image acquisition components 360 are executing in memory 357 of the mobile device (e.g., as part of one or more software applications provided by the MDIA system 340 or the entity operating the system 340), such as one or more of the image acquisition components 168 of FIG. 1—one or more other software applications 359 may also optionally be executing on the mobile device (e.g., to allow wireless communication with the server computing system 300 and/or other systems). As the mobile device performs image acquisition capabilities, it may optionally create and use a temporary image queue 358 in memory as part of performing image selection activities, and/or may store some or all of the acquired images on storage 354—in this example, the storage 354 may optionally include multiple images selected for an image group 355 to represent an object whose images are being acquired.

The other computing systems 370 and 390 may similarly include some or all of the same types of components as the server computing system 300 and/or mobile devices 350, but such components are not illustrated in this example for the sake of brevity. The server computing system 300 and mobile devices 350, and the MDIA system 340 and the system 340 components 342, 349 and 360, may also communicate with each other and/or other computing devices and systems in various manners, including via one or more networks 385 (e.g., the Internet, one or more cellular telephone networks, etc.).

In the illustrated embodiment, at least a portion of the MDIA system 340 is executing in memory 330 of the server computing system 300, and in this example includes one or more MDIA system object attribute measurement and verification components 342, such as one or more of the object attribute measurement and verification components 169 of FIG. 1—one or more other components 349 (e.g., MDIA system image acquisition components) and/or other software applications (not shown) may also optionally be executing in the memory 330, including in some embodiments to execute all of the MDIA system on the server computing system. Similarly, while not illustrated in this example, in other embodiments, all of the MDIA system may optionally execute in the memory 357 of a mobile device, such as to enable the mobile device to perform all of the described techniques without interacting with the server computing system 300. Additional details are discussed elsewhere herein related to types of automated operations that various of the MDIA system components may perform. The system 340 and/or the system components 342, 360 and 349 may in some embodiments include software instructions that, when executed, program or otherwise configure the processor(s) 305 and the server computing system(s) 300, and/or the processor(s) 351 and the mobile device(s) 350, to perform automated operations that implement at least some of the described techniques.

The MDIA system 340 and its components may obtain and use various information as part of its automated operations, such as client data 321, image data 323, model data 325 and measured attributed data 327 on storage 320 of the server computing system 300—such data and its use may be similar to that described with respect to data 161-164 of FIG. 1 and/or elsewhere herein. For example, the MDIA system 340 may obtain various types of client-related information from users or other entities that act as clients of the system 340, such as by interacting with corresponding client computing systems 370 (e.g., via a corresponding optional component 349 that enables clients to register with the system 340 and/or to provide other types of client-specific information), and may store some or all such information in client data 321 on storage 320. While not illustrated here, in other embodiments some or all of the MDIA system 340 may execute on behalf of a single client or a single entity (e.g., an organization with multiple employees or other members). In addition, the MDIA system may further obtain and use additional types of data in at least some embodiments, such as information about particular objects, object types (e.g., materials) and/or object environments from one or more other computing systems 390. Such other information may be used in various manners when analyzing images, determining object attribute measurements and/or presenting corresponding information to clients, as discussed elsewhere herein.

It will be appreciated that the illustrated computing systems and device are merely illustrative and are not intended to limit the scope of the present invention. For example, computing system 300 and/or mobile devices 350 may be connected to other devices that are not illustrated, including through one or more networks such as the Internet or via the Web. More generally, a "client" or "server" computing system or device may comprise any combination of hardware that can interact and perform the described types of functionality, such as when programmed or otherwise configured with software, including without limitation desktop computers, laptop computers, slate computers, tablet computers, embedded computers, specialized hardware such as ASICs or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 340 and/or its components may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software components and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. Furthermore, the functionality provided by the illustrated system components may in some embodiments be combined in fewer components or distributed in additional components. Similarly, in some embodiments the functionality of some of the illustrated components may not be provided and/or other additional functionality may be available.

Thus, in at least some embodiments, the illustrated components and/or systems are software-based components/systems including software instructions that, when executed by the CPU(s) 305 and/or CPU(s) 351 and/or other processor means, program the processor(s) to automatically perform the described operations for that component/system. Furthermore, in some embodiments, some or all of the components and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 4 is an example flow diagram of an illustrated embodiment of a MDIA (Mobile Device Image Analysis) System routine 400. The routine may be provided by, for example, execution of an embodiment of the MDIA System 160 of FIG. 1, the MDIA System 340 of FIG. 3, and/or the MDIA System discussed with respect to FIGS. 2A-2J and 2K1-2K9, such as to perform activities for clients of a MDIA Service being provided by the MDIA System, including to acquire and analyze images via mobile devices to estimate measurements for one or more attributes of an object included in the images, and to perform automated verification of such attribute measurements in various manners. It will be appreciated that the routine 400 may be performed by one or more configured devices or systems, including in multiple locations, such as if a mobile device used to acquire images performs at least some of the portions of the routine 400, while one or more remote server systems perform additional portions of the routine.

The routine begins in block 405, where instructions or information is received. The routine continues to block 410 to determine whether an instruction is received to register a new client of the MDIA Service and/or to modify existing information for such a client, and if so continues to block 415 to obtain corresponding client information and to perform a registration for the client. In at least some embodiments, the client information obtained may include information about, for example, payment mechanisms (e.g., if the MDIA Service is a fee-based service that charges clients for particular activities performed), notification preferences or other instructions (e.g., for use in providing information to a client about one or more analyzed attributes for an object of interest to the client, such as based on images of the object supplied by the client), and/or other types of client preferences and information (e.g., mobile devices that are registered for the client to provide image information, user representatives of the client who are authorized to perform particular activities, etc.). While not illustrated in this example routine, the routine may further, in at least some embodiments, provide one or more user interfaces via which a user representative of a client may interact with the MDIA System, such as to provide a GUI ("graphical user interface") via which the authorized user representative may perform activities (e.g., to register a client and/or obtain information about previous activities performed for the client). Such a GUI or other user interface may, for example, be provided over the Internet or other network to one or more computing devices of the client's user representative, such as via a Web browser executing on those client devices, and/or may be provided at least in part by an application program of the MDIA System that is downloaded to and executed on a mobile device or other configured device of the client's user representative (e.g., a client-side application that includes one or more components of the MDIA System, such as components 360 of FIG. 3).

After block 415, or if it is instead determined in block 410 that the information or instructions received in block 405 are not to register client information, the routine continues to block 420 to determine whether instructions or information have been received related to performing image acquisition for one or more objects of interest, such as on behalf of a client that has just been registered in block 415 or instead for a previously registered client. For example, such a received indication may be based on a human user indicating via a mobile device or other configured device to the MDIA System that an image acquisition session is about to begin for one or more objects of interest, based on such a mobile, device beginning to supply one or more acquired images as part of a new image acquisition session, based on the MDIA System providing a reminder or other instructions to a human user to begin an image acquisition session (e.g., in accordance with previously defined instructions for a corresponding client), etc. If so, the routine continues to block 430 to execute an MDIA System Image Acquisition routine, such as by executing one or more image acquisition components of the MDIA System. One example of such an MDIA System Image Acquisition routine is discussed in greater detail with respect to FIGS. 5A-5B.

After block 430, or if it is instead determined in block 420 that the instructions or information received in block 405 are not related to performing an image acquisition session, the routine continues to block 440 to determine whether the information or instructions received in block 405 correspond to calculating or otherwise estimating one or more attribute measurements for one or more objects of interest, such as for images just acquired with respect to block 430 or instead with respect to previously acquired and stored images. If so, the routine continues to block 450 to perform an MDIA System Object Attribute Measurement routine, such as by executing one or more object attribute measurement components of the MDIA System. One example of such an MDIA System Object Attribute Measurement routine is illustrated in greater detail with respect to FIG. 6.

After block 450, or if it is instead determined in block 440 that the instructions or information received in block 405 are not related to performing attribute measurements, the routine continues to block 460 to determine whether the information or instructions received in block 405 correspond to verifying one or more attribute measurements and/or the corresponding computer model(s) for one or more objects of interest, such as for attribute measurements just calculated with respect to block 450 or instead with respect to previously acquired and stored attribute measurements. If so, the routine continues to block 465 to perform an MDIA System Object Attribute Verification routine, such as by executing one or more object attribute verification components of the MDIA System. One example of such an MDIA System Object Attribute Verification routine is illustrated in greater detail with respect to FIG. 7.

After block 465, or if it is instead determined in block 460 that the instructions or information received in block 405 are not related to performing automated operations to verify attribute measurements, the routine continues to block 480 to determine whether the instructions or information received in block 405 include providing measured attribute information and/or verified attribute measurements to a client and/or other source, whether for attribute measurements just performed with respect to block 450 or instead for previously determined object attribute information, and/or for attribute measurement verification just performed with respect to block 465 or instead for previously determined object attribute verification information. If so, the routine continues to block 485 to retrieve corresponding information of interest, to optionally format the information in an indicated manner, and to provide to the client. As previously noted, in some embodiments, the providing and/or formatting of information for a client may be performed in manners previously indicated by the client, such as with respect to preferences specified by the client. In addition, in at least some embodiments, the providing of the information in block 485 includes generating one or more reports to provide the information of interest, with such reports being able to be provided to the client in various manners (e.g., an electronic report sent over one or more networks via one or more electronic communications, a paper-based report, etc.). While not illustrated here, in some embodiments the routine may perform further interactions with a client or other end user, such as before, during or after providing information to the client in block 485, as discussed in greater detail elsewhere herein.

If it is instead determined in block 480 that the information or instructions received in block 405 are not to provide measured attribute information, the routine continues instead to block 490 to perform one or more other indicated operations as appropriate. For example, the operations performed with respect to block 490 may include requesting or otherwise receiving additional information of one or more types about objects and/or their environments, with such additional information optionally being used as part of blocks 430 and/or 450. In addition, in some embodiments, a client may be able to perform a variety of other types of actions with respect to the MDIA System, such as to schedule notifications or activities for future times, to retrieve and monitor information about previous activities, etc. In addition, the MDIA System may provide its corresponding services on a fee basis for at least some types of activities performed by clients in at least some embodiments, and if so the operations performed with respect to block 490 may include requesting and/or obtaining payment from clients for such activities, including for activities performed with respect to blocks 430, 450, 465 and/or 485.

After blocks 485 or 490, the routine continues to block 495 to determine whether to continue, such as until an explicit indication to terminate is received. If it is determined to continue, the routine returns to block 405, and otherwise continues to block 499 and ends.

Figure 5A:
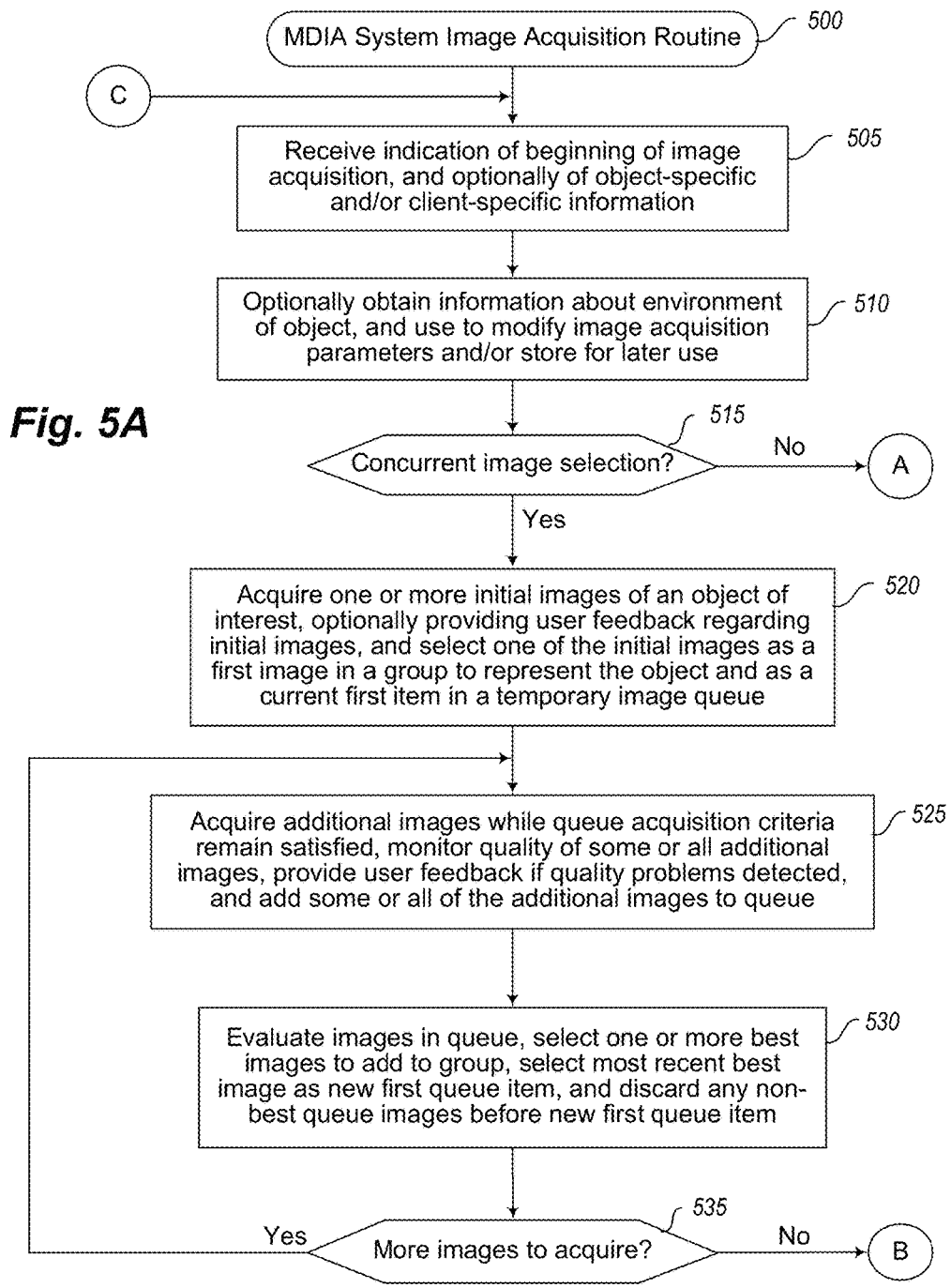
FIGS. 5A-5B are an example flow diagram of an illustrated embodiment of an MDIA System Image Acquisition routine.
Figure 5B:
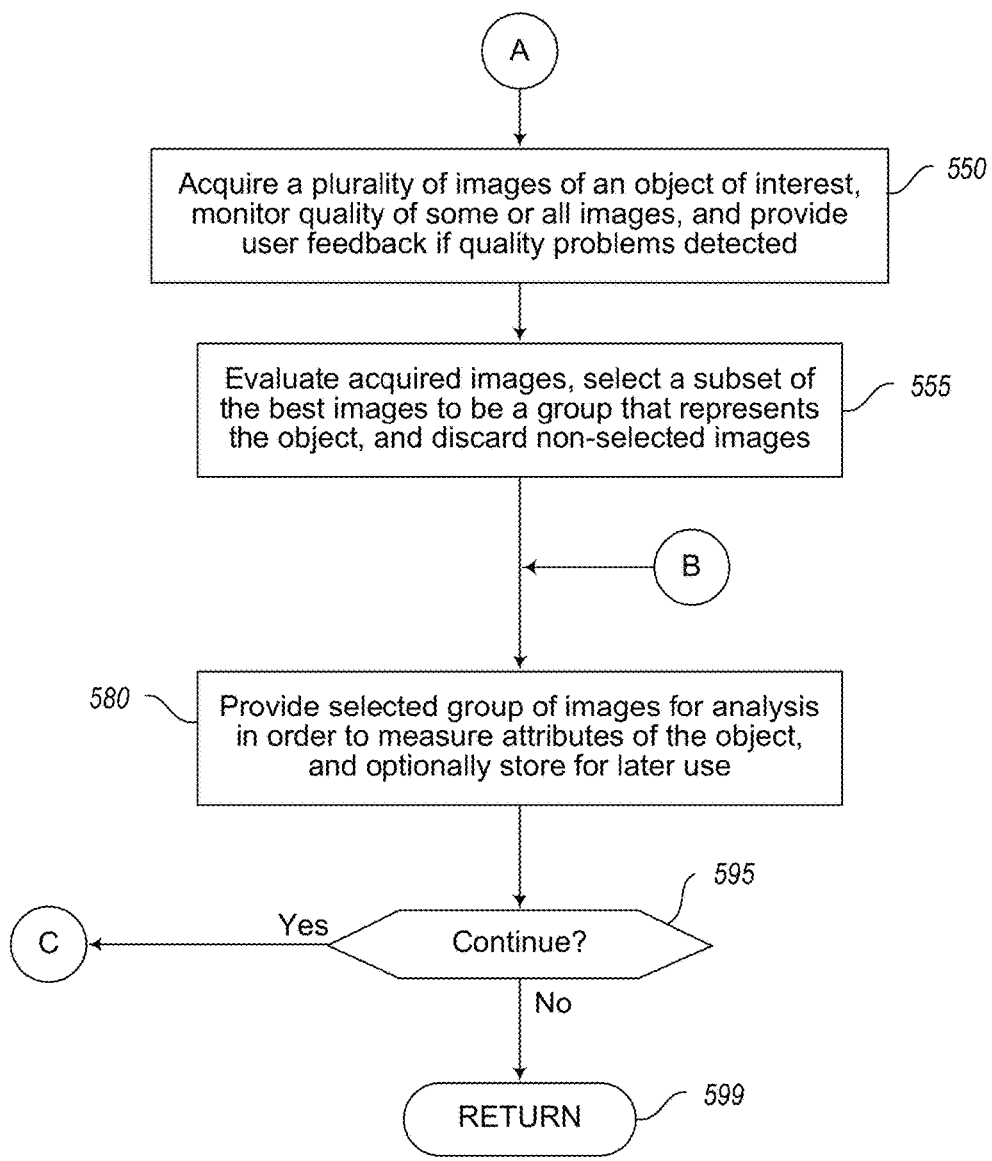

FIGS. 5A and 5B are an example flow diagram of an illustrated embodiment of a MDIA System Image Acquisition routine 500. The routine may be performed by, for example, the MDIA System 160 of FIG. 1, one or more of the MDIA System Image Acquisition components 360 of FIG. 3, and/or the MDIA System discussed with respect to FIGS. 2A-2H, such as to perform an image acquisition session that involves acquiring a variety of images of one or more objects of interest via one or more mobile devices, selecting at least some of the acquired images to be a group that represents the objects of interest for additional processing, and optionally providing user feedback to a human user operator of the mobile device(s), including based on monitored image quality. The routine may be invoked in various manners in various embodiments and situations, including with respect to block 430 of FIG. 4. In the illustrated embodiment, a plurality of images are acquired in a session, and a subset of those images are selected to be the group representing one or more objects of interest, although in other embodiments all acquired images may be selected and used as such a group. In addition, in the illustrated embodiment, the image selection may be performed dynamically and concurrently with the image acquisition or may be performed after all of the images have been acquired, although in other embodiments only one of these two image selection alternatives may be used.

In the illustrated embodiment, the routine 500 begins at block 505, where an indication is received (e.g., from an operator of a mobile device) of a beginning of an image acquisition session, and other object-specific and/or client-specific information may further be obtained and associated with the acquired images in at least some embodiments. For example, in embodiments in which the MDIA System provides services to multiple clients, a current mobile device operator may verbally or otherwise indicate a client identifier or other indication of a current client with which the images are to be associated, although in other embodiments, the later transmission or other providing of the images to a remote server for further processing may instead include such client-related information (e.g., based on a mobile device performing the transmission). In a similar manner, the mobile device operator may include a tag or other information related to one or more objects of interest to be acquired in the images, such as to assist in later identifying those specific objects (e.g., if a variety of objects exists and will each be acquired in successive image acquisition sessions).

After block 505, the routine continues to block 510 to optionally obtain information about the environment of the object, such as light levels, location, elevation, a deviation from level (if any) of a base surface on which the object of interest rests, etc. While not illustrated here, in some embodiments, such information may further be used in various manners, including to automatically adjust parameters or settings to be used for the image acquisition by the mobile device, as part of later registering the images and a resulting model with respect to location, scale, and/or orientation, etc. The obtained information about the environment in block 510 may further in some embodiments include information about a scale of an object of interest, a distance from the operator to the object, etc., whether measured by one or more capabilities of the mobile device or other equipment at or near the operator, or instead by using artificially introduced objects or information to enable such information to later be determined (e.g., a marker or target or object of known length, height, degree of level, etc., such as a set of cones at specified distance from each other, ground control points, etc.).

After block 510, the routine continues to block 515 to determine whether to perform selection of the group of images for the object concurrently with their acquisition, or instead after all of the images have been acquired. If it is determined to perform the image selection concurrently during image acquisition, the routine continues to block 520, where one or more initial images are acquired for an object of interest, and one of the initial images is selected as a first image in the group, as well as a current first item in an image queue to be used to temporarily store images being acquired until selected images are determined. The operations in block 520 may further include monitoring quality or other aspects of the initial images in some embodiments and situations, such as to ensure that they satisfy one or more minimum thresholds or other minimum standards for the images to include in the group, as well as to optionally provide user feedback to the user if the initial images are not sufficient (to enable reacquisition of additional initial images until a satisfactory image is obtained). In some embodiments, the evaluation or the analysis of the initial images may include determining image aspects such as contrast, sharpness, lighting levels, etc., as well as to identify particular object features for use in later image selection.

After block 520, the routine continues to blocks 525-535 to repeatedly acquire additional images until one or more of those additional images are selected for the group, with other of those additional images being discarded from further use in at least some embodiments and situations. In particular, in block 525, the routine continues to acquire additional images until one or more queue acquisition criteria are reached (e.g., based on a quantity of images, amount of time, amount of distance traveled by the operator, amount of difference between two or more images in the queue, loop closing, etc.). After each of some or all of the additional images are acquired, a quality and/or other aspects of the image is monitored in this embodiment, such as to enable images that do not satisfy minimum thresholds or minimum satisfaction criteria to be discarded from the queue (or not placed in the queue) and/or to enable user feedback to be provided to the user regarding the problems with the images being acquired (e.g., to enable the user to improve the quality of future images that are acquired, whether at different locations or to reacquire one or more of the images that were not satisfactory).

After block 525, the images that are currently in the queue are evaluated, such as to enable one or more of the best images to be selected to be added to the group, based on one or more determined metrics used for the evaluation (e.g., contrast, relative motion between two or more images, lighting levels, coverage of some or all of the object, overlap with one or more prior selected images of the group, etc.). The selection of the best images and/or the determination of when the queue acquisition criteria are satisfied may be performed in various manners in various embodiments, as discussed in greater detail elsewhere herein, including based at least in part on tracking object features across multiple images (e.g., to determine when particular features are no longer present). After one or more such best images are selected, the selected best images are added to the group, and other item images in the queue before the most recent such best image are discarded in the illustrated embodiment, although in other embodiments such other images may be retained but not included in the group. After block 530, the routine continues to block 535 to determine whether there are more images to acquire in this session, such as until an entire exterior of one or more objects of interest has been captured, or otherwise until the image acquisition session is determined to be completed. If there are more images to acquire, the routine returns to block 525, and otherwise continues to block 580. Furthermore, after the image acquisition session is completed, various types of housekeeping operations may be performed, such as to delete the temporary queue, to remove some or all of the acquired images from the mobile device (e.g., after they are provided to a remote server in block 580), etc.

If it is instead determined in block 515 that the image selection will occur after all of the images have been acquired, the routine continues instead to block 550, where a plurality of images are acquired of an object of interest, and in block 555 are evaluated to select a subset of the best images to use as the group to represent the object. The selection of the best images may be performed in various manners in various embodiments, as discussed in greater detail elsewhere herein, including by generating graph information corresponding to overlapping images and doing a least-cost path traversal of the graph. In the illustrated embodiment, the non-selected images are discarded, although in other embodiments may be retained but not included in the selected group. As part of the acquisition in block 550, the routine may in some embodiments perform monitoring of image quality or other attributes, and/or provide corresponding user feedback, in a manner similar to that discussed with respect to blocks 520 and 525.

After block 555, the routine continues to block 580, where the selected group of images from the concurrent or non-concurrent image selection processes is provided as output of the routine for additional analysis in order to measure one or more attributes of the object, with such images optionally being stored for later use. As discussed in greater detail elsewhere, in some embodiments, some or all of the image acquisition activity discussed with respect to routine 500 may occur on one or more mobile devices that are used to acquire the images, such as under control of one or more components of the MDIA System (e.g., as part of a client-side application executing on the mobile devices), and if so, the providing operations performed in block 580 may include transmitting or otherwise providing the selected group of images to one or more remote server systems, although in other embodiments, all operations of the MDIA system may be performed by one or more configured devices (e.g., by the mobile device) without such transmittal to a remote server system.

After block 580, the routine continues to block 595 to determine whether to continue, such as until an explicit indication to terminate is received, or instead based on the completion of the routine after an invocation performed by another routine (e.g., such as in block 430 of FIG. 4). If it is determined to continue, the routine returns to block 505, and otherwise continues to block 599 and returns.

Figure 6:
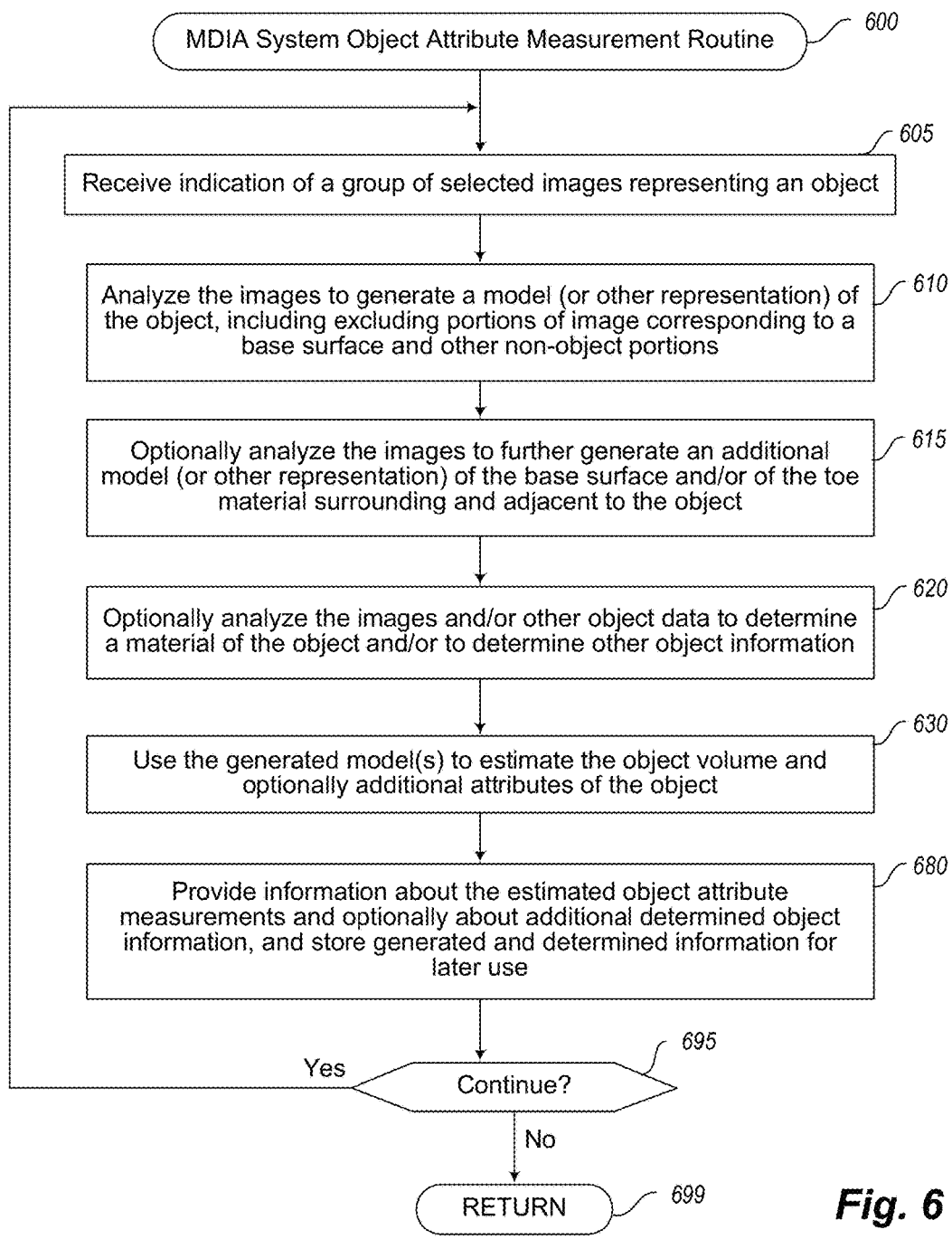
FIG. 6 is an example flow diagram of an illustrated embodiment of an MDIA System Object Attribute Measurement routine.

FIG. 6 is an example flow diagram of an illustrated embodiment of a MDIA System Object Attribute Measurement routine 600. The routine may be performed by, for example, execution of the MDIA System 160 of FIG. 1, the MDIA System Object Attribute Measurement components 342 of FIG. 3, and/or the MDIA System discussed with respect to FIGS. 2A-2H, such as to analyze a selected group of images that represents an object in order to determine one or more measurements for attributes of interest for the object, as well as to provide corresponding information to a client. The routine 600 may be invoked in various manners in various embodiments and situations, including with respect to block 450 of FIG. 4. In addition, while the illustrated embodiment of the routine 600 includes generating a model and using that model to measure attributes of interest, the attribute measurement activities may be performed in other manners in other embodiments.

The routine 600 begins at block 605, where an indication is received of a group of selected images that represent one or more objects of interest. The routine continues to block 610 to analyze the images to generate a model or other representation of the object, such as by generating a point cloud model in which portions of the images of the selected group that correspond to the object are separated from other portions of the images that are not part of the object (e.g., part of a base plane or other base service on which the object rests). Such a point cloud may include a mesh of numerous 3D data points representing the surface of the object that are extracted from data of the images, and additional interpolation or other fitting of the object surface between the 3D data points. The generating of the point cloud model may further be based in some embodiments at least in part on tracking particular object features through multiple of the selected images, and using such information from the multiple images to determine relative 3D location of each feature with respect to one or more other features. After block 610, the routine continues to block 615 to optionally further generate an additional model or other representation of some or all of the base surface on which the object is situated, such as to represent the 'toe' material of the base surface that is immediately outside and adjacent to the object's boundaries where it meets the underlying surface. The routine then continues to block 620 to further optionally analyze the images and/or other object data corresponding to the object or its environment to determine additional information about the object, such as to determine the material of the object. While blocks 610, 615 and 620 each refer to analyzing the images to determine different types of information, it will be appreciated that, in some embodiments, some or all analysis of the images will occur only once or simultaneously to obtain multiple types of information and/or to generate multiple models representing different types of information in the models.

In block 630, the routine then uses the generated model to estimate the object volume, and to optionally calculate or otherwise estimate measurement values for other attributes of the object, such as contour lines or other surface area information, weight, radioactivity, etc.—such attribute measurement estimation may in some situations involve information determined in block 620, such as to use a determined type of material and other information about a unit weight for the material by volume to determine the weight of the overall object based on its estimated volume and determined material type. In some embodiments, the operations performed with respect to one or more of blocks 610, 620, and 630 may further include further manipulating or modifying the generated model in various manners, such as to fit a bare earth model and/or a surface model to the point cloud model. In other embodiments, other types of models may be determined and used, non exclusive examples of which include occupancy graphs, an octree or volumetric representations based on voxels, etc.

As one specific example, the calculation of volume of an object may be performed based on measuring the amount of space between the surface of the pile and the ground it sits on, referred to generally in this specific example as the top and base surfaces, respectively. For example, even if the object is irregular and/or porous (e.g., a stockpile of construction aggregate materials) or the surfaces are otherwise approximate, the object may be modeled as having a fixed surface. Thus, the top and base surfaces may be treated as meeting along a boundary (e.g., to form a watertight solid that approximates the shape and volume of the pile), with this boundary referred to as the tope in this specific example. The solid may, for example, be represented with a boundary model formed of the two surfaces in polygonal or parametric form, or as a volumetric model such a 2½D height fields or a 3D voxel grid. The model may contain the pile itself, as well as optionally containing parts of the surrounding environment.

Using such a model, the volume computation may start with a step that segments the model into two components, with the first component containing the part of the model that represents the object, and the second component containing the remainder of the model. If the model is volumetric (such that the volume can be computed directly), then the object volume is obtained by computing the volume of the object component. Otherwise, the object component may be further segmented to isolate the top surface, base surface and toe components. In some embodiments, the model may be generated in the form of a 3D point cloud. The points of such a 3D point cloud model may be sampled from the top surface, the toe, and the surfaces of the surrounding environment, while the base surface is not sampled due to being a contact surface. The point cloud may, for example, be expressed in a Cartesian coordinate system, where the local vertical is aligned with the z up axis (i.e. pointing away from the center of the Earth, for an object resting on the ground). Given an object point cloud, the corresponding volume may be computed first by segmenting the points into top surface, toe and environment components. Then, z-aligned height fields may be fitted to the toe and surface components (e.g., in a smooth and statistically robust manner). Finally the object volume may be obtained by computing the integral of the difference between the top and toe fields. Alternatively, if a bare earth model of the environment (e.g., of the base surface on which the object sits) is available, then the volume may be obtained by computing the integral of the difference between the top field and a field derived from the bare earth model. If the object rests on complex terrain or man-made structures, then 3D models of these structures may be used to aid segmentation and field fitting. The models may be pre-existing or derived from the same point cloud. Finally, the point cloud may be pre-processed prior to segmentation. Pre-processing may include de-noising, removal of artifacts, simplification, scaling, leveling, geo-referencing, etc. Such artifacts may, for example, represent data that is added to one or more images but does not have a corresponding source in the object or environment, such as for artificially introduced data based on an imaging error or other problem, as described in greater detail elsewhere herein. The point cloud may also, in some embodiments and situations, contain reflectance and/or color information, and/or other meta-data that may be used volume computation. While the volume computation process may be fully automated in some embodiments and situations, in other embodiments and situations some human input may be provided as part of the process.

After block 630, the routine continues to block 680 to provide information about the estimated object attribute measurements as output of the routine, such as to another routine from which the routine 600 was invoked (e.g., routine 400). The routine optionally includes additional determined object information from block 620 as well in the provided information, and further stores the generated and determined information for later use.

After block 680, the routine continues to block 695 to determine whether to continue, such as until an explicit indication to terminate is received, or instead based on the completion of the routine after an invocation performed by another routine (e.g., such as in block 450 of FIG. 4). If it is determined to continue, the routine returns to block 605, and otherwise continues to block 699 and returns.

Figure 7:
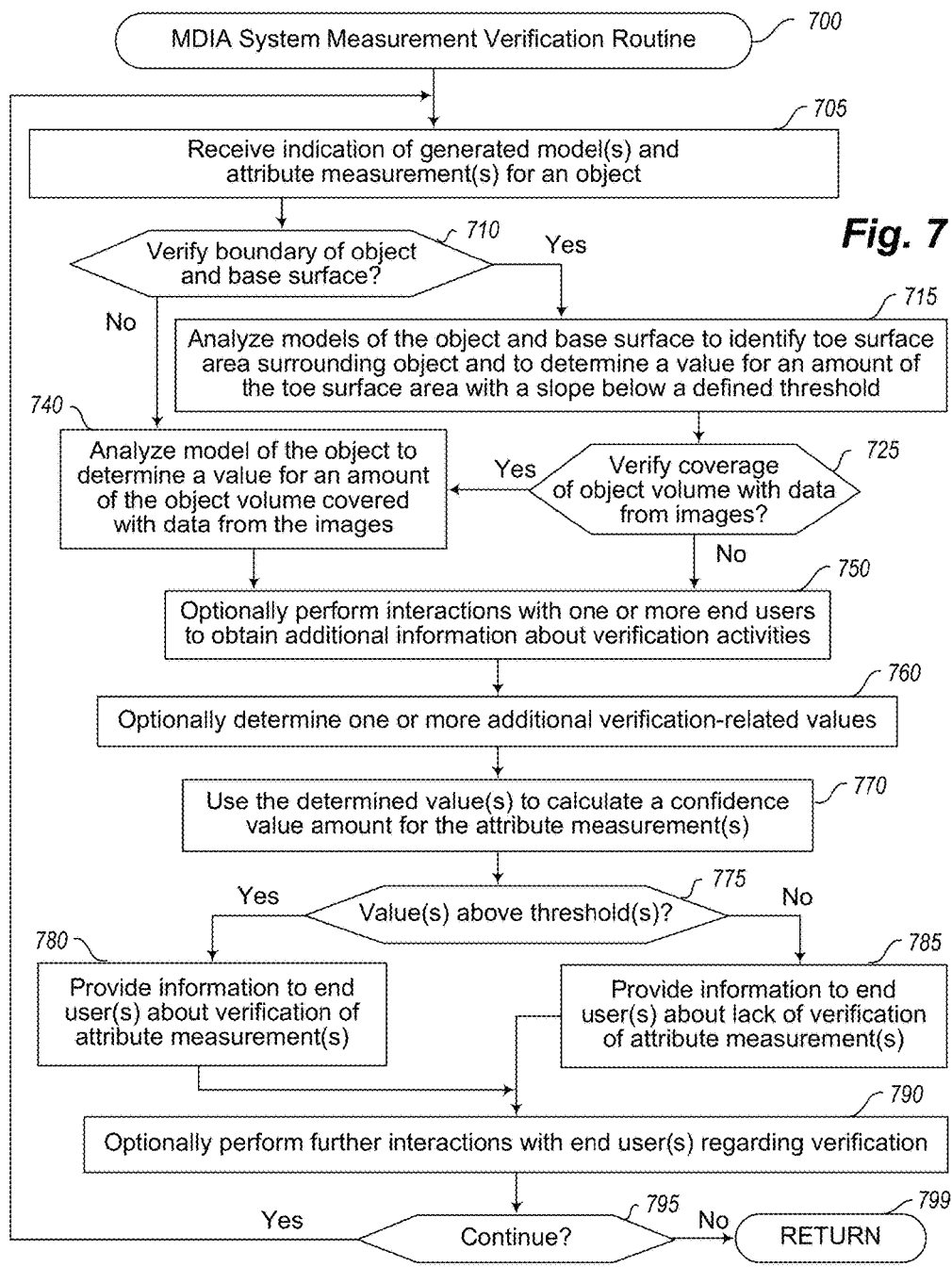
FIG. 7 is an example flow diagram of an illustrated embodiment of an MDIA System Measurement Verification routine.

FIG. 7 is an example flow diagram of an illustrated embodiment of an MDIA System Measurement Verification routine 700. The routine may be performed by, for example, execution of the MDIA System 160 of FIG. 1, the MDIA System Object Attribute Verification components 342 of FIG. 3, and/or the MDIA System discussed with respect to FIGS. 2A-2J and 2K1-2K9, such as to perform automated operations to verify object attribute measurements and/or corresponding generated computer model(s), as well as to provide corresponding information to a client. The routine 700 may be invoked in various manners in various embodiments and situations, including with respect to block 465 of FIG. 4. In addition, while the illustrated embodiment of the routine 700 includes performing attribute measurement verification in particular manners, the attribute measurement verification activities may be performed in other manners in other embodiments.

The routine 700 begins at block 705, where an indication is received of one or more generated computer model(s) and corresponding attribute measurements for which to perform automated verification activities. The routine continues to block 710 to determine whether to perform automated operations related to determining confidence in a boundary of a modeled object, and if so continues to block 715 to perform corresponding activities. In particular, the routine in block 715 performs an analysis of the computer model(s) of an object and underlying surface to identify toe surface area adjacent to the object boundary and to determine a percentage or other amount of the toe area that has a sufficiently low slope to indicate that the corresponding boundary is verified, with a verification (or lack thereof) of the overall object boundary being subsequently determined in block 770 based on the determined percentage or other amount. Additional details are included elsewhere herein related to determining confidence in a boundary of a modeled object.

After block 715, the routine continues to block 725 to determine whether to perform automated operations related to determining confidence in data coverage of a modeled object with respect to the object's volume and/or other indicated attribute measurements. If so, or if it is instead determined in block 710 not to perform automated operations related to determining confidence in a boundary of a modeled object, the routine continues to block 740. In block 740, the routine performs an analysis of the computer model(s) of an object to determine a percentage or other amount of the volume and/or surface of a modeled object that is sufficiently covered by image-acquired data, with a verification (or lack thereof) of the overall data coverage and optionally corresponding object attribute measurements being subsequently determined in block 770 based on the determined percentage or other amount. Additional details are included elsewhere herein related to determining confidence in data coverage of a modeled object.

After block 740, or if it is instead determined in block 725 not to perform automated operations related to determining confidence in data coverage of a modeled object, the routine continues to block 750 to optionally perform interactions with one or more end users to obtain additional information about the verification activities to be performed, as discussed in greater detail elsewhere herein. After block 750, the routine in block 760 optionally determines one or more additional verification-related values based on other types of verification-related activities (e.g., related to detecting and assessing vegetation obscuring the object, water adjacent to the object, one or more other overlapping or otherwise adjacent objects, etc.), optionally using information from block 750. In block 770, the routine then uses the determined values from blocks 715 and/or 740 and/or 760 to make an overall determination of a verification-related value with respect to one or more object attribute measurements, such as based on a weighted combination of multiple distinct verification-related values, although in other embodiments multiple distinct verification-related values may instead be used without such combination into an overall value. If the overall value (and/or individual value(s)) are determined in block 775 to exceed a corresponding threshold, the routine continues to block 780 to provide information to an end user or other recipient about the one or more object attribute measurements being verified, and otherwise continues to block 785 to provide information to the end user or other recipient about the one or more object attribute measurements not being verified (whether they affirmatively lack verification, or are not sufficiently certain to be automatically verified). After blocks 780 or 785, the routine continues to block 790 to optionally perform one or more further interactions with one or more end users related to the verification-related activities, such as to receive manual input to override or supplement the verification determination of blocks 770 and 775, to perform the verification-related activities of blocks 715 and/or 740 and/or 760, etc.

After block 790, the routine continues to block 795 to determine whether to continue, such as until an explicit indication to terminate is received, or instead based on the completion of the routine after an invocation performed by another routine (e.g., such as in block 465 of FIG. 4). If it is determined to continue, the routine returns to block 705, and otherwise continues to block 799 and returns.

Further details are included below regarding particular example embodiments of performing automated verification activities for object attribute measurements. Such details are provided for the sake of explanation, and other embodiments may lack some or all such details.

A volume generator component is used that takes a pile surface representation for example a point cloud as input. It then analyzes the point cloud to find points or curves on the toe of the pile. Leveraging these points or curves it generates a base surface, which optionally could be a smoothed surface. The shape of the top of the pile is found by fitting a smoothed surface to the entire point cloud, including points or curves determined to be on the toe. The difference in height between these two surfaces is integrated to find the volume of the stockpile, the integration can for example be discretized over a regular grid.

Repeatedly identifying points or curves on the toe of the pile drives the precision of the volume measurements. While techniques below are described as being based on points, similar techniques can be used to operate on curves. Curves could be used, for example, by appropriately discretizing them or by leveraging mathematical operations to compute the appropriate intersections, distance and contact metrics.

If a pile was on completely flat ground, with no surrounding piles and was recorded ensuring that the toe can be completely and accurately reconstructed then the volume measurement problem is well determined and the resulting volumes are accurate within the limits of the sampling and the applied reconstruction and volume estimation algorithms. In practice, piles are often placed on uneven surfaces such as the side of hills or uneven terrain, which makes automated analysis of the piles difficult. Another example source of difficulty are piles that are placed close together to maximize the amount of material that can be stored on a given plot of land. Another source of difficulty is the acquisition procedure or its execution. For example, if the recordings from ground-based imagery fail to frame/capture the toe of the pile in the images, parts of the toe may be missing in the reconstruction. Obstructing materials such as water surrounding a pile can also leave parts of the toe not reconstructed due to reflections, access limitations, or occlusion of the toe under the water. Other examples of obstructing materials are vegetation or equipment. To ensure quality control and measurement verification, techniques that robustly identify the toe and mark areas at the border of a pile that potentially impair the measurement accuracy are desired, to benefit precise volume measurements of stockpiles.

Detecting the Toe of the Pile

The toe of a pile is the relatively flat ground just outside of the pile's outline. One method for detecting the toe first searches for the toe outwards along the pile's perimeter. Next it applies a slope filter to the detected toe points to remove high slope areas that were identified as potential toe in the previous step.

Such toe identification begins by fitting an initial base surface to the points at the edge of a pile's point cloud. The method also fits a surface to all of the points. It then finds a starting contour around the pile's perimeter that is at a particular height above the initial base, such as 0.2 to 0.5 meters high, although other heights can be used. This starting contour is shown in black in image 291 of FIG. 2K1.

All points or curves outside and below this ring are potentially toe points or curves. This search area is stored in a data structure referred to as a base pile ring, an example of which could be a binary image. The method then computes the low slope area of the pile where the smoothed pile shape has slope lower than a threshold (for example 0.2 slope for the example shown in FIG. 2K2). The method finally forms the toe search area image as locations within the base pile ring where the slope is above the threshold. The toe search area is shown in white in image 292 of FIG. 2K2.

Within the toe search area, a Laplacian is calculated of the pile surface, although other slope measures/indicators can be used. The Laplacian represents is the curvature of the pile, visualized in image 293 of FIG. 2K3. Beginning at the starting contour, the method casts lines in an arc about the normal to the contour at each point, although other search patterns ensuring sampling completeness can be used for the search. Along each line the method identifies the point of highest positive curvature, which is the point at which the pile begins to smooth back out to meet the toe. The method then searches past this point, along the line to find the first point it intersects with low enough slope to be toe and labels this point as toe. It then performs a flood fill on surface height from this point, labeling any point with lower elevation than the newly identified toe point as also toe. This can mean that points that have too high slope to be used as toe nonetheless get identified as such. Next our method performs the second, slope filtering phase.

Slope filtering can be applied with or without automatic toe finding. There are cases where the edge of a point cloud is a good indicator of where the toe likely is, such as an aerial reconstruction where a human has manually marked the edge of a pile with a high degree of confidence. Slope filtering smoothes the pile shape to limit the effects of point cloud noise. It then thresholds 3D grid cells (or "voxels") or groups of voxels in the pile toe mask according to their slope. Points with too high slope are deemed bad toe. These points are not to be used in fitting the final base surface and are maintained for creating later visualizations for measurement verifications.

After finding the toe and filtering out bad toe points, the method selects those point that are within voxels or groups of them identified in the mask as toe and fits a base surface to these. This surface may in parts be below the edge of the reconstructed pile points. This occurs for example where the pile edge was not properly imaged, or where reflections, poor lighting or other effects made the point cloud reconstruction fail. An example pile, collected with a mobile device, is shown in image 294 of FIG. 2K4. Notice on the right of the pile the red area marked as bad toe. When fitting the base surface, it is placed below the edge of the reconstructed pile points, as otherwise the base of the pile will be raised, reducing the volume measurement. Zooming in on this area in image 295 of FIG. 2K5 shows the base surface points in blue that have lower elevation than the pile points.

To achieve an enclosed volume, the pile top surface should intersect the base in these areas—for example, the base surface around the edge of the reconstructed pile points may be sampled, these points may be added to the pile top point cloud, and a surface is refit to this new point cloud. This leaves the volume calculation or computation algorithm with a base surface and a pile top that meets it all around the edge of the pile. The difference in height between these surfaces is then integrated over the pile volume, for example over a grid with a cell size, to arrive at the final volume of the pile. The final pile toe shape for our example pile is shown in image 296 of FIG. 2K6.

As part of automated quality control, the method computes a "toe score" through a series of calculations, which is a measure of what portion of the perimeter of the pile is reliable because, for example, it has low slope (i.e., "good") toe points along it without any nearby high slope (i.e., "bad") toe points. A pile sitting on flat ground reconstructed without missing any parts of the pile may have a toe score of 100%. Water around a pile, poor framing or lighting can lead to lower toe scores.

Calculating the "Volume Confidence" of a Pile

The volume confidence of a pile is a measure of what proportion of a pile's volume has measured representation such as points in the surface representation above it. This is calculated over the surface covered by the pile. The calculation can, for example, be performed over a regular grid or any other amendable surface discretization. In each surface element, the number of pile surface measurements, for example 3D points, are determined that are above this surface element, for example a grid cell. The number of pile surface elements is then checked against a threshold to determine if there is sufficient support for the surface element to accurately measure its volume. If there is it is labeled as "supported". The surface element size can be set so that the area of supported elements on the surface reflects whether or not a pile volume has good coverage. For example, a pile having only one 3D point measurement element and one surface element (grid cell) would be marked as entirely supported, but would be likely to reflect a highly inaccurate model. Alternatively, setting the element size to a sufficiently small size (e.g., a millimeter) so that many millions of elements cover a pile, most elements would not contain a 3D pile surface and the fraction of supported elements would be extremely low, even if sufficient data coverage is available to generate a sufficiently accurate and complete computer model. As an example, the supported grid of cells for a ground-based 3D reconstruction are shown in gray in image 298 of FIG. 2K8. In that figure, the black region is not supported by 3D points, as can be seen in the point cloud in image 299 of FIG. 2K9. FIG. 2K9 further illustrates an example stockpile point cloud, which lacks data points on the top of the pile (which was not visible from the ground), with such areas being labeled as unsupported in FIG. 2K8.

Taking the difference between the pile surface representation and the base surface representation gives a height for each of these cells. Integrating the height of each element over the covered surface, we arrive at the total measured pile volume. We then also integrate only those elements marked as supported. The ratio to supported volume to total pile volume is the volume confidence. It is clear that while the above uses a simple counting measure for surface element support, a statistical coverage measure for the surface elements can also be used to determine the volume confidence calculation.

As an alternative method, a ray tracking approach can also be used to generate the volume confidence measurement. For each 3D point generated in the 3D reconstruction we have its associated uncertainty in 3D. This uncertainty is based on the intersection of the rays from the cameras the point is seen in and the uncertainty of those cameras and the point detections in those images. We create a voxel (grid) discretization of the volume that the pile sits within. For each voxel we can then calculate the probability that a point occupies that cell by accumulating the probabilities for each of the 3D points. Looking at the distribution of occupancy probabilities in a given vertical column of the voxel grid or discretization, where the pile top is most likely to occur can be seen, as well as the variance in pile height that can be expected from the measurements. If the peak in the occupancy probability in a given column is above a configurable threshold we mark this part of the pile as confidently measured. Otherwise, the surface is not confident in this column. For example, a non-confident column can occur under the top of a pile where the top of the pile wasn't reconstructed in 3D.

Not only does this approach allow us to generate a volume confidence percentage (volume of confident columns divided by total volume), we can also calculate an expected volume variance. This variance is based on the probability distribution of the heights in the voxel grid columns. With lower point cloud noise, this variance will be lower and hence we will have lower volume variance. Of course, if part of the pile is not reconstructed from the imagery, then the volume of this area of the pile is unknown. However, we can set a hard upper bound on the volume of the pile by carving away all the volume above the back-projected pile silhouettes seen in the images. This creates a maximal containing surface, under which the pile is located. A hard lower bound on the pile's volume cannot be set without making some assumptions or having specialized surface knowledge, because there is no limit to how deep (within reason) a hole could go in the top of a pile. We can, optionally, set the lower bound on the volume based on fitting a base surface to the toe points, as described above and assuming that the hole could be no deeper than the base surface, or otherwise selecting a lower bound.

In addition to the volume confidence, the same supported vs. unsupported decision can be used to generate a "surface confidence" measurement. This measures what percentage of the total surface area of the pile is supported by the reconstructed 3D points or surflets. This number directly represents the coverage that the 3D reconstruction has over the area of interest, without including the toe and base surface fitting. For example, with respect to a volume confidence number, changing the base surface estimate can change the volume confidence but it will not change the surface confidence.

The Measurement Verification Algorithm

A measurement can be automatically verified as discussed above, and/or interactively verified by an operator or user. A pile is automatically verified if its toe score and volume confidence are above certain thresholds and no other yard management problems are identified. The appropriate thresholds can, for example, be interactively set by examining sample piles and deciding on thresholds above which a pile measurement can be relied upon for inventory purposes, can be learned through machine learning algorithms leveraging training data (i.e., sample measurements), etc. Site management problems, which can be identified during a quality assurance process, include, for example, excessive vegetation, bodies of water bordering the pile, piles packed too close together on the site and other factors.

To detect these impairing factors automatically, a classification method (classifier) can be applied, which will take the RGB images as input data and optionally depth data, or another scene representation (for example a mesh), to perform for each element (for example a pixel, region (for example a super pixel), scene point or triangle) a labeling into belonging to the pile or being associated to one of the impairing factors. Hereby, the classifier can be trained to either only distinguish between 'pile' and 'not pile' for each element, or can be trained to specifically distinguish between different classes of obstacles in addition to the pile. Examples of differentiated obstacle classes are vegetation, equipment, people, water, etc. The differentiated classes are helpful for generating automatic feedback for the reasons of the failed verification, for example if a significant presence of vegetation is detected the system can alert the user about this fact directly and automatically propose site management measures to mitigate the error source. The classifier can be, for example, a support vector machine, a cascaded classifier, a pixel parsing algorithm or a deep convolutional neural network. Alternatively, a set of the above classifiers can be used, with different classifiers being used to identify specific classes. It is understood that other classifiers can similarly be used for this task as well. The training of the classifiers can be performed either on same site data or stock data of previously captured image data and their related quality impairing obstacles—for example, vegetation and water can be automatically detected in the imagery using machine learning techniques such as learned classifiers. If the classification is performed in image space, the determined labels will be transferred to the 3D space by using the geometry of the camera imaging process to identify the corresponding elements of the pile representation and label them accordingly. Since multiple images of the same surface can be potentially labeled inconsistently, the labels of each element can be consolidated through a fusion process, for example a voting approach or a robust consensus determination.

If a pile is not automatically verified, then the algorithm provides it to an operator or a user verification queue. The operator or the user are then presented with plain or augmented views of the piles and the information related to the above described extracted measurements for interactive quality verification. An example of the related information is images of the pile, which may be marked indicating areas of concern. These can be shown in a 3D viewer, which shows a 3D model of the stockpile with contour lines, areas of good and bad toe, for example shaded green (good toe) and red (bad toe) along the edge and the supported pile volume indicated with another color. This texturing of the pile allows the operator or user to quickly see if the reconstruction missed parts of the toe or pile points that are critical to get a good reconstruction. For a ground-based collection of images for a pile with a relatively flat top, the volume confidence score may be low. Yet, the operator or user may know that the pile top was flat and the surface smoothing resulted in a flat pile model—thus, even though the volume confidence could be low in this situation, the pile is nonetheless an accurate representation of the real pile and can be used for inventory. In this case, the operator or user may manually mark the pile as "verified". Alternatively, if the operator or user knew that the pile had a sub-pile on top that wasn't captured in the reconstruction, he or she may manually mark it as "not verified".

Similar processing can be performed for toe scores. While the toe score may be low, the operator or user can leverage the provided visualizations to determine that the reconstructed pile still accurately reflects the actual pile, and manually mark the pile as "verified." The operator or user can do the same for other site management concerns as well. By bringing these concerns to the user's attention, such computed measurements, scores and visualizations provide benefits by empowering them to judge if they can accept the inventory measurements as is, say with vegetation on the pile or toe that may impair the calculated volume, or mark the pile as not verified. The user can then correct the site management issues so that they can get a reliable stockpile measurement, such as by removing shrubs or trees from a pile, spreading out piles across the site to maintain some minimum inter-pile distance, and draining bodies of water around piles, among other remedies.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

As discussed above, embodiments of the MDIA System may perform a variety of activities in a variety of manners in various embodiments. One or more specific example embodiments are discussed in greater detail below for an example volume measurement service, but it will be understood that the invention is not limited to the exemplary details provided (e.g., may be used with a service that measures various surface attributes, whether in addition to or instead of volume).

A volume measurement service may be provided for stockpiles or other objects. To perform a volume measurement, a user initiates a dataset acquisition session by identifying the location of the stockpile and the material (e.g., aggregate) it contains. The identification may be done manually or with some degree of automation. For example, positioning methods (satellite, marker, 3D model) can compute the location. Image-based recognition methods can be used to identify the material, such as via texture recognition.

The user walks around the pile while capturing video or images of it. In general, one loop around the pile is enough to image the whole pile. The mobile acquisition platform may use lightweight photogrammetry processing to ensure correct capture, such as to warn the user during the capture if the captured video/images are insufficient for 3D reconstruction. After the user stops the capture, the application starts uploading the dataset to a reconstruction server/cloud. This is done through the cell phone network, a wireless network or through a connection established by a local PC.

The configured device(s) supporting the volume measurement service may then perform automated operations to implement a photogrammetry pipeline that reconstructs the stockpile and yields a point cloud model. Then the point cloud is automatically oriented and scaled, such as based on GPS metadata recorded with the frames. In some cases, data of one or more types are provided by multiple distinct devices and/or sensors in the environment of the object (e.g., at one or more locations near or on the object), including to use a combination of multiple types of data and/or differential information of a single type from multiple devices to further refine and improve metadata associated with the object. Finally, a volume computation component fits bare earth and surface models over the point cloud to derive the pile volume and contour lines of the pile. The data may then be compiled into a report and posted on a web server for the user to retrieve it.

As one example of an architecture for an MDIA system that provides such a volume measurement service, photogrammetric reconstruction software that is used may be distributed between a mobile device for image acquisition and one or more remote server computing systems. The software is split into two primary logical components or sub-systems, as follows: one or more image acquisition components (e.g., hosted on the mobile device), and one or more object attribute measurement components used for reconstruction (e.g., hosted on the one or more remote server computing systems, and also referred to as a 'reconstruction component' herein)—the distribution between the mobile device and server computing system(s) may be performed based on various factors, such as the respective processing capabilities and the available network bandwidth (e.g., as processing power increases on mobile devices, larger portions of the system activities may be performed on the mobile device used for image acquisition. In addition, the image acquisition component(s) may have a user interface that allows the user to operate the components on the mobile device.

Photogrammetry Pipeline

The two groups of components may be used to form a photogrammetry-processing pipeline, and may communicate asynchronously through a wired or wireless data network, or through a PC-based network connection. Such a photogrammetry pipeline consumes imagery in the form of still images or video streams of a specific object or environment, and produces a 3D model (or other representation) of that object. The model is a representation of the object's surface in the form of points, polygonal meshes or parametric surfaces. The points and surface primitives may be colored or textured from the source imagery or a combination of source imagery and other capture data to produce a photorealistic appearance, such as for display to the user. Meta-data may further be used to register (scale, orient, and locate) the model in a given coordinate system. Alternatively, the presence of known objects in the imagery may be used for registration.

The photogrammetry pipeline may include the following steps

Pre-processing (optional)—The images are converted in a format suitable for reconstructions. They may be rectified to correct artifacts introduced by the imaging sensor, such as optical/radial distortion.

Image Selection (optional)—A subset of the images is selected to form the reconstruction problem. The selection is based on criteria such as the amount of overlap between the candidate images, and image quality (sharpness, contrast, exposure, etc.), camera motion during acquisition, scene-to-camera distance, and scene texture. Global coverage of the object's visible exterior in the collective set of selected images may be used.

3D Reconstruction—A solver establishes visual correspondences between pixels in several images and uses them as constraints to recover the relative camera positions for the matching images and the 3D coordinates of the points underlying corresponding pixels. The solver may estimate intrinsic camera parameters, such as focal length and distortion, or it may obtain these from the metadata of the images/videos. The solver may also densify the point set, for example, by attempting to grow corresponding regions in the images. The solver may also use only camera location data, for example, from GPS or other tracking methods, such as triangulation of external signals to solve for the final camera geometry.

Post-Processing (optional)—The point set may be registered in a known coordinate system. It may be converted to a surface model (or other surface representation) with a meshing or surface fitting method. The resulting model may be photo textured.

Mobile Device

The mobile device may combine several sensors, including at least one imaging sensor, with a general purpose data processing and storage capability, and could have network connectivity. The device also could have a user interface in the form of any of the following or a combination of the following: a display screen, physical buttons, audio speakers, haptic effectors (vibrate), etc. The device may also have global positioning, inertial and/or magnetic sensors. Without loss of generality, a typical device would be a smart-phone, a tablet, a laptop with camera, or a handheld camera. The imaging sensor produces images with one or more channels for one or more spectral bands: infrared, visible spectrum, etc. The device may include illumination sources in the corresponding bands. The mobile device may also be able to produce depth measurements co-registered with the imagery, such as by means of structured-light, stereographic, and active ranging sensors (e.g., laser scanners).

Acquired Data

The mobile device acquires video streams or still images along with state information, such as time of day, location fixes from a global positioning system, inertial measurements (linear and angular acceleration), local earth magnetic field, etc. The imagery has one or more color channels, and may include depth information.

The data may also include metadata describing the operating parameters of the device's imaging sensor, such as frame-rate and exposure. The meta-data may also include user-provided information relevant to the field of application.

Acquisition Component

A function of the image acquisition component(s) may be to aggregate imaging and non-imaging sensor streams, locally process the data and forward it to the server to complete processing. Sensors may operate at different measurement rates. The image stream may contain sequentially acquired frames as produced by a video camera, or still images acquired according to a triggering event such as user input. The component(s) may further monitor the quality of the acquired images, such as by using a quality metric, including to provide some feedback to the user regarding the quality of the data being collected. The mobile device may in some embodiments perform an image selection function that forms the reconstruction dataset, such as if the mobile device has sufficient processing power, and otherwise such functionality may be performed by the reconstruction components. Finally, the image acquisition components may be responsible for transmitting the dataset to the server.

Quality Monitoring

While recording, the mobile device may monitor the quality of the imagery to maximize the chances of a successful reconstruction. It uses the quality assessment to provide feedback cues to the user through the user interface. A photogrammetric solution may benefit from good coverage of the object of interest with quality images. The images preferably overlap by a certain amount to properly triangulate the structure of the object. Furthermore, the images preferably have as little blur as possible and as much contrast as possible. The limitation of imaging sensors combined with mobile device acquisition may produce artifacts that affect photogrammetric quality. Below are some possible artifacts.

Focus Blur—The sensor may produce blurry images if the object of interest is out of focus. Depth of field limitations and cycling of auto-focus are typical causes of this artifact.

Motion Blur—Rapid apparent motion of the environment may produce smeared images. This limitation is typical of imaging sensors which have a minimum exposure time per image. Low light may cause the sensor to increase that exposure and make it very sensitive to motion blur.

Lens Flare—Under certain conditions, the light from bright sources is reflected between the lenses of the sensor's optical assembly. This may cause the images to lose contrast and/or distorts colors.

Low Light and Backlight Conditions—When lighting is insufficient, the images may lose contrast and become grainy, as well as show motion blur.

Rolling Shutter—Certain cameras continuously refresh their image buffer one row at a time. The electronic shutter captures the content of the buffer into a frame asynchronously of the row update. This may produce frames that actually contain two separate images. This effect is acerbated by rapid apparent motion.

The image acquisition components may monitor quality with two metrics in some embodiments: image relative sharpness and apparent motion. These metrics allow the components to provide feedback cues to the user to help mitigate transient focus and motion blur, as well as low light and lens flare conditions.

Image Relative Sharpness

The components may use a sharpness function to measure the sharpness of each acquired image, as described further below. After each image acquisition, the mean and standard deviation of the sharpness may be computed over a moving window containing the last k sharpness measures (also can perform this using all previous and the current frames). If the standard deviation exceeds a certain threshold, the component emits a sharpness warning signal. The signal causes a cue (visual, aural, etc.) to be conveyed to the user to inform the user that the sharpness of the imagery is inadequate. The signal subsides when the sharpness measure stabilizes.

Apparent Motion

Apparent motion can be measured by processing consecutive frames. The use of optical flow is one example method that can be used for such measuring, while feature-based correlation is another example method. 3D reconstruction methods such as 'structure from motion' or SLAM may similarly be used. With respect to optical flow, it is a vector field that describes the relative movement of pixels between two related images. The image acquisition components use this construct to monitor motion blur and provide a pacing cue to the user. It also may be used to detect adverse lighting conditions that produce low contrast.

Given an optical flow method, the method is initialized with the first acquired frame. Then for each following acquired frame, the acquisition component computes the flow between this frame and the previous one. If the median or mean magnitude of the flow exceeds a preset threshold, then the component emits an excess motion signal. The signal causes a cue (visual, aural, etc.) to be conveyed to the user to inform the user that apparent excessive motion is compromising the quality of the imagery. The signal subsides when the mean or median flow drops below the threshold.

The optical flow method produces a tracking error for each of its field elements. Field elements whose error is below a certain threshold are called good field elements. For a given image, if the number of good field elements drops below a certain threshold, then the component discards the image unless the previous k images where discarded for the same reason. If the image cannot be discarded, the image becomes the new initial frame of optical flow method and the component emits a lost track signal. The signal causes a cue (visual, aural, etc.) to be conveyed to the user to inform the user that adverse lighting conditions are compromising the device's tracking function. The signal subsides when tracking resumes.

During image acquisition, the image acquisition components may publish the mean or median flow through an apparent motion signal. The user interface translates it into a cue (visual, aural, etc.) that enables the user to control the pace the motion of the device. The cue promotes smooth motions.

Other Image Quality Measures

Other relevant image quality measures can be derived from parameters produced by the imaging sensor. For example, a low image exposure would be interpreted as producing low quality images.

Other sensors such as accelerometers can produce relevant angular and linear motion measurements. Excessive angular and linear rates caused by fast camera motion are indicators of degraded image quality because of motion bur.

Image Selection

The image selection function enables the image acquisition components to select frames from an image stream for inclusion into the dataset that is sent to the server. This function achieves image sparsity and ensures a minimal image quality. The 3D reconstruction solver does not benefit from images that have high temporal coherence, such as consecutive frames in a stream. On the other hand, it benefits from a certain amount of overlap. The image acquisition components may use feature tracking to measure visual changes in a scene and to decide when a new image is to be selected.

Image selection may be implemented with greedy and/or global strategies. A greedy strategy selects images as they are acquired. A global strategy operates on a complete set of images. The greedy strategy is advantageous for applications requiring online selection to, for example, minimize network usage. However the selection may be suboptimal. The global strategy allows for an optimal selection. Both strategies use scoring functions that inform their selection heuristics. These functions measure image sharpness and continuity (overlap). The latter function may use feature tracking.

Feature Tracking

Feature tracking involves computing the location of multiple visual features through a sequence of images. The features are usually salient shapes, such as corners, present in the first image of the sequence. A feature detector can be used to select the feature set. For each feature, tracking produces a sequence of image coordinates called a track. The tracks are grown by performing a tracking step between two consecutive images. There are several methods to perform the tracking step, with optical flow/sparse optical flow being one example.

Over time, the apparent changes in the scenery will cause certain features to become occluded or to exit the sensor's field of view. The corresponding tracks are dropped from the track set. Other factors such as blur, and lens flares will cause tracking failures leading to additional dropped tracks. When the tracking set is depleted below a certain size, the tracking algorithm invokes the feature detector to replenish the track set. Over time, several tracks may converge on the same feature. A de-cluttering step performed after the tracking step may prevent clumping. This step can be implemented with a non-maximum suppression algorithm where, given a fixed search radius, for each feature pair whose separation is less than the search radius, drop the shortest of the two corresponding tracks.

The feature tracking process produces a set of features $F_i$ for each image $I_i$. Each feature $f_k$ is defined by a position $pos(f_k)$ in the corresponding image and a key $id(f_k)$ that uniquely identifies the associated visual feature. Given two feature sets $F_i$ and $F_j$, their intersection $F_i \cap F_j$ is a set of matching feature pairs.

$$F_i \cap F_j = \{(f_k, f_{k'}) | f_k \in F_i \wedge f_{k'} \in F_j \wedge id(f_k) = id(f_{k'})\}$$

Scoring Functions

Scoring functions may be used to measure image sharpness, continuity and other qualities.

Relative Sharpness

The relative sharpness function measures the sharpness of an image by comparing its absolute sharpness with the absolute sharpness of the neighboring frames in the image sequence. Given an image I, the absolute sharpness function s(I) is defined as the mean squared magnitude of the image gradient computed at each pixel $$s(I) = \frac{\sum_{p \in I} \|\nabla p\|^2}{|I|}$$

Given an image sequence, the neighborhood of the $i^{th}$ image $I_i$ is $$W_r(I_i) = \{I_{i-r}, \ldots, I_{i-1}, I_i, I_{i+1}, \ldots, I_{i+r}\}.$$

where r is a fixed radius.

The upstream neighborhood may be defined as $W_r^U(I_i) = \{I_{i-r}, \ldots, I_{i-1}, I_i\}$ The relative sharpness of $I_i$ is $$relS(I_i) = \frac{s(I_i) - \min(S_r(I_i))}{\max(S_r(I_i)) - \min(S_r(I_i))}$$

with $S_r(I_i) = \{s(I_j) | I_j \in W_r(I_i)\}$.

The upstream relative sharpness is $$relS^u(I_i) = \frac{s(I_i) - \min(S_r^u(I_i))}{\max S_r^u(I_i)) - \min(S_r^u(I_i))}$$

with $S_r^u(I_i) = \{s(I_j) | I_j \in W_r^u(I_i)\}$.

Alternatively, the sharpness could also be analyzed in the frequency domain or a wavelet domain to identify the missing high texture frequencies. Furthermore, it could be executed only on the image part of interest (the part that is modeled in 3D), which may be more robust to any problems of depth of field in the camera.

Continuity Functions

Several functions and predicates may be defined that measure the amount of overlap between images. A continuity function $f: S^2 \to \mathbb{R}^+$ takes a pair of images and computes a real positive value representing the amount of overlap between these images.

Three specific continuity functions may be defined, as follows: trkCcrnt, epiCont, and sfmCont.

trkCont computes the number of common tracking features between two frames $$trkCont(I_i, I_j) = |F_i \cap F_j|.$$

epiCont computes the largest number of tracking features pairs between two frames that support an epipolar geometry solution. Epipolar geometry is a set of constraints between corresponding points in two images produced by two cameras viewing the same 3D scene. epiCont can be implemented with several epipolar methods, to produce the geometric constraints and the number of feature pairs that agree with them. Those pairs are known as epipolar inliers. epiCont produces the number of inliers.

sfmCont computes the largest number of tracking features pairs between two frames that support a solution comprising 3D positions for those features and the camera views for each image. This type of solution is produced by structure from motion techniques. A camera view includes extrinsic parameters (translation and rotation), and may include intrinsic parameters such as focal length, aspect ratio and distortion coefficients. sfmCont produces the number of inlier pairs.

Other techniques, such as Simultaneous Localization and Mapping (SLAM) are suitable to compute a continuity predicate.

Given the threshold minCont, the predicate goodCont($f$, $I_i$, $I_j$) is true $I_i$ and $I_j$ have a minimum continuity according to a function $f$.

$$\text{goodCont}(f, I_i, I_j) \equiv f(I_i, I_j) \geq \text{minCont}$$

The set of images that are connected to $I_i$ according to goodCont are $$W_C^u(f, I_i) = \{I_j | I_j \in S \wedge \text{goodCont}(f, I_i, I_j) \wedge i > j\}$$

$$W_C^d(f, I_i) = \{I_j | I_j \in S \wedge \text{goodCont}(f, I_i, I_j) \wedge i < j\}$$

$$W_C(f, I_i) = \{I_j | I_j \in S \wedge \text{goodCont}(f, I_i, I_j)\}$$

They represent respectively the upstream, downstream and total set of images that have a good connectivity as defined by $f$.

Given the threshold minConn the predicates $$\text{good}W_C^u(f, I_i) \equiv |W_C^u(f, I_i)| \geq \text{minConn}$$

$$\text{good}W_C^d(f, I_i) \equiv |W_C^d(f, I_i)| \geq \text{minConn}$$

$$\text{good}W_C(f, I_i) \equiv |W_C(f, I_i)| \geq \text{minConn}$$

Identify the images whose number of upstream, downstream, and total numbers of connections according to $f$ is larger or equal to minConn.

Let medDelta($I_i$, $I_j$) be the median displacement of the tracking features between two frames $$\text{medDelta}(I_i, I_j) = \text{median}(\{\|\text{pos}(f_k) - \text{pos}(f_{k'})\| | (f_k, f_{k'}) \in F_i \cap F_j\})$$

The following predicate is true if the median displacement between two frames falls within a preset range (min Disp, max Disp)

$$\text{goodDelta}(I_i, I_j) \equiv \text{medDelta}(I_i, I_j) \in (\text{min Disp}, \text{max Disp})$$

The predicate indicates whether the median value of the apparent displacement of the tracked features is with a preset range. Alternatively, the predicate can be computed with the mean displacement.

Other Quality Metrics

Other quality functions may be applicable, including those measuring artifacts as described above.

Greedy Image Selection

This type of image selection process runs concurrently with image acquisition. It is can be a greedy iterative method that selects the best image among a moving window. The window is implemented with a queue within which incoming frames are inserted. When the window reaches a preset size, the algorithm assigns a score to each frame with a scoring function and adds the highest scoring frame to the set of selected frames. Then, the tail of the queue starting at the selected frame is discarded and the accumulation process resumes.

The scoring function may be defined as a weighted sum of individual functions.

$$\text{score}(I_i) = \sum_{j=1}^{m} \alpha_j f_j(I_i)$$

In particular, the following combination of sharpness and continuity was found to be advantageous $$\text{score}(I_i) = \begin{cases} \alpha \text{relS}(I_i) + \beta |W_C^u(f, I_i)| + \\ \gamma(i - s) \\ \text{relS}(I_i) \end{cases} \begin{array}{l} \text{if } I_s \text{ exist} \wedge \text{goodDelta}(I_s, I_i) \wedge \\ \text{goodCont}(f, I_g, I_i) \\ \text{otherwise} \end{array}$$

where $I_s$ is the latest selected image, $\alpha$, $\beta$ and $\gamma$ are real values and $f$ is a continuity function such as trkCont, epiCont, or sfmCont.

Global Image Selection

This type of image selection process models the problem of selecting images as a graph search problem. The method builds a directed acyclic graph G(V, E). Each vertex represents an image in the sequence.

$$V = \{I_1, \ldots, I_n\}$$

Each oriented edge $e_{ij}$ connects two images $I_i$ and $I_j$ if they meet a given connectivity criterion conn($I_i$, $I_j$) and if i<j. The criterion's predicate is true if it can measure a certain amount of coherence between two images such as spatial coherence (scene overlap) or temporal coherence (neighboring timestamps).

$$E = \{e_{ij} | \text{conn}(I_i, I_j) \wedge i < j\}$$

Figure 2L:
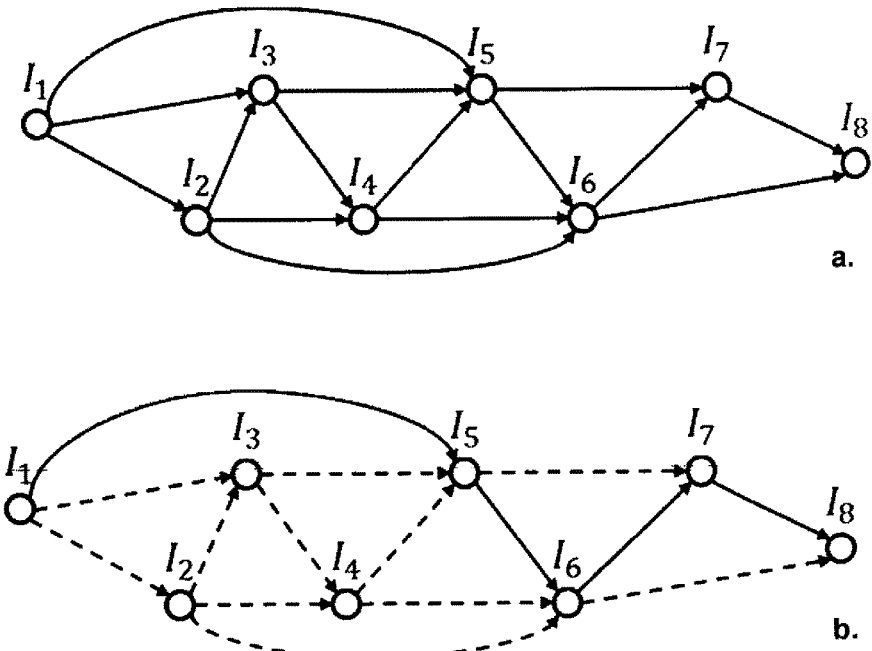
FIG. 2L is an illustration with a sequence of eight images, with the 'b' portion depicting a path selecting five images out of the eight.

FIG. 2L is an illustration with a sequence of eight images, with the 'b' portion depicting a path selecting five images out of the eight.

Once the graph is constructed, the method selects the images by finding a path p($I_1$, $I_n$) through G that connects the first and last images in the sequence. There may be several valid paths. The function uses a cost function to select the best path $$p^*(I_1, I_n) = \underset{p \in P(I_1, I_\infty)}{\text{argmin}} \text{cost}(p)$$

where P($I_1$, $I_n$) is the set of all path between the first and last image.

The cost function computes for each edge the cost of consecutively selecting the images it connects. This function represents the relative goodness of the outgoing edges of an image. By extension the cost of a path is the sum of the cost of the edges it traverses.

The selection method outputs the images on the min-cost path between the first and last image. This path-finding step is performed with techniques such as Dijkstra's shortest path algorithm, or other techniques for selection of a minimal path or an approximately minimal path. In case the graph is disconnected, the method combines the images on the min-cost path between the first and last image in each connected component.

The following connectivity predicates and edge cost functions may be used $$\text{conn}(I_i, I_j) \equiv \text{goodDelta}(I_i, I_j) \wedge \text{goodCont}(f, I_i, I_j) \wedge j - i < \text{max } Dt$$

$$\text{cost}(e_{ij}) = \max(\{|\text{pred}(I)| | I \in \text{succ}(I_i)\}) - |\text{pred}(I_j)|$$

Where pred(I) and succ(I) are the set of images connected to I by incoming and outgoing edges respectively. max Dt is a strictly positive upper bound that enforces a minimum sampling rate.

cost($e_{ij}$) is designed to incentivize the path finding step to select images that have the most incoming edges.

Global Sharpness Pre-Filtering

In certain implementations, images may be pre-filtered based on their sharpness before selecting them based on their connectivity, such as if continuity functions are computationally expensive. Global sharpness pre-filtering uses the graph-based selection method described above with the following connectivity predicate and cost functions.

$$\text{conn}(I_i, I_j) = I_i \in W_r(I_f)$$

$$\text{cost}(e_{ij}) = \text{relS}(I_f)$$

Figure 2M:
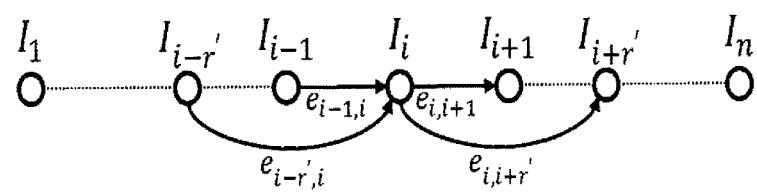
FIG. 2M illustrates the graph connectivity for a given image.

The radii of the image neighborhoods used for computing the relative sharpness and the connectivity predicate may be different. The graph connectivity for a given image is shown in FIG. 2M.

Encoding and Transport

The aggregated sensor stream may be encoded in a combination of industry standard and ad-hoc data formats. For example, the frames in the image stream may be encoded as individual frames or as a compressed stream. The encoded stream is either locally stored for later transfer or sent immediately to the server through the network interface, such as via industry standard and/or ad-hoc transport protocols. Locally stored data may be transferred to an intermediate host computer that will forward it to the processing server.

User Interface

The user interface supports the operation of the image acquisition components. It presents pages and menus to configure the components, acquire datasets and monitor their transfer and processing. During acquisition, the interface displays the stream of images being acquired. It overlays textual and graphical information that allows the user to monitor the quality of the dataset.

Reconstruction Component

The reconstruction component is hosted on a reconstruction server. It may be composed of software components that form the remainder of the photogrammetry pipeline. It may also have workflow management components that supervise the processing of the incoming datasets. The component may further have load balancing functions that enable it to distribute reconstruction jobs among multiple processing nodes.

Processing Pipeline Architecture

The processing pipeline system is designed to handle and scale easily to process large volume of datasets. Components of the processing platform include:

Data stores: Used to store metadata, transactional data and media files

Web Server: Handles the end user interface to the system and gateway to the client acquisition devices Processing servers: Virtual machines run a workflow engine which takes a source data sets and executes various computer vision components to generate the end user reports. The workflow engine has automatic quality management built into it based on the quality of results the data sets are reprocessed with various different parameters and settings to produce optimal end results As noted above, in at least some embodiments, the described techniques include automated operations to select, while a series of digital images of an object of interest are being acquired, particular digital images from the series to use to represent the object (such as a subset of the digital images in the series, although in other embodiments and situations all digital images of the series may be selected and used)—such automated image selection operations may be performed in at least some embodiments by one or more image acquisition components of the MDIA system that execute as part of a software application on the mobile device, with an MDIA system Image Selector component being one example of such a component, as discussed in greater detail below with respect to FIG. 1 and elsewhere. In other embodiments, such MDIA system image acquisition component(s) may instead execute on one or more other computing devices and communicate with the mobile device and/or with the operator, such as on another associated computing device in the vicinity of the mobile device (e.g., a mobile computing device carried by the operator of the mobile device acquiring the digital images, with such an associated computing device optionally being in communication with the mobile device acquiring the digital images via a wireless and/or wired/cable connection). After a group of such particular digital images (also referred to herein as "images") are selected, they may be analyzed in various manners to represent the object and to determine corresponding information about the object, as discussed in greater detail elsewhere herein.

As one example of selecting particular images for the group while the images are being acquired, a human user or other operator of the mobile device that is used in acquiring the images (also referred to herein as "the mobile device") may begin to acquire one or more initial images of an object of interest, such as from a first general, location in the vicinity of the object at which the operator is standing or otherwise located (e.g., on the ground or other same base surface as the object). If at least one of the initial images of interest satisfy minimum quality standards (e.g., with respect to resolution; contrast; lighting; inclusion of all or a minimum amount of the object; an amount of absolute or relative motion, such as with respect to one or more preceding images; etc.), one of those satisfactory initial images may be selected as a first image of the group, with that selected image representing a ground-based view of the exterior of the object from the first location. That selected image may also be added as a first item in a temporary image queue that is used to select additional images to add to the group. Additional details are included below related to assessing images to determine if they satisfy minimum standards of quality, with at least some corresponding image quality monitoring automated operations being performed by one or more of the MDIA system image acquisition components in some embodiments, such as a MDIA system Image Quality Monitor component, as discussed in greater detail with respect to FIG. 1 and elsewhere.

As the operator of the mobile device continues to encircle the object by moving to different locations around the exterior of the object, additional images are acquired (whether automatically by the MDIA system image acquisition component(s), such as continuously or periodically or as otherwise determined, or instead based on manual actions of the operator to acquire images at particular locations and/or times, optionally in response to instructions from the MDIA system image acquisition component(s)). The additional images are added as additional items in the image queue (optionally after verifying that the additional images being added satisfy the minimum standards of quality, although such minimum standards of quality may not be assessed at the time of adding images to the queue in some embodiments). The inclusion of additional images in the queue continues until the MDIA system image acquisition component(s) determine that a sufficient quantity of images have been added to the image queue—such a determination may be made in a variety of manners in various embodiments, such as based on a quantity of queue items, an amount of time elapsed since the first item in the queue was acquired, an amount of distance traveled (or other change in location) since the first item in the queue was acquired, an amount of change in a portion of the object exterior that is shown between two or more images in the queue (e.g., to ensure that at least a minimum overlap exists in the object exterior portions between the first and last images in the queue, such as to both include at least one or some other minimum number of common features and/or areas in the images), an aggregate size of the items in the queue, etc.

After a sufficient quantity of images have been added to the image queue, one or more images may be selected from the image queue to be added to the group, and other non-selected images in the image queue that precede such selected images in the queue may be discarded or otherwise excluded from inclusion in the group, although in some embodiments even the non-included images may be retained outside the queue for further use. In addition, the most recent newly selected image may be used as a new first item in the image queue, with any earlier images in the queue being removed from the queue, and optionally with some or all of the other images in the queue (if any) after the new first item being retained in the queue. The selection of one or more particular images from the queue to include in the group may be performed in various manners in various embodiments, including by evaluating some or all of the images included in the queue to select one or more images with a highest score based on one or more metrics (e.g., one or more quality standard metrics, and/or one or more metrics that measure an amount of overlap or other relationship between an image being evaluated and the first image in the queue). Additional details are included below related to evaluating multiple images with respect to one or more metrics.

After the selection of one or more images from the queue and corresponding modification to the image(s) remaining in the queue that result from selecting a new first queue item, the process of acquiring additional images to add to the image queue may repeat one or more additional times, until a sufficient group of images has been selected to satisfy any overall object acquisition criteria (e.g., to cover all of the exterior of the object, to cover a specified portion of the object exterior, etc.). After the process of selecting the group of images to represent the object has been completed, those images in the group may be further analyzed by one or more object attribute measurement components of the MDIA system (e.g., one or more MDIA system object attribute measurement components that execute on one or more remote server computing systems), including in some embodiments to transmit or otherwise provide only the selected images of the group to those object attribute measurement components, although in other embodiments some or all other of the acquired images may also be provided to those object attribute measurement components—such transmission or other providing of images may incur in various manners, including to use wireless capabilities (e.g., a cellular telephone network, satellite transmissions, WiMax or other wide-area wireless computer networks, etc.) of the mobile device and/or of an associated configured device, and/or to use wired/cabled capabilities (e.g., by moving the mobile device to a location that includes wired/cabled networking capabilities, and physically attaching the mobile device to an available port or other connection). Additional details are included below related to techniques for selecting particular images for the group in a dynamic manner concurrently with image acquisition.

As noted above, in at least some embodiments, the described techniques further include automated operations to select, after a series of images of an object of interest have been acquired, particular images from the series to use as part of a group that represents the object, such as instead of performing image selection dynamically and concurrently with the image acquisition—such automated image selection operations may be performed in at least some embodiments by one or more of the MDIA system image acquisition components that execute as part of a software application on the mobile device and/or on other associated configured devices, such as a MDIA system Image Selector component, and may include selecting a subset of the images in the series or all of the images.

As one example of selecting particular images for the group after the images have been acquired, a human user or other operator of the mobile device may first travel around some or all of the exterior of the object in order to acquire the series of images, such as in a manner similar to that described above with respect to acquiring the series of images while concurrently selecting particular images for the group. In some embodiments, some or all of the acquired images may be assessed with respect to one or more minimum standards of quality (e.g., in a manner to that discussed above with respect to acquiring the series of images while selecting particular images for the group), whether during the acquisition of the images or after all of the images of the series are acquired, such as to discard or otherwise exclude any images from further consideration if they fail to satisfy such standards (although such minimum standards of quality may not be assessed at this time in some embodiments). The remaining images in the series are then supplied to an MDIA system Image Selector component for further analysis—if such a component is executed on one or more remote server computing systems, the supplying of the remaining images may include transmitting or otherwise providing the remaining images to those remote server computing systems.

The selection of the images for the group further includes evaluating some or all of the images of the series to select multiple images based on one or more metrics (e.g., one or more quality standard metrics, and/or one or more metrics that measure an amount of overlap or other relationship between two or more of the images)—the selection of the multiple images may include selecting a sufficient group of images to satisfy any object acquisition criteria (e.g., to cover all of the exterior of the object, to cover a specified portion of the object exterior, etc.). As one example, the images of the series may be evaluated to determine degrees of overlap with each other, such as to identify pairs of images having at least a minimum overlap in the object exterior portions of those, images (e.g., both include at least one or some other minimum number of common features in the images). Graph information may then be generated for the images in the series, with each node in the graph representing one of the images, and each edge between two nodes corresponding to an identified pair of images with sufficient overlap. Optionally, cost information of one or more types may then be associated with some or all of the edges and/or with some or all of the nodes, such as for cost information for an edge to correspond to a degree of overlap for the identified pair, and/or for cost information for a node or edge to correspond with another determined aspect (e.g., a cost score for an image based on a quality score for an image with respect to one or more quality standard metrics). A shortest path through the graph may then be determined, using any specified cost information (e.g., using least cost path planning), with the images associated with the nodes along the shortest path being the selected images for the group—in determining the path, a first node in the path may be a selected initial image from the acquired images (in a manner similar to that discussed above for selecting initial images concurrently with acquisition of the series of images), and a last node in the path may be one of the final images (or any other image) from the acquired images that is selected in a similar manner. Additional details are included below related to techniques for selecting particular images for the group by evaluating the images after the image acquisition has been completed.

As is also noted above, in at least some embodiments, the described techniques include automated operations to, while a series of digital images of an object of interest are being acquired, provide instructions or other feedback to a human user operator of the mobile device—such automated user feedback operations may be performed in at least some embodiments by one or more of the MDIA system image acquisition components, with an MDIA system Operator Feedback Provider component being one example of such a component, as discussed in greater detail below with respect to FIG. 1 and elsewhere. For example, during the image acquisition, some or all of the images that are acquired may be assessed with respect to one or more quality standard metrics, as discussed elsewhere, including to determine if a minimum threshold or other minimum criteria is satisfied. Such user instructions or feedback may be performed based at least in part on such image quality assessment, including to assist in improving the additional images that are acquired for the series, whether from additional locations along the exterior of the object and/or based on re-acquiring one or more images of the series (e.g., images that fail to satisfy minimum quality standards). Thus, for example, if a particular acquired image fails to satisfy minimum quality standards, the MDIA system Operator Feedback Provider component may generate and provide feedback to the user via the mobile device and/or an associated configured device related to the image quality problems. Such feedback may, for example, indicate only that an image that was just acquired has problems without providing additional details, or instead may indicate additional details (e.g., a type of quality problem, instructions of how to improve corresponding quality of additional images acquired in the future, instructions to reacquire one or more images whose quality was not sufficiently high and optionally instructions for how to do so, instructions for how to modify a light level and/or position of the user to improve quality, etc. Such feedback information may be provided in various manners in various embodiments, including via audible information (e.g., tones, spoken information, etc.), visual information (e.g., displayed text, a warning light, etc.), or other feedback mechanisms (e.g., vibration or other haptic mechanisms).

In other embodiments, the types of feedback or other instructions provided may have other forms. For example, information may be provided to a human user operator related to his/her positioning (e.g., to be nearer to or farther from the object, to be higher or lower relative to the object, to go to a specified location, etc.), and/or regarding the use of other capabilities (e.g., to add a light source, to add information of known size to enable a scale determination, to add information to enable slope or other orientation information to be determined, etc.). In addition, in some embodiments, feedback or other instructions provided via the automated operations may include settings or parameters to be used for the image acquisition (e.g., shutter speed, lens aperture, zoom level, etc.), whether by providing such information to a human user operator to manually set on the mobile device, or by automatically setting some or all such parameters on the mobile device. Furthermore, in some embodiments and situations in which the operator of the mobile device is not a human (e.g., an automated vehicle, such as an aerial drone or ground-based drone, or other mobile device or system), the feedback or other instructions provided may further control the operator in additional manners, such as to direct the operator to one or more specified locations, to direct where and how to point or otherwise orient the image acquisition capabilities of the mobile device, when to acquire images, etc. Additional details are included below related to techniques for generating and providing feedback to an operator of a mobile device.

It will be appreciated that the details discussed with respect to the example embodiments discussed above to support a volume measurement service are provided for illustrative purposes, and that the described techniques are not limited to these example details.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

acquiring, from one or more mobile devices moving around an exterior of a pile of material at a first time, a plurality of images of the exterior using image acquisition capabilities of the one or more mobile devices, wherein other material overlaps portions of the pile of material and at least partially obscures those portions of the pile of material, and wherein each of one or more of the plurality of images of the exterior includes at least part of those portions of the pile of material;

generating, by one or more configured devices and based at least in part on analyzing at least some of the plurality of images, a first computer model of the exterior for the first time;

determining, by the one or more configured devices, a change in volume of the pile of material between the first time and a later second time, including:

acquiring multiple additional images of the exterior for the second time using image acquisition capabilities of at least one mobile device;

generating, based at least in part on analyzing at least one of the multiple additional images, a second computer model of the exterior for the second time; and comparing information for the first and second computer models to generate the determined change in volume between the first time and the second time;

verifying, by the one or more configured devices, accuracy of the determined change in volume, including:

analyzing the one or more images to determine information about those portions of the pile of material that are at least partially obscured by the other material, including identifying one or more second piles of material that are part of the other material and obscure a first part of a boundary of the pile of material, and identifying that the other material further includes at least one of vegetation or water covering a second part of the boundary of the pile of material;

measuring, for at least one of the first or second computer models, a coverage of the pile of material based on an amount of the pile of material that is covered by the images used for generating the at least one first or second computer model, including to exclude at least some of those portions of the pile of material as being covered based on being at least partially obscured;

determining that the measured coverage of the pile of material for the at least one first or second computer model exceeds a defined first threshold; and determining that an amount of the boundary of the pile of material that is at least partially obscured by the other material is below a defined second threshold; and displaying, to one or more recipients via a graphical user interface on one or more client devices of the one or more recipients, and based at least in part on the verifying, information about the determined change in the volume and about the verified accuracy of the determined change in volume, to enable the one or more recipients to take further action based on the determined change in the volume.

2. The computer-implemented method of claim 1 wherein the determining of the change in volume of the pile of material between the first time and the second time further includes estimating a first volume of the pile of material for the first time from the first computer model, estimating a second volume of the pile of material for the second time from the second computer model, and comparing the estimated first and second volumes.

3. The computer-implemented method of claim 1 wherein the determining of the change in volume of the pile of material between the first time and the second time includes determining that the volume has grown or shrunk between the first time and the second time, and wherein the displaying of the information includes displaying information about an amount that the volume has grown or shrunk.

4. The computer-implemented method of claim 1 further comprising determining, by the one or more configured devices, a change in a surface area of the pile of material between the first time and the second time using differences between the first and second computer models, and wherein the displaying of the information includes displaying information about the determined change in the surface area of the pile of material.

5. The computer-implemented method of claim 1 further comprising determining, by the one or more configured devices and based at least in part on a height of the pile of material, a change in a size of the pile of material between the first time and the second time using differences between the first and second computer models, and wherein the displaying of the information includes displaying information about the determined change in the size of the pile of material.

6. The computer-implemented method of claim 1 further comprising determining, by the one or more configured devices and based at least in part on a width of the pile of material, a change in a size of the pile of material between the first time and the second time using differences between the first and second computer models, and wherein the displaying of the information includes displaying information about the determined change in the size of the pile of material.

7. The computer-implemented method of claim 1 further comprising determining, by the one or more configured devices and based at least in part on a length of the pile of material, a change in a size of the pile of material between the first time and the second time using differences between the first and second computer models, and wherein the displaying of the information includes displaying information about the determined change in the size of the pile of material.

8. The computer-implemented method of claim 1 further comprising determining, by the one or more configured devices, a change in a weight of the pile of material between the first time and the second time using differences between the first and second computer models, and wherein the displaying of the information includes displaying information about the determined change in the weight of the pile of material.

9. The computer-implemented method of claim 1 further comprising determining, by the one or more configured devices, a change in radioactivity of the pile of material between the first time and the second time based at least in part on differences between the first and second computer models, and wherein the displaying of the information includes displaying information about the determined change in the radioactivity of the pile of material.

10. The computer-implemented method of claim 1 further comprising determining, by the one or more configured devices, a change in monetary value of the pile of material between the first time and the second time based at least in part on differences between the first and second computer models, and wherein the displaying of the information includes displaying information about the determined change in the monetary value of the pile of material.

11. The computer-implemented method of claim 1 further comprising determining, by the one or more configured devices and based at least in part on analyzing images that include one or more second objects at the first time and at the second time, estimates of volume of the one or more second objects at the first time and at the second time, and wherein the displaying of the information includes displaying information that is based at least in part on the determined estimates of the volume of the one or more second objects at the first time and at the second time.

12. The computer-implemented method of claim 11 wherein the one or more second objects include the one or more second piles of material, wherein the one or more second piles of material overlap in part with the pile of material, and wherein the method further comprises determining portions of the pile of material and of the one or more second piles of material for overlapping portions.

13. The computer-implemented method of claim 11 wherein the one or more second objects include one or more third piles of material that are adjacent to the pile of material without overlapping the pile of material.

14. The computer-implemented method of claim 11 wherein the pile of material resides on an underlying surface, and wherein the one or more second objects include at least one of one or more buildings or one or more holes in the underlying surface.

15. The computer-implemented method of claim 1 wherein the one or more configured devices include at least one device that is part of an online service, and wherein the method further comprises generating, by the one or more configured devices, one or more reports for a client of the online service that include the information about the determined change in the volume, and providing the one or more reports to the client.

16. The computer-implemented method of claim 1 wherein the first computer model is a three-dimensional computer model, wherein the method further comprises, by the one or more configured devices, estimating a first volume of the pile of material for the first time from the first computer model, and wherein the verifying of the coverage of the pile of material for the at least one first or second computer model includes verifying accuracy of the estimated first volume by:

calculating, by the one or more configured devices and with respect to at least a portion of the generated three-dimensional computer model that represents a surface of the pile of material above an underlying surface, an amount of the at least portion that has corresponding data acquired from the at least some images; and determining, by the one or more configured devices and based at least in part on the calculated amount satisfying the defined first threshold, that the accuracy of the estimated first volume is verified; and providing, by the one or more configured devices and to one or more recipients, information about the estimated first volume and the verified accuracy.

17. A non-transitory computer-readable medium having stored contents that cause one or more computing devices to perform automated operations including at least:

acquiring, from one or more mobile devices moving around an exterior of an object at a first time, a plurality of images of the exterior using image acquisition capabilities of the one or more mobile devices, wherein a second object overlaps portions of the object and at least partially obscures those portions of the object, and wherein each of one or more of the plurality of images of the exterior includes at least part of both the object and the second object;

generating, by the one or more computing devices and based at least in part on analyzing at least some of the plurality of images, a first computer model of the exterior for the first time;

determining, by the one or more computing devices, a change in volume of the object between the first time and a later second time, including comparing, to the first computer model, a second computer model of the exterior that is generated for the second time from multiple additional images of the exterior acquired for the second time using image acquisition capabilities of at least one mobile device;

verifying, by the one or more computing devices, accuracy of the determined change in volume based at least in part on coverage of the object by the images used for generating at least one of the first or second computer models, including:

analyzing the one or more images to determine an amount of those portions of the object that are at least partially obscured by overlapping parts of the second object, including identifying one or more parts of the second object that obscure a first part of a boundary of the object, and to further determine that at least one of vegetation or water covers a second part of the boundary of the object;

measuring, for the at least one first or second computer model, the coverage of the object based on an amount of the object that is covered by the images used for generating the at least one first or second computer model, including to exclude at least some of those portions of the object as being covered based on being at least partially obscured;

determining that the measured coverage of the object for the at least one first or second computer model exceeds a defined first threshold; and determining that the amount of those portions of the object that are at least partially obscured by the overlapping parts of the second object is below a defined second threshold; and providing, to one or more recipients, information about the verified accuracy of the determined change in the volume, to enable further action based on the determined change in the volume.

18. The non-transitory computer-readable medium of claim 17 wherein the object is at least one pile of material on an underlying surface, wherein the one or more computing devices are part of an online service that provides object analysis capabilities to multiple clients, wherein the one or more recipients are associated with one of the multiple clients, and wherein the providing of the information includes displaying, to the one or more recipients via a graphical user interface on one or more client devices of the one or more recipients, the information about the verified accuracy of the determined change in the volume of the object.

19. The non-transitory computer-readable medium of claim 17 wherein the object is a first pile in an area that includes multiple piles of material and the second object is a second pile that partially overlaps part of a boundary of the first pile, wherein the defined threshold is a boundary accuracy threshold, and wherein the stored contents include software instructions that, when executed, further cause the one or more computing devices to:

as part of determining the amount of the object that is at least partially obscured, determine an amount of overlap between the first and second piles, and identify the part of the boundary of the first pile that the second pile at least partially overlaps; and as part of the verifying of the accuracy of the determined change in volume, determining that the part of the boundary of the first pile that the second pile at least partially overlaps is below the boundary accuracy threshold.

20. A system comprising:

one or more hardware processors of one or more devices; and one or more memories with stored instructions that, when executed by the one or more hardware processors, configure the one or more devices to perform automated operations that include at least:

acquiring, from one or more mobile devices moving around an exterior of a pile of material at a first time, a plurality of images of the exterior using image acquisition capabilities of the one or more mobile devices, wherein portions of a boundary of the pile are at least partially obscured by of her material that is not part of the pile, and wherein each of one or more of the plurality of images of the exterior includes at least part of those portions of the boundary;

generating, by the one or more configured devices and based at least in part on analyzing at least some of the plurality of images, a first computer model of the exterior for the first time;

determining, by the one or more configured devices, a change in value of an attribute of the pile of material between the first time and a later second time, including:

acquiring multiple additional images of the exterior for the second time using image acquisition capabilities of at least one mobile device;

generating, based at least in part on analyzing at least one of the multiple additional images, a second computer model of the exterior for the second time; and comparing information for the first and second computer models to generate the determined change in the value of the attribute between the first time and the second time;

verifying, by the one or more configured devices, accuracy of at least one of the first or second computer models based at least in part on coverage of the pile of material by the images used for generating at least one of the first or second computer models, including:

analyzing the one or more images to determine an amount of those portions of the boundary of the pile of material that are at least partially obscured by the other material, including identifying one or more parts of the other material that obscure a first part of the boundary of the pile of material, and identifying that the other material further includes at least one of vegetation or water covering a second part of the boundary of the pile of material;

measuring, for the at least one first or second computer model, the coverage of the pile of material based on an amount of the pile of material that is covered by the images used for generating the at least one first or second computer model, including to exclude at least some of those portions of the boundary of the pile of material as being covered based on being at least partially obscured;

determining that the measured coverage of the pile of material for the at least one first or second computer model exceeds a defined first threshold; and determining that the amount of those portions of the boundary of the pile that are at least partially obscured by the other material is below a defined second threshold; and providing, to one or more recipients, information about the determined change in the value of the attribute that is based at least in part on the verified accuracy of the determined change, to enable further action based on the determined change in the value of the attribute.

21. The system of claim 20 wherein the attribute of the pile of material is a volume, wherein the one or more configured devices are part of an online service that provides pile attribute analysis capabilities to multiple clients, wherein the one or more recipients are associated with one of the multiple clients, and wherein the providing of the information about the determined change to the one or more recipients includes displaying, to the one or more recipients via a graphical user interface on one or more client devices of the one or more recipients, the information about the determined change in the value of the attribute of the pile of material.

22. The system of claim 20 wherein the attribute is a surface area of the pile of material or one or more types of material in the pile of material.

23. The system of claim 20 wherein the pile of material includes multiple overlapping piles of material, wherein the attribute is an amount of overlap between two or more piles of the multiple overlapping piles, and wherein the other material that at least partially obscures the portions of the boundary of the pile includes at least one of water or vegetation.

24. The system of claim 20 wherein the automated operations further include estimating a volume of the pile of material based at least in part on the determined amount of those portions of the boundary of the pile that are at least partially obscured by the other material, and wherein the providing of the information includes indicating the estimated volume.

25. The system of claim 24 wherein the analyzing of the one or more images includes determining an amount of the material that is at least partially covered by at least one of water or vegetation.

\* \* \* \* \*

UNITED STATES PATENT AND TRADEMARK OFFICE
CERTIFICATE OF CORRECTION

PATENT NO. : 10,403,037 B1
APPLICATION NO. : 15/076493
DATED : September 3, 2019
INVENTOR(S) : David Boardman et al.

It is certified that error appears in the above-identified patent and that said Letters Patent is hereby corrected as shown below:

In the Claims

Column 56, Line 59, Claim 20:
"are at least partially obscured by of her material that" should read --are at least partially obscured by other material that--.

Signed and Sealed this
Seventh Day of January, 2020

Andrei Iancu
*Director of the United States Patent and Trademark Office*